(12) United States Patent
Lalvani

(10) Patent No.: US 6,341,460 B1
(45) Date of Patent: Jan. 29, 2002

(54) ARCHITECTURAL WAVEFORMS AND A MORPHOLOGICAL TECHNIQUE FOR ENABLING THEIR FABRICATION

(76) Inventor: Haresh Lalvani, 164 Bank St., Apt. 2B, New York, NY (US) 10014

( * ) Notice: Subject to any disclaimer, the term of this patent is extended or adjusted under 35 U.S.C. 154(b) by 0 days.

(21) Appl. No.: 09/466,542

(22) Filed: Dec. 17, 1999

(51) Int. Cl.$^7$ .......................... E04F 13/00; E04F 15/00; E04F 19/00
(52) U.S. Cl. .......................... 52/311.2; 52/311; 52/384; 52/81.4; 52/80.1; 52/DIG. 10; D25/136; D25/151
(58) Field of Search .......................... 52/80.1, DIG. 10, 52/311.2, 81.4, 311, 384; D25/113, 136, 151

*Primary Examiner*—Carl D. Friedman
*Assistant Examiner*—Chi Nguyen

(57) ABSTRACT

A class of undulated building structures constructed from sheets of suitable material and composed of sinuous curved faces meeting at constant angle at sinuous curved edges. The curved faces ensure a deformation-free (and hence a strain-free) surface, a critical feature for large-scale architectural constructions from sheet materials. The structures can be constructed by scoring a single sheet and folding the entire structure or from parts which are scored and folded. A variety of 2-dimensional scoring designs and a morphological technique for their derivation is disclosed. The technique enables the generation of symmetric and asymmetric 3-dimensional developable structures with combinations of convex and concave angle folds. The technique also provides the enabling feature for forming by various manufacturing methods. The structures can also be constructed from cast materials.

Various architectural applications of the invention includes columnar structures, walls and ceilings, roof structures, 2-way and 3-way corrugated surfaces and panels (sandwiched or otherwise), wavy modular and space-defining (partition) systems, objects of art, wavy furniture systems, wavy lighting systems, and so on. Other applications include package designs, containers and boxes, and wavy angles, channels, box sections, etc. as alternatives to standard angle-sections.

18 Claims, 46 Drawing Sheets

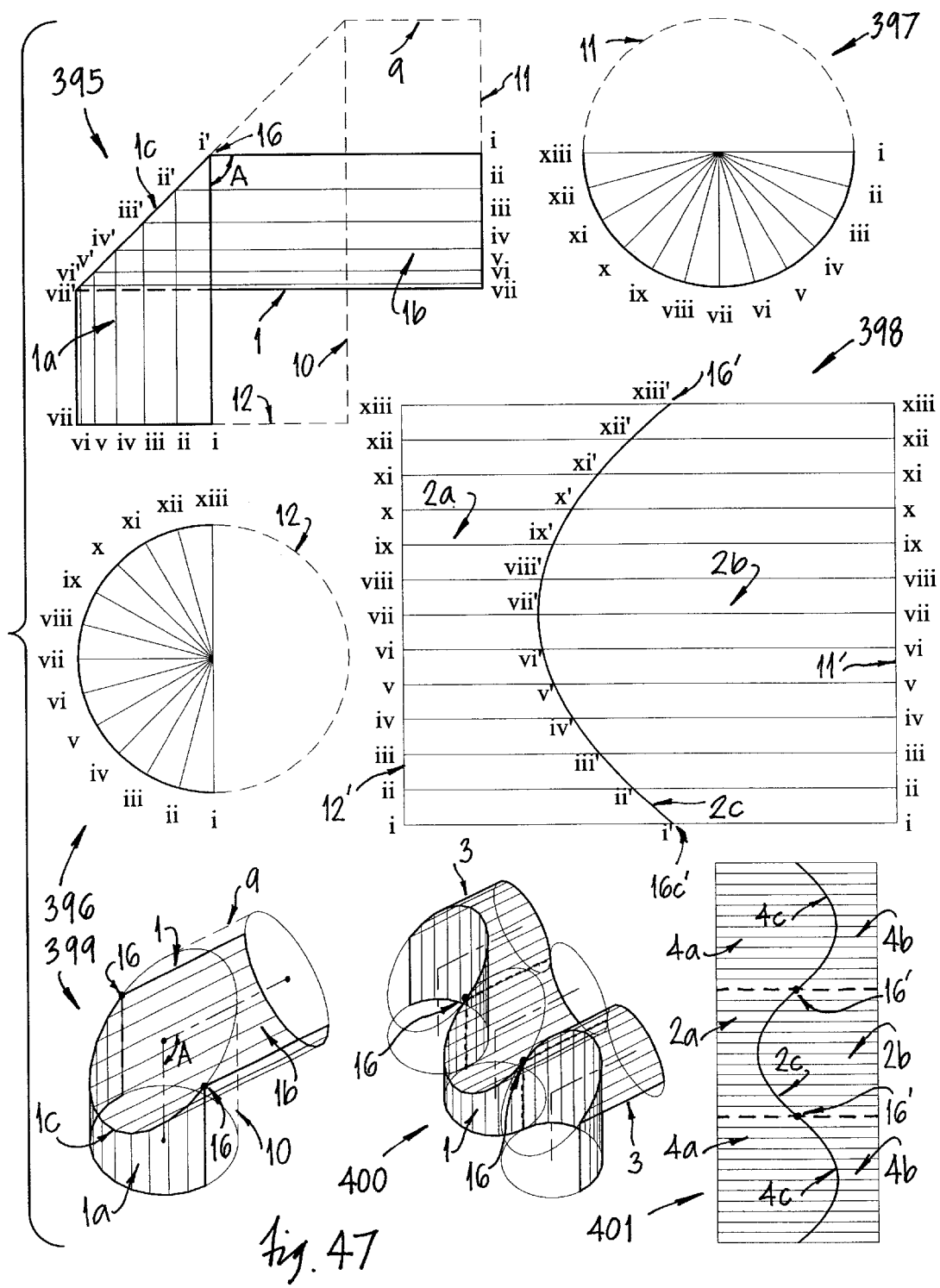

ARCHITECTURAL WAVEFORMS AND A MORPHOLOGICAL TECHNIQUE FOR ENABLING THEIR FABRICATION

FIELD OF THE INVENTION

This invention relates to building structures made from sheet material. More specifically, it deals with curved folded structures having undulated surfaces and which are constructed from a 2-dimensional sheet material by marking or scoring the sheet in pre-designed manner and forming by suitable manufacturing technique which enables deformation-free 3-dimensional structures. A variety of building structures and a morphological technique for the derivation of scoring patterns is disclosed. The undulated shapes lend themselves to fabrication by other methods, such as casting, as well.

BACKGROUND OF THE INVENTION

The origin of architecture most likely began with imitation of nature, soon followed by innovation as new building concepts were added to the gradually expanding inventory of principles of space and structure which underlie built form. The currently dominant architectural vocabulary of rectilinear and right-angled forms and structures is largely a function of available building techniques and limited structural morphologies. The introduction of curved forms in architecture, e.g. shells and membranes, was made possible by the introduction of new formal and structural shapes aided by new building techniques. These curved forms fall into two categories, developable and non-developable surfaces. Singly-curved surfaces, like those used for certain shells, can be easily constructed from a sheet material and belong to the first category. Doubly-curved surfaces like those used is tensile fabric structures, inflatables, geodesic spheres, and gravity-shaped grid shells like those of the German architect-innovator Frei Otto, deal with forms belonging to the second category. The formal vocabulary of developable surfaces is more limited than that of non-developable surfaces. With advances in computer-modelling and visualization of complex mathematical surfaces, there is a continuing need to expand the morphological knowledge base of architecture by extending the morphology of such surfaces. With advances in the morphology of curved space structures, architecture comes closer to geometries found in nature and, with it, closer to the dream of a true "organic" architecture in empathy with nature. This goal provides the philosophical and humanistic motivation for this invention which is aimed at providing a morphological basis of a new architecture.

SUMMARY OF THE INVENTION

The object of this invention is to provide a class of architectural curved surface structures composed of undulating faces meeting at undulating curved edges and constructed from sheet material. The surfaces of the structures are developable and their overall geometry curves in more than one spatial direction. The surfaces alternate in an in-out wave-like manner in two or more directions, giving the structures an inherent strength based on their geometry alone. The curved edges of the 3-dimensional structures are special 2-dimensional curves which guarantee deformation-free, and hence strain-free, developable surfaces in 3-dimensions. This is a crucial feature for large-scale architectural structures. The entire structure could be constructed from a single sheet, or a single structure could be constructed from parts which could then be assembled together. When built from rigid sheet materials, the structures can be used for building roofs, architectural surfaces, walls and wall systems, columns, beams, sculptures, honeycomb structures, ceiling systems, furniture, partition systems and standard sections for building systems. When constructed from flexible or soft material, the structures could be used for kinetic structures and sculpture, pleated textiles, corrugated sandwiches for building and packaging industry, and soft architectural surfaces.

Another object of the invention is to provide a method for the derivation of 2-dimensional curves required for marking or scoring a sheet material which can then be "folded" or "bent" along these curves into 3-dimensional curved structures by available forming techniques. The deformation-free feature of the geometry of the structure facilitates the forming process and provides the key enabling feature in the design of moulds, presses, rollers and folding apparatus, and designs for software-driven production methods like laser-cutting, water-jet cutting, etc. of sheet materials used for manufacturing these structures. The method of derivation of the 2-dimensional curves deals with the (2-dimensional) development of 3-dimensional portions of two or more intersecting singly-curved surfaces. The development of 3-dimensional surface is derived using the well-known method of "opening" up a source singly-curved surface into a flat 2-dimensional sheet, and the 3-dimensional intersections (the edges of the structures) are derived using the standard sectioning technique with the requirement that these intersections lie on the cutting plane used for sectioning, and further that this cutting plane be shared by two adjacent source singly-curved surfaces. This guarantees that the 3-dimensional intersections are themselves plane (2-dimensional) curves. The 2-dimensional curves required for scoring or folding are different from these and obtained by the development of 3-dimensional intersections onto a flat plane.

Another object of the invention is to provide a set of 2-dimensional curves which guarantee a curved fold in 3-dimensions. The curved fold has a constant angle between the adjacent surfaces along the entire length of the fold. The deformation-free property of the structure is the result of this constant angle feature embedded in the geometry of the 3-dimensional surface. This angle could be convex or concave, and could be used in any combinations in structures with many successive folds. When successive angles of the folds are equal and convex, the cross-sections of the surfaces are polygons with equal angles and the structure is an undulating surface of revolution like a wavy cylinder or a wavy cone. When successive angles are alternating convex and concave supplementary angles, the structure is a planar undulating folded structure analogous to the standard fan-type folded plates. When successive angles are alternating pairs of convex and concave supplementary angles, the structure is an undulating corrugated sheet with corrugations in 2 or 3 directions. When the successive alternating angles are unequal convex and concave angles, the structures are undulated corrugated surfaces of revolution like wavy corrugated cylinders and cones analogous to conventional corrugated cylinders. Various combinations of these angle sequences yield a large repertory of curved waveforms, symmetric as well as asymmetric and irregular.

Another object of the invention is to provide a set of 2-dimensional patterns comprising a plurality of 2-dimensional curves which can provide a starting point for a suitable fabrication method. These curves are obtained by translating, reflecting or rotating one or more curves along different directions and are selected from a family of special 2-dimensional curves. The patterns include cases where the curves are parallel, or meet at points, or branch out into more curves.

Though preferred embodiments of the invention are presented here, it will be clear to those skilled in the art that variations could be produced without departing from the scope of the invention.

BRIEF DESCRIPTION OF THE DRAWINGS

FIG. 34 is a simple 3-way corrugated panel with the cross-section of a rectangular wave. FIG. 35 is a stretched version of FIG. 34. FIG. 36 is a vaulted version with a steeper curve.

FIG. 47 shows the precise geometric procedure for deriving the scoring pattern (the 2-dimensional sine waves) for the curved surface 1 in FIG. 1. It also illustrates the procedure for obtaining the precise 3-dimensional geometric model.

DETAILED DESCRIPTION

Figure 14:
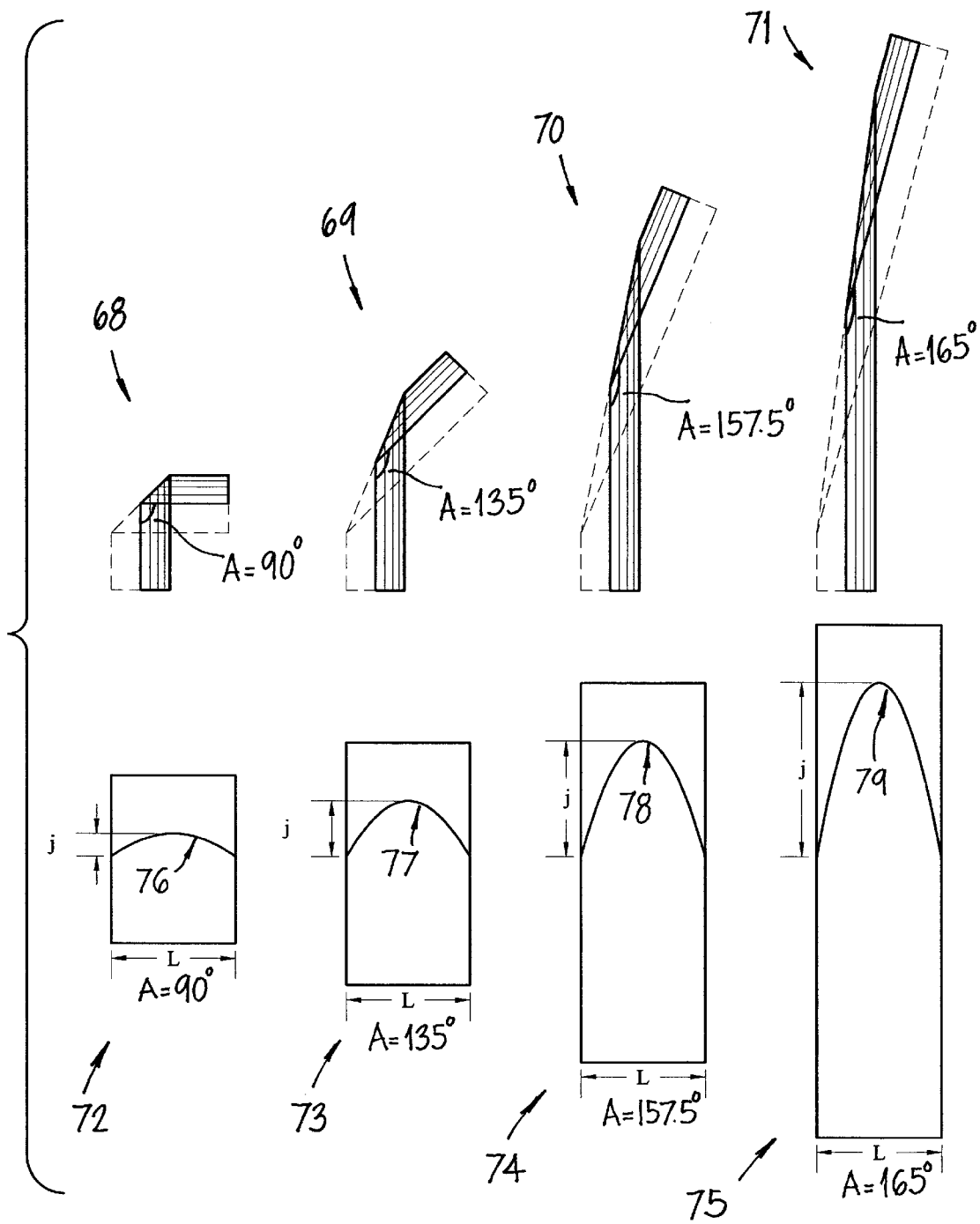
FIG. 14 shows the relation between the half-wave length L of the 2-dimensional sine wave and the angle of bend A. The amplitude j varies proportionally to L.

FIGS. 14 show four different curved surfaces with a single bend and their 3-dimensional geometric derivation. These single bends are combined to give three different curved surfaces with two bends in FIG. 5 and 6. By repeating the bends in different ways as shown in schematic sections in FIGS. 7–9, a variety of curved undulated structures can be obtained. The specifications of these embodiments and their variations follow. For each 3-dimensional embodiment, 2-dimensional scoring patterns are shown alongside to enable their manufacture from a sheet material.

Figure 1:
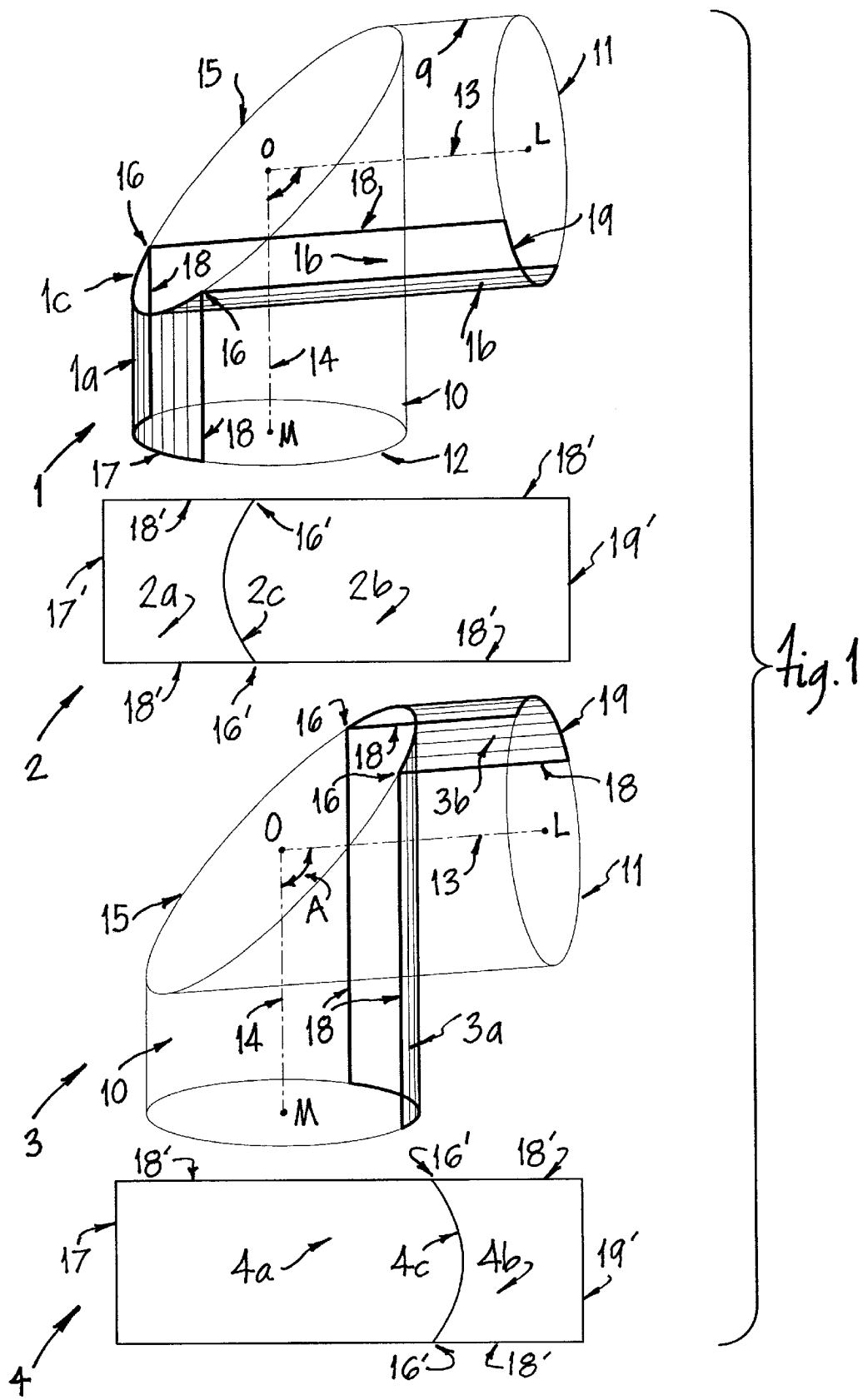
FIG. 1 shows two curved surfaces common to two cylinders intersecting at a fixed convex angle A, and the corresponding 2-dimensional scoring pattern for each of the surfaces.

FIG. 1 shows two different 3-dimensional curved surfaces 1 and 3, highlighted in bold lines in the illustrations, and their corresponding scoring patterns 2 and 4, respectively. Each curved surface is composed of two singly-curved parts, one concave and the other convex, which meet at a curved edge or fold The scoring pattern is a development of the surface and is a 2-dimensional sheet of a suitable material which is scored according to the unfolded geometry of the curved surface using suitable means of fabrication. The scored 2-dimensional sheet can then be folded or bent to obtain the 3-dimensional curved structure as a whole or in parts.

Surface 1 is composed of convex curved region 1$a$ and concave curved region 1$b$ folded at the curved edge 1$c$, and surface 3 is composed of convex curved region 3$a$ and concave curved region 3$b$ folded at the curved edge. Both surfaces are bound by curved edges 17 and 19 on either ends, pairs of straight and parallel edges 18 which bend at the points 16 at angle A and a curved edge shared by the two regions of the surface. The scoring patterns have 2-dimensional flat regions corresponding to the 3-dimensional regions of the curved surface. These regions are bound by corresponding straight and coplanar edges 17' and 19' on either ends, opposite parallel and coplanar edges 18', and a shared 2-dimensional curved and coplanar edge corresponding to the curved edge of the 3-dimensional surface. Scoring pattern 2 has two flat regions 2$a$ and 2$b$ corresponding to 1$a$ and 1$b$, respectively, and meeting at the plane curve 2$c$ corresponding to the edge 1$c$. Similarly, scoring pattern 4 is composed of regions 4$a$ and 4$c$ corresponding to 3$a$ and 3$b$, respectively, and meeting at the curve 4$c$ which corresponds to 3$c$.

As shown, each curved surface is obtained from the intersection of two cylinders 9 and 10 which meet at an angle A, where A is convex. The curved surface is common to both cylinders as one of its curved regions wraps around one cylinder and the other around the second cylinder, and the two regions meet at an edge common to both cylinders. Angle A is the angle AOL determined by the angle between the axes 13 and 14 of the two cylinders. All sections of the surface parallel to the plane AOL retain the same angle A, i.e. the surface has a curved fold with a constant angle A. The ends of the two cylinders are smooth closed curves 11 and 12 and the plane of intersection of the two cylinders is another closed curve 15. Curved edges 17 and 19 are portions of 11 and 12. When 11 and 12 are circles, 15 is an ellipse.

Curves 1$c$ and 3$c$ are plane curves, i.e. they are 2-dimensional curves and all of their points lie on the plane of intersection of the two cylinders. This is an interesting feature of the invention, that is, the convex and concave 3-dimensional parts of the curved surface meet at a 2-dimensional curved edge. The corresponding scoring sheet patterns 2 and 4 respectively contain the corresponding curves 2$c$ and 4$c$ required for scoring or bending. These curves are also plane 2-dimensional curves, but their geometry is different from the respective curves 1$c$ and 3$c$. In the case when intersecting cylinders are circular, the curved edges of the 3-dimensional structures are portions of an ellipse (a closed finite curve) arranged in a periodic wave-like manner, and the curved edges of the corresponding 2-dimensional pattern are respective portions of a sine-wave, an open infinite curve which undulates and has natural points of inflection located periodically along the curve. Thus the two curves, both of them waves, are completely different curves in their geometry and have different algebraic equations. It is this derivative 2-dimensional sine-wave pattern for scoring lines (edges of fold) on a sheet material which ensures that a 2-dimensional sheet material, when folded or bent at lines of folds using any physical means, will fold to its "natural" state in 3-dimensions without distortions of its 3-dimensional geometry, and hence without deformations of the material itself. Any deformations in the sheet material are restricted to the edges of the fold. This deformation-free property of the folded sheet structure, enabled by the geometry disclosed herein, guarantees a strain-free structure. For small-scale structures, this may not be a serious concern, and in some practical instances deformations may be allowed, but in large-scale structures deforming the material requires greater force in bending thereby restricting the size of the built structure. In deformation-free folded structures, this limitation is removed and large structures on an architectural scale, for example roofs and various structural surfaces, structural elements and space-defining structural surfaces, are possible. This is a unique feature that will run throughout this invention, especially in later sections when different scoring patterns and their corresponding 3-dimensional structures are described. This geometric characteristic is a key enabling feature for the fabrication methods of such curved undulated structures.

Figure 2:
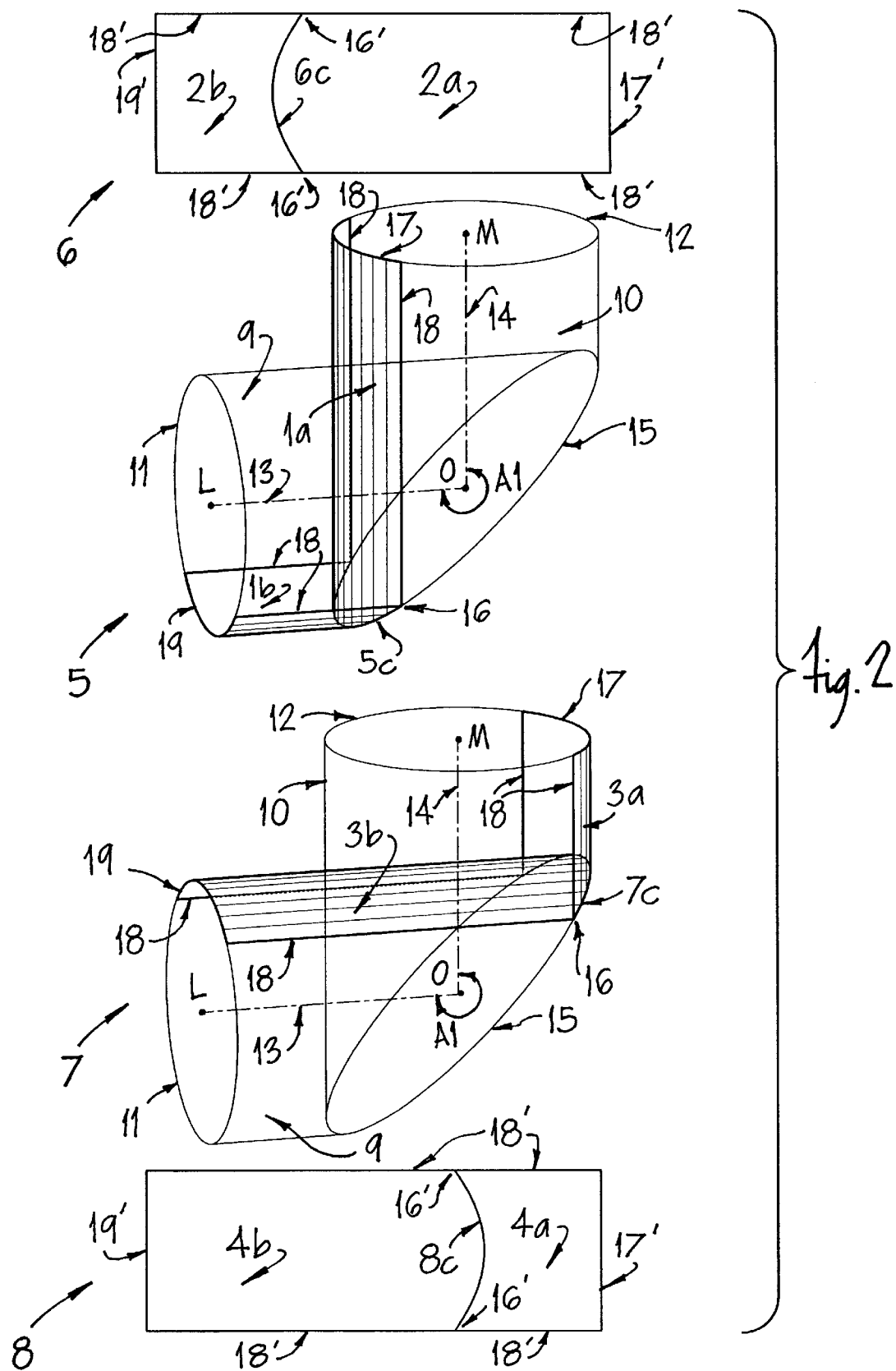
FIG. 2 shows two curved surfaces common to two cylinders intersecting at a fixed concave angle A1, and the corresponding 2-dimensional scoring pattern for each of the surfaces.

FIG. 2 shows two 3-dimensional curved surfaces 5 and 7, highlighted in bold lines in the illustrations, and their corresponding scoring patterns 6 and 8, respectively. These surfaces are similar to the ones in FIG. 1 and have corresponding parts, but here the generating cylinders 9 and 10 meet at a nonconvex angle A1. Surface 5 is composed of concave curved region 1b and convex curved region 1a folded at the curved edge 5c, and surface 7 is composed of convex curved region 3b and concave curved region 3a folded at the curved edge 7c. As before, each curved surface is bound by curved edges 17 and 19 on either ends, pairs of straight and parallel edges 18 which bend at the points 16 at non-convex angle A1 and a curved edge shared by the two regions of the surface. The scoring patterns have flat regions bound by edges 17', 18' and 19'. Scoring pattern 6 is composed of regions 2b and 2a which correspond to 1b and 1a, respectively, meeting at 6c which corresponds to 5c. Scoring pattern 8 is composed of 4b and 4a which respectively correspond to 3b and 3a, and meeting at 8c corresponding to 7c. The two surfaces have a curved fold with a constant non-convex angle A1. Curves 5c and 7c are plane curves, and the corresponding scoring curves 6c and 8c are also 2-dimensional though different.

Figure 3:
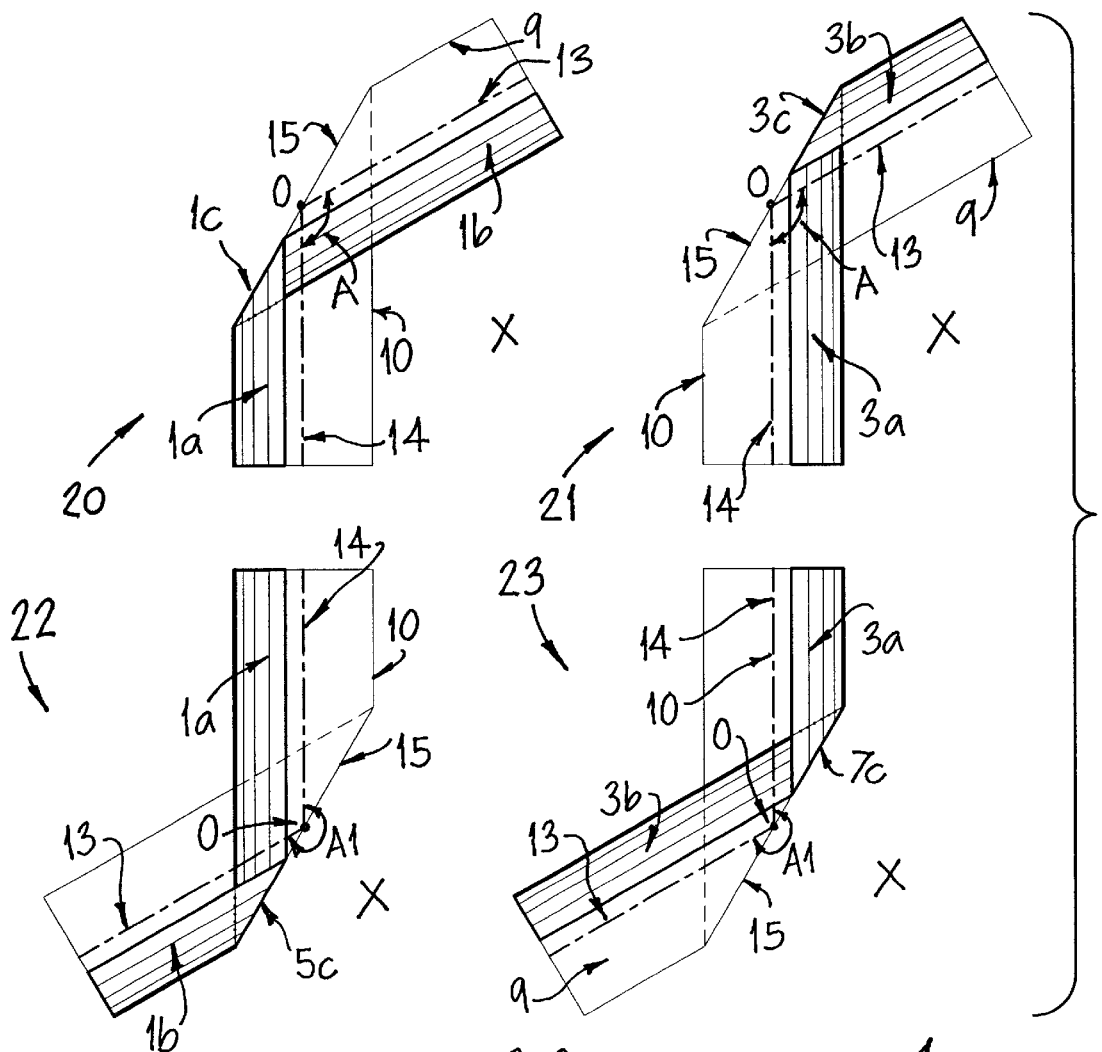
FIG. 3 shows the elevation views of the four cases of FIGS. 1 and 2.

FIG. 3 shows the corresponding elevations of the four surfaces in FIGS. 1 and 2. Elevation 20 corresponds to 1, 21 corresponds to 3, 22 to 5 and 23 to 7. It can be seen from this view that 20 and 22 make a pair, and 21 and 23 make a second pair, and the two surfaces within a pair are related to each other by a 2-fold rotational symmetry when juxtaposed around O. Further, in 20, 1b lies on the inner side of the axis 13 with respect to the region of space indicated by 'X' while 1a lies on the outside of the axis 14. This relationship holds true in 22. In 21 and 23, this relationship is reversed as 3b lies towards the outer side of the axis 13 with respect to 'X' while 3a lies towards the inner side of 14. This relationship of the regions of the curved structure with respect to their axes and space 'X', which could represent the "inside" of a structure, has design advantages which will be used later to compose a variety of structures.

Figure 4:
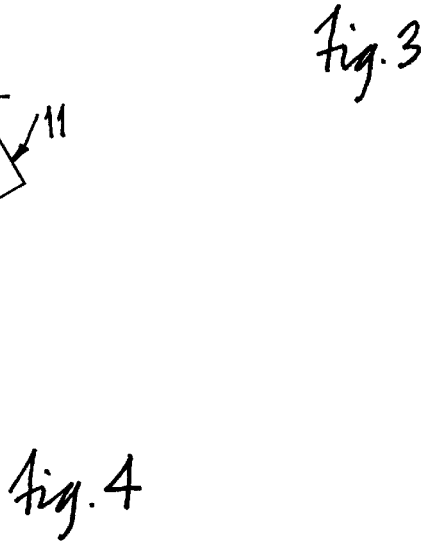
FIG. 4 shows the inclination angle A/2 of the plane of intersection of two cylinders.

FIG. 4 shows a schematic elevation view of intersecting cylinders 9 and 10 of FIG. 1. The axes 13 and 14 of the two cylinders meet at point O at an angle A. O is the center of the curve 15 (seen in its edge-on side view), which is coplanar with line IOJ and both lie on the plane of intersection common to the two cylinders. This plane is important since the curved edge of the folded structure lies on this plane. For fabrication purposes, it is important to specify this curve accurately, both in its 3-dimensional state and in its 2-dimensional scoring pattern. The former is needed when the structure in 3-dimensions is fabricated directly by a forming process like moulding, casting or pressing, the latter when the structure is folded or bent from a pre-scored sheet material. The inclination of 15 to the horizontal JK is necessary in computing and visualizing the plane of intersection, and is determined by the angle IJK where the angle JKL is a right angle. That is, JK lies on a plane perpendicular to the axis 13. 15 may also be visualized as a plane cutting 10 at angle IJK. Once the angle IJK is determined, the curve 15 can be easily determined by well-known known methods of computing the points on the curve and transferring these points on to their 2-dimensional development. In situations when OH is perpendicular to IJ, or 15, angle IJK equals A/2, a condition useful in making cylindrical folds which have adjacent convex and concave surfaces with the same curvature.

Figure 5:
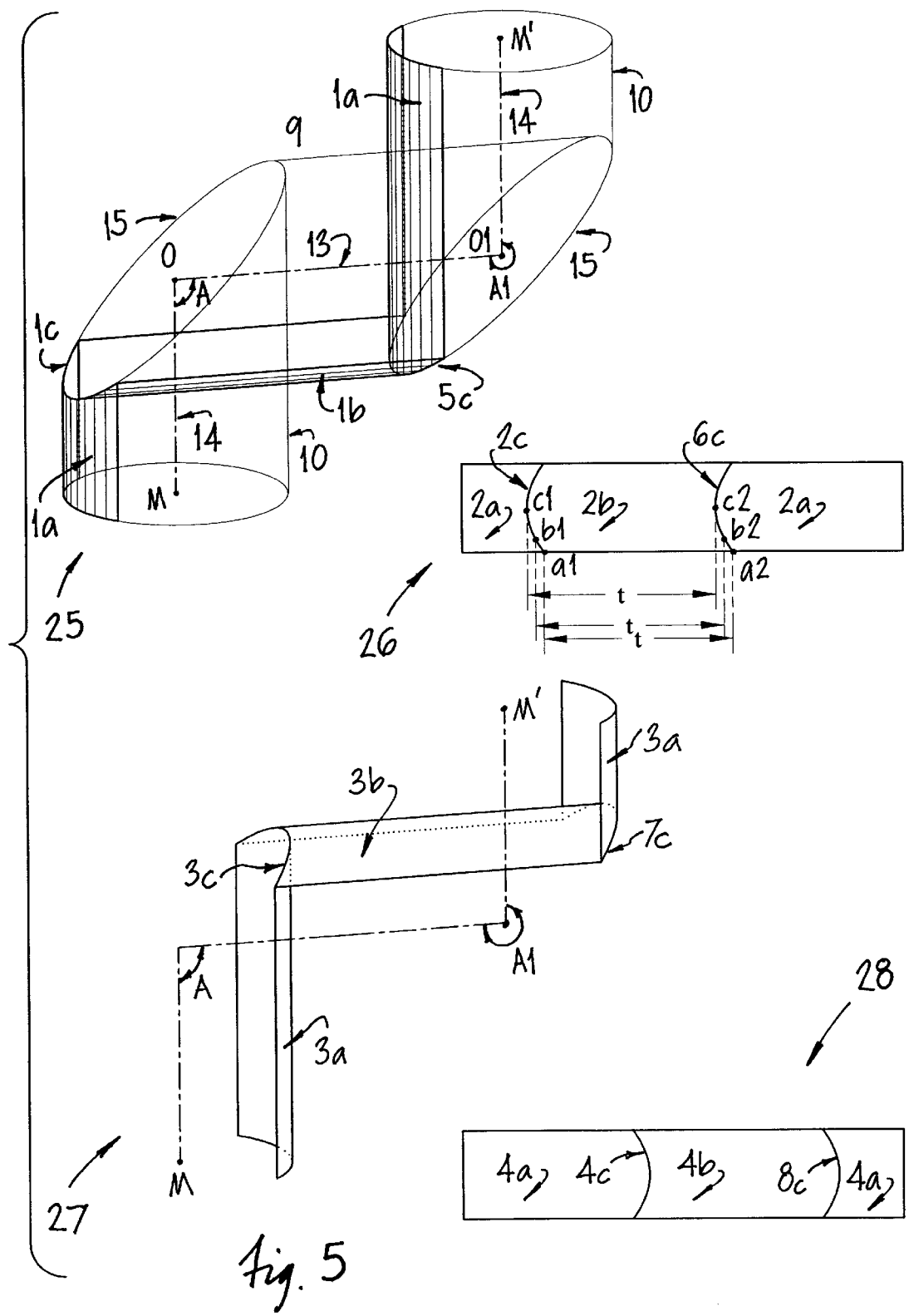
FIG. 5 shows a curved surface bent in a zig-zag manner at convex angle A and concave angle A1. The surface is common to three cylinders and is obtained by combining the two surfaces illustrated in the top portions of FIGS. 1 and 2. The corresponding scoring pattern is shown alongside.

FIG. 5 shows two curved surfaces 25 and 27, each composed of three parts which meet at a convex angle A and a concave angle A1. Surface 25 is composed of convex region 1a, concave region 1b and convex region 1a. The bend at edge 1c is at angle A and the bend at edge 5c is at angle A1. The axes of the three generating cylinders 10, 9 and 10 bend at points O and O1. The scoring pattern 26 shows the three corresponding regions 2a, 2b and 2a meeting at edges 2c and 6c. When angles A and A1 add up to 360°, the curves 2c and 6c are parallel and the horizontal translation distance 't' between all corresponding points along the curve is constant. For illustrative purposes, three points a1, b1 and c1 are shown along curve 2c and corresponding points a2, b2 and c2 are shown along curve 6c. The distance a1a2 equals distances b1b2 and c1c2. This distance-preserving property of the curves is a special case since the generating surfaces in this example are cylinders. Also, in this particular instance, the points M, O, O1 and M' are co-planar, and all sections of the curved structure parallel to this plane retain the same angles A and A1 at the bends. These are special conditions and, when relaxed, lead to more general structures. Surface 27 is composed of two concave segments 3a separated by the convex segment 3b. The bend at edge 3c is at convex angle A and that at edge 7c is at concave angle A1. The curvatures of the segments are reversed from those in 25. The scoring pattern 28 has curved edges 4c and 8c corresponding to 3c and 7c, respectively, and plane regions 4a separated by 4b corresponding to segments 3a and 3b, respectively.

Figure 6:
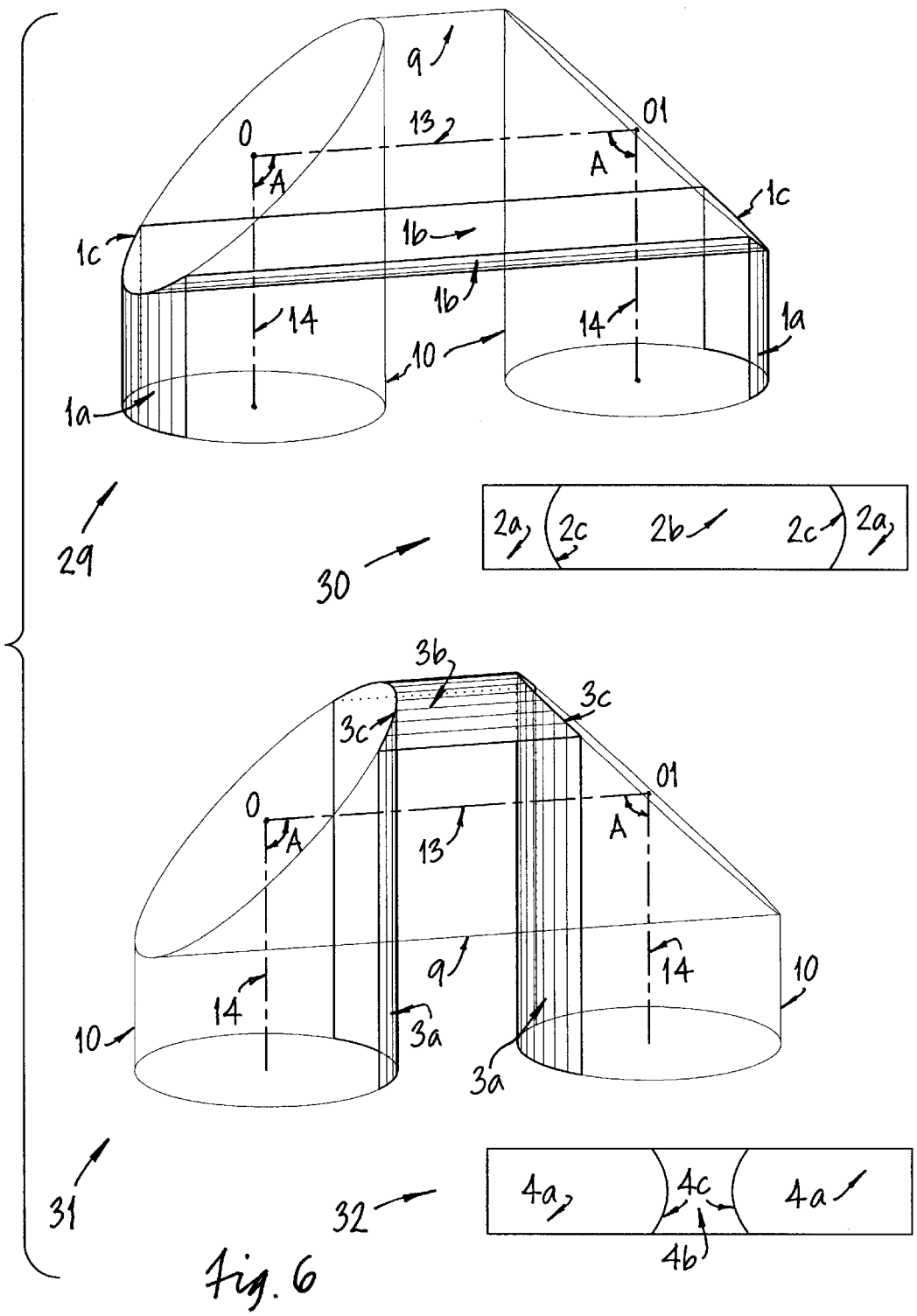
FIG. 6 shows two different curved surfaces, each bending at two successive convex angles A, and obtained from three cylinders meeting in a U-formation (U is shown upside down). The corresponding scoring pattern is shown alongside for each.

FIG. 6 shows two structures 29 and 31, each having two folds, both bending at convex angles A along with their respective scoring patterns 30 and 32. Such free-standing structures would be suitable for doorways, entrances, arches, framing members and as modules of larger structures. Structure 29 comprises the concave surface 1b flanked by convex surfaces 1a one each side and folded at edge 1c. It is derived from the intersection of cylinder 9 meeting two cylinders 10. Its scoring pattern 30 is composed of regions 2a corresponding to 1a and 2b corresponding to 1b, meeting at edges 2c corresponding to 1c. Structure 31, also obtained by the intersection of cylinder 9 with two cylinders 10, is composed of a convex surface 3b flanked by concave surfaces 3a. The corresponding scoring pattern 32 has corresponding regions 4a and 4b meeting at edges 4c.

Figure 7:
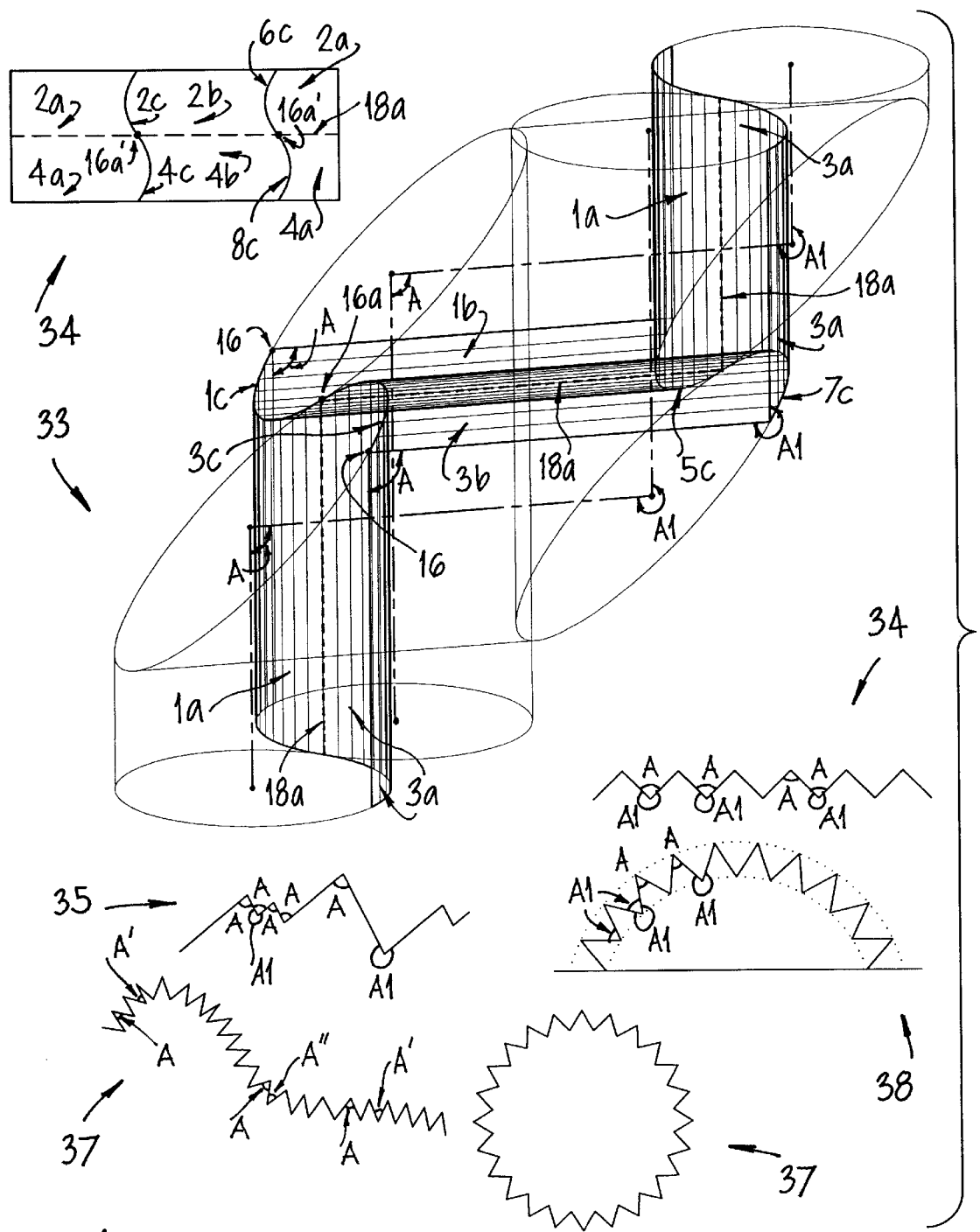
FIG. 7 shows an undulated surface common to six cylinders obtained by translating the three-cylinder configuration of FIG. 5 (top illustration) in a direction perpendicular to this sheet of the paper. The corresponding scoring pattern is shown alongside. The surface bends alternatingly at convex and concave angles. Schematic sections of corrugated structures are also shown.

FIG. 7 shows a curved structure 33 and its scoring pattern 34 and various sections 34–38 of structures derived from structure 33. 33 bends at convex angle A and concave angle A1. It is obtained by joining surfaces 27 and 25 of FIG. 5 at the common edge 18a. The edge 18a indicates a hypothetical line of demarcation in cases of smooth surfaces made from one sheet. In case of modular surfaces composed of 25 and 27 as separate modules, the edge 18a can be a suitably detailed physical element, like a flange for example, for connecting the two pieces. The curved edges 1c and 3c join at 16a to complete one cycle of a continuous wave. Similarly, curved edges 5c and 7c make a cycle of a wave. Pattern 33 shows the two separate 2-dimensional sine waves, one comprising segments 2c and 4c meeting at 16a' and the other comprising 6c and 8c, also meeting at 16a'; the line 18a' represents the line of demarcation corresponding to 18a in the 3-dimensional structure. Regions 2a and 4a become 1a and 3a, respectively, in the curved state to make two of the three undulated segments of 33; regions 2b and 4b make the third undulated segment consisting of surfaces 1b and 3b.

The alternating convex and concave angles of the folds in the structure 33 can be extended to generate a variety of curved folded structures. Some possibilities are shown in schematic sections 34–38. When angles A and A1 add up to 360 degrees, the two wave segments, in the 2-dimensional as well as the 3-dimensional states, are identical and parallel curves and can be obtained by translating one wave along the line of translation by a fixed distance. This condition leads to a corrugation with a periodic (repetitive) section like 34 where the alternating interior and exterior angles are the same. The section is a variation with the same angular condition but with the difference that the folds are unequal. Section 36 shows the convex enclosure with the condition that the sum of alternating angles A and A1 is less than 360 degrees. The exterior angle A' is greater than the interior angle A. Section 38 shows a complete polygonal section with the same angle condition as 36. Section 37 shows an undulated profile having two convex portions joined by a concave portion. In the concave portion, exterior angle A" is less than interior angle A and in the convex sections exterior angle A' is greater than interior angle A as in 36.

Figure 8:
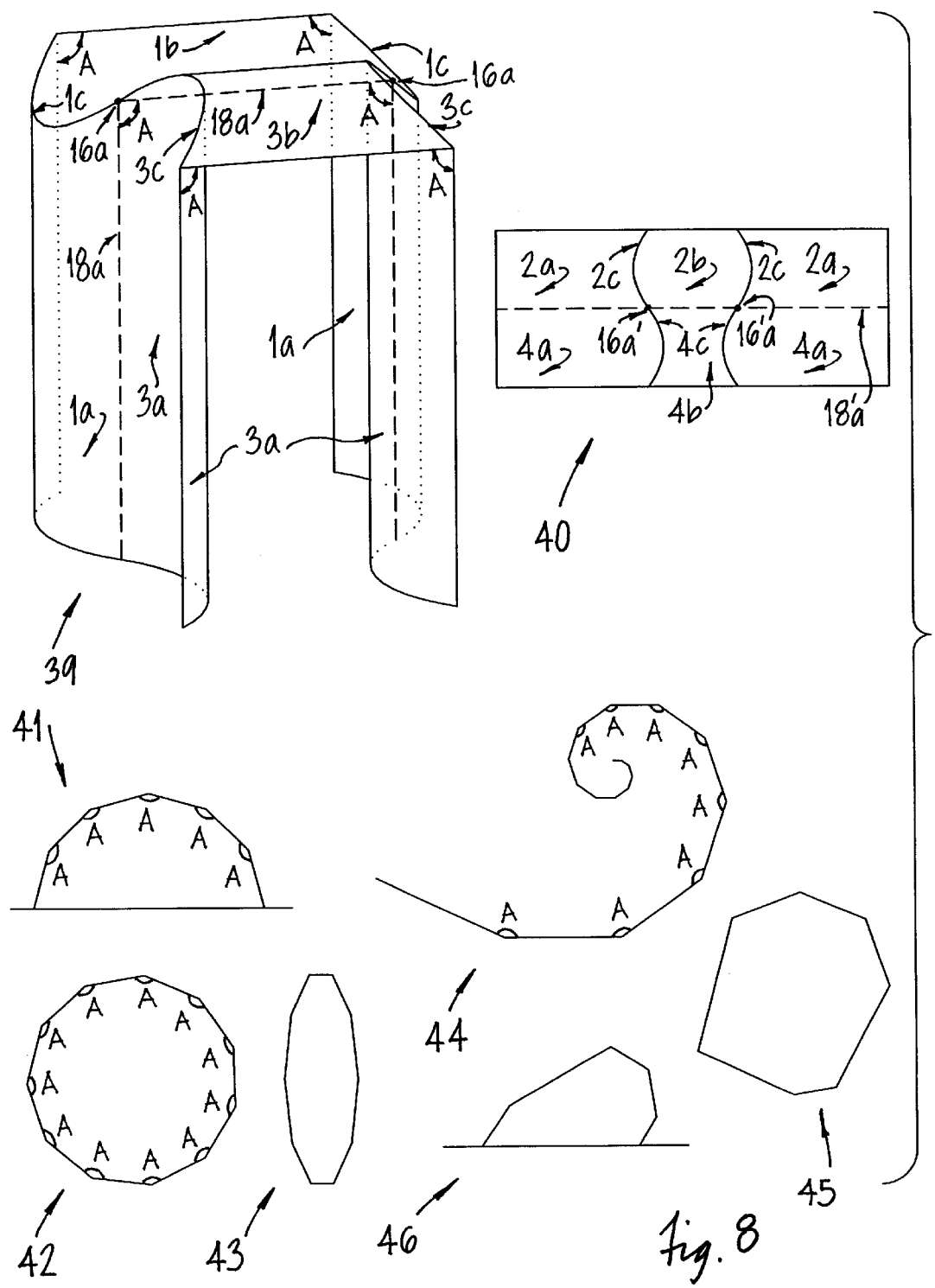
FIG. 8 shows an undulated surface obtained by joining the two surfaces of FIG. 6. The corresponding scoring pattern is shown alongside. The surface bends at convex angles. Various profiles with convex bends are also shown.

FIG. 8 shows the structure 39, its scoring pattern 40, and various sections of surfaces related to 39. Structure 39 is bent only at convex angles A and is obtained by fusing the two surfaces 29 and 31 of FIG. 6. It has mirror symmetry and is composed of two side portions, each comprising a concave surface 3a and convex surface 1a meeting at the line of demarcation 18a. The middle portion comprises convex surface 3b and concave surface 1b, also meeting at 18a. The curved edge at the fold comprises edge portions 3c and 1c which meet at 16a in a smooth wave. The surfaces meet such that a convex region alternates with a concave region in both directions. In the corresponding scoring pattern 40, the plane edges 4c and 2c meet at 16a' in a smooth sine wave. Each sine wave is arranged symmetrically around a central mirror plane, and line 18a' separates the front portion composed of regions 4a, 4b and 4b from the back portion composed of portions 2a, 2b and 2a. 40–45 show variations of 39 in section. 41 shows a cross-section through a six-sided vault with convex interior angles A at the folds. 42 is a 11-sided convex polygonal section with equal interior angles, and 43 is a 10-sided convex polygonal section (a zonogon) with unequal sides and angles but with opposite sides parallel. 44 is a section through an open-ended spiral polygon (an equi-angular spiral or a logarithmic spiral) with equal interior angles. 45 is an irregular 7-sided convex polygonal having unequal lengths and unequal interior angles, and 46 is a section through a tilted vault with an irregular and convex polygonal section.

Figure 9:
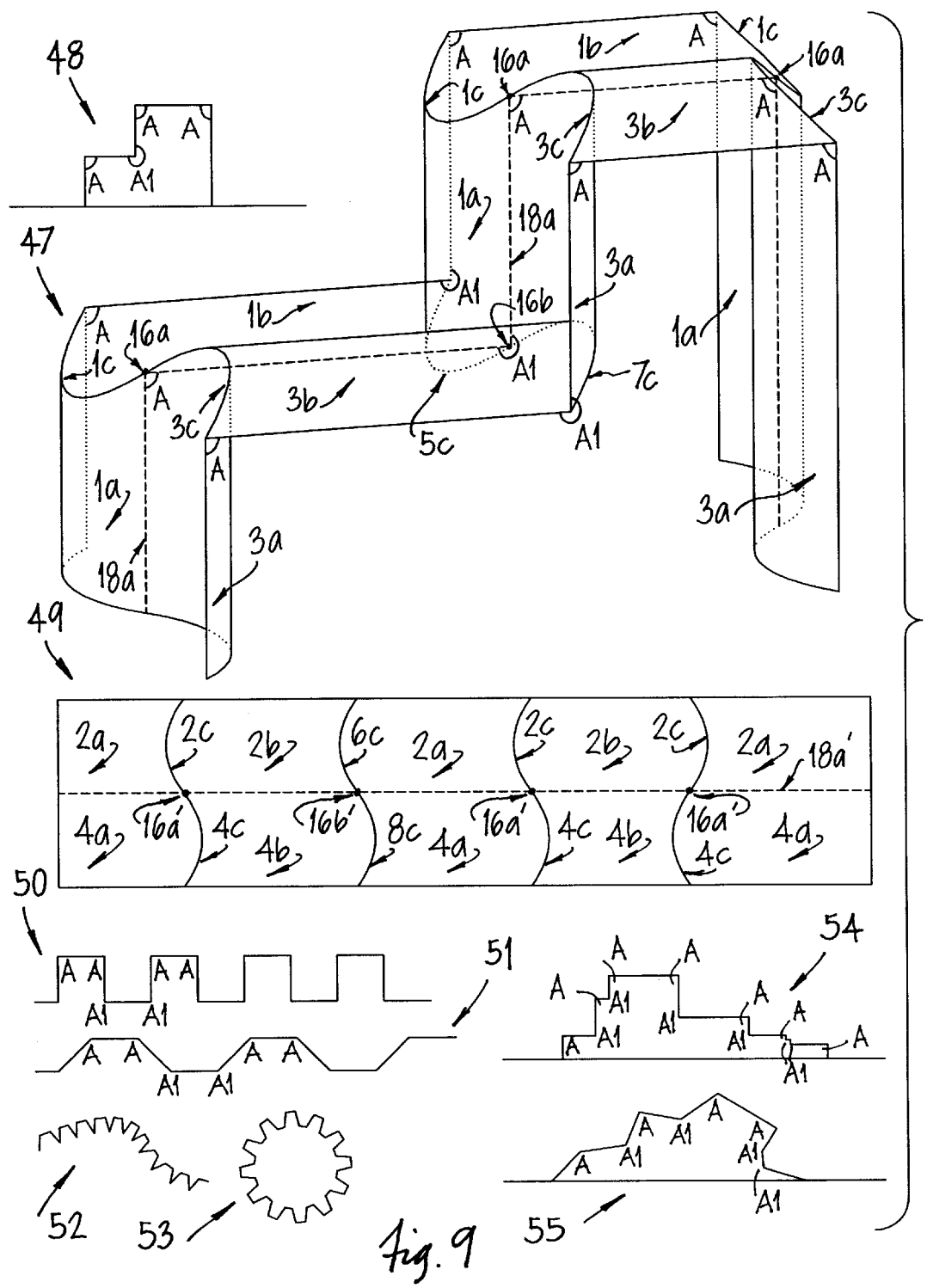
FIG. 9 shows a portion of a curved surface having four bends in the following sequence (from left to right): convex, concave, convex and convex. Various schematic profiles of corrugated surfaces and architectural enclosures are also shown.

FIG. 9 shows a structure 47 with its schematic section 48 and scoring pattern 49; sections through related structures are shown in 50–55. Structure 47 is a composite structure combining the features of structures 33 and 39. In its 2-dimensional pattern, it has parallel wave curves as well as reflective symmetry. The interior angles follow the sequence A, A1, A, A for the four folds as shown in the schematic section 48 which indicates an L-shaped architectural space enclosure. The surface of 47 combines a zig-zag fold with folds having a reflective symmetry. The convex and concave segments alternate in both directions, across as well as along the surface. These segments meet at points of inflection 16a at convex bends and 16b at concave bends. In the 2-dimensional pattern 49, these correspond to the points of inflection 16a' and 16b'. In the first row of the transverse direction of the structure, the plane regions follow the sequence 4a, 4b, 4a, 4b and 4a (reading from left to right) and correspond to the sequence 3a, 3b, 3a, 3b and 3a of convex and concave curved segments in 47. Along the second row in 49, the sequence 2a, 2b, 2a, 2b and 2a of plane segments corresponds to the sequence 1a, 1b, 1a, 1b and 1a of curved segments in 47. The plane edge segments 2c, 4c, 6c and 8c in 49 correspond to the edge segments 1c, 3c, 5c and 7c, respectively, in 47. 50–55 show variations and derivations of 47. 50 is a right-angle folded structure with a periodic interior angle sequence of A, A, A1, A1, A, A, A1, A1 . . . where A is convex and A1 is concave and equals 360 degrees minus A. 51 is a variant of 50 with the same angle sequence but with A being greater than 90 degrees. 52 and 53 are curved versions of 51; 52 comprises a convex and a concave portion and 53 is based on a regular polygon. 54 and 55 are sections through architectural enclosures and are complex versions of 48 having irregular sequences of angles A and A1. 54 has a rectilinear geometry and 55 has an irregular profile with unequal angles and lengths.

Figure 10:
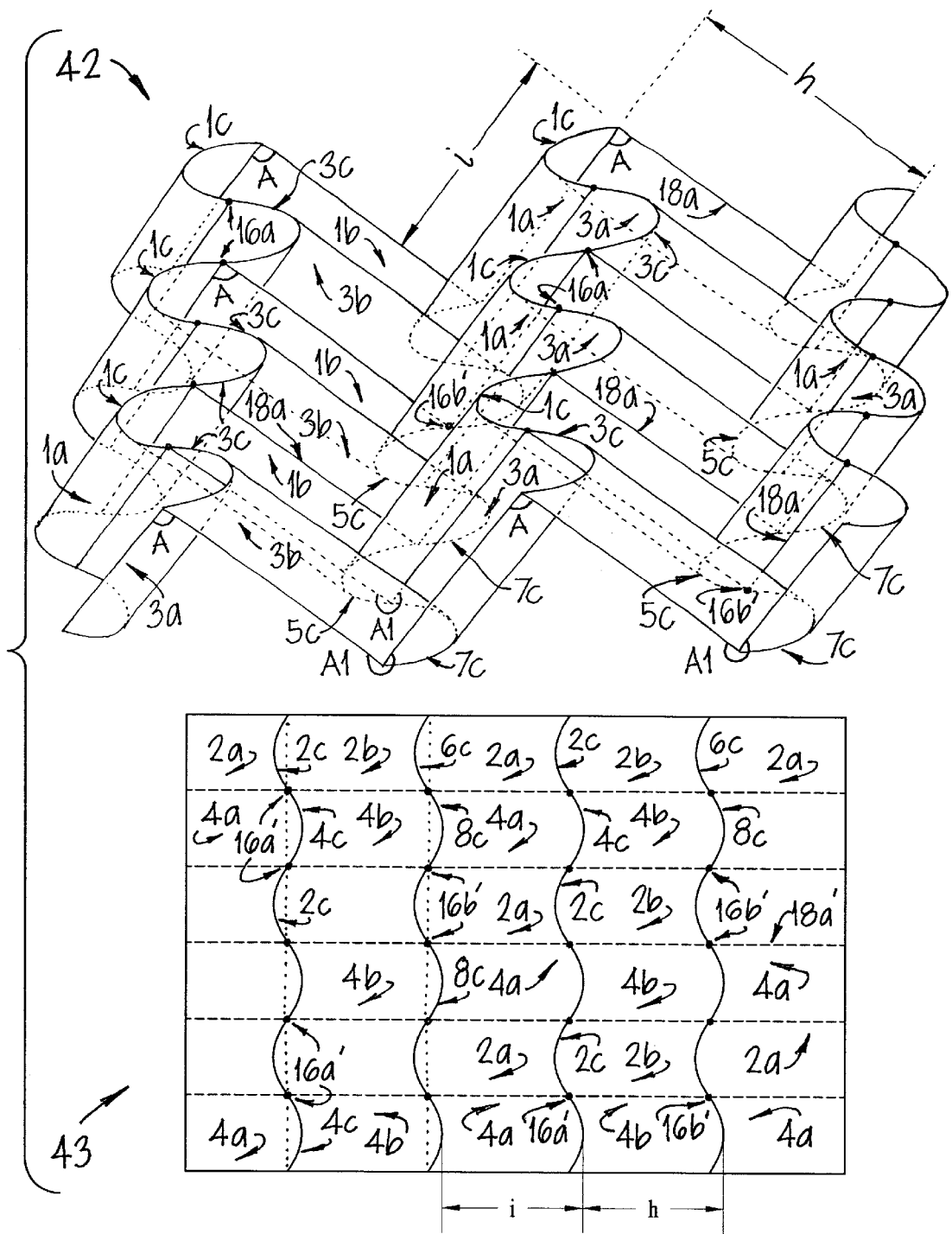
FIG. 10 shows a portion of a periodic undulated surface bending alternatingly at convex and concave angles, and obtained by continuing the surface of FIG. 7 in two directions. The surface has a zig-zag cross-section. The corresponding scoring pattern is shown alongside.

FIG. 10 shows details of a periodic undulated structure 42 based on 34 in FIG. 7. In its elevation view (and also in the transverse section), it has a zig-zag fold at alternating angles A and A1. In its plan view it has parallel waves. It is thus a 2-directional corrugation, having a corrugation in plan as well as in its elevation. It is composed of two sets of alternating undulated surfaces, each oriented along the longitudinal direction (perpendicular to the plane of paper in the drawing shown here), and bent at wavy curved edges. The undulated surfaces meet each other in an alternating manner (also along the longitudinal direction) such that the convex portion of one undulation is adjacent to the concave portion of the second undulation. One undulation comprises concave region 1b alternating with convex region 3b, the second undulation comprises the convex region 1a alternating with concave region 3a such that 1b and 1a meet at a common edge 1c at the convex bend and at 5c at the concave bend. Edges 1c and 5c meet at points of inflection 16b. Similarly, 3b and 3a meet at edge 3c at the convex bend and at 7c at the concave bend, and 3c and 7c meet at points of inflection 16a. The line 18a indicates the line of demarcation between the convex and concave segments along the longitudinal direction. 2-way corrugations, as in 42, are expected to be structurally advantageous since the moment of inertia in increased in two planes, as opposed to one plane in the standard (1-way) corrugation.

The corresponding scoring pattern 43 has the first longitudinal undulation comprising alternating regions 2b and 4b and the second adjacent undulation comprising alternating regions 2a and 4a. The wave of intersection is composed of alternating curved edge segments 2c and 4c . Along the transverse direction, the lines 18a' mark the separation between the row segments, and join the points of inflections 16a' and 16b'. A row segment consisting of alternating regions 2b and 2a alternates with the row segment consisting of alternating regions 4b and 4a. The region 2a corresponds to the 3-dimensional surface 1a in 42, 2b corresponds to 1b, and regions 4a and 4b correspond to the 3-dimensional regions 3a and 3b in 42. The wave comprising segments 2c and 4c corresponds to the convex bend at the ridges of the 3-dimensional corrugation, and the wave comprising segments 6c and 8c corresponds to the concave bend in the valleys of the 3-dimensional corrugated surface. The two waves alternate in the scoring pattern. The distance between the successive waves equal i and h as shown in 42 and 43; this distance is measured by the crest to crest, or trough to trough, or between points 16a and 16b, or 16a' and 16b'.

Figure 11:
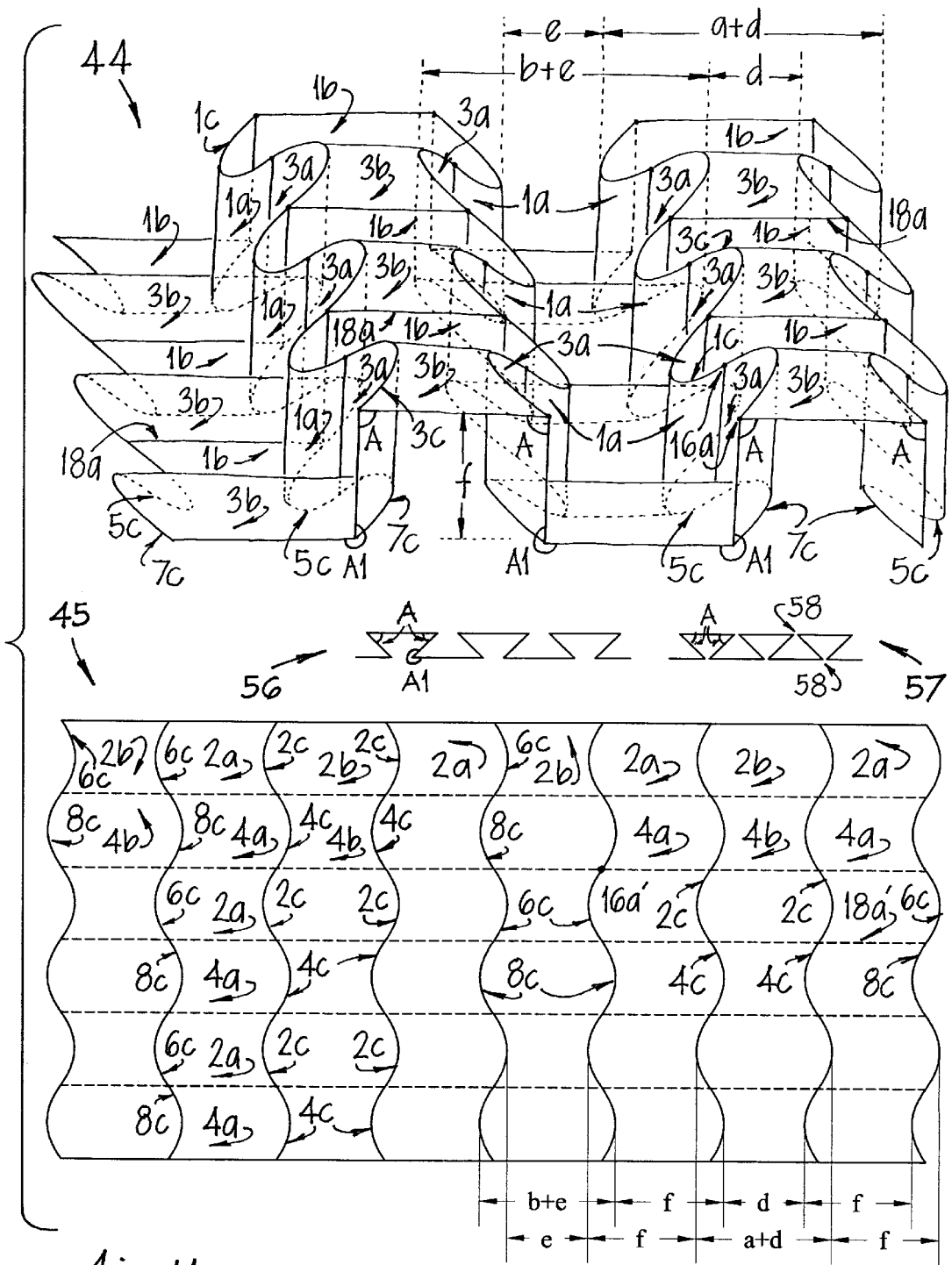
FIG. 11 shows a portion of a periodic undulated surface with two convex bends alternating with two concave bends. The scoring pattern is shown alongside.

FIG. 11 shows a curved 3-dimensional wavy corrugated structure 44 along with its corresponding scoring pattern 45. Its transverse section corresponds to section 50 in FIG. 9. This structure is corrugated in three directions. In the 2-dimensional pattern 45, one horizontal row of plane segments (separated by the horizontal dotted lines) are in the sequence 2b, 2a, 2b, 2a, 2b, 2a, . . . , and correspond to the sequence of 3-dimensional curved segments 1b, 1a, 1b, 1a, 1b, 1a, . . . in 44. The alternating horizontal row of plane segments 4b, 4a, 4b, 4a, 4b, 4a, . . . in 45 correspond to the 3-dimensional curved segments 3b, 3a, 3b, 3a, 3b, 3a, . . . in 44. The two alternating 2-dimensional sine waves in 45, one comprising segments 6c and 8c and meeting at points of inflection 16b', and the other comprising segments 2c and 4c meeting at points of inflection 16a', correspond to the two alternating 3-dimensional wave edges. One of these wavy edges comprises segments 5c and 7c located at the concave bends and meeting at points of inflection 16b. The other comprises segments 1c and 3c located at the convex bends and meeting at points of inflection 16a. At each edge segment of the 3-dimensional structure, a convex region of the surface meets a concave region of the surface. The section profile has two convex angles A alternated by two concave angles A1 in a rectilinear undulation. The widest and narrowest distances on the top surface equal b+e and d, respectively, and at the bottom surface equals a+d and e, respectively. The height of the fold equals f.

Variations of 44 can be made according to section 51 in FIG. 9 or 56 and 57 in FIG. 11. In 56 and 57, angles A is less than a right angle, and in 57 the surface has points of contact 58 at the top and bottom of the section. In the latter case, this produces a triangulated section which makes the corrugations stronger than those with non-triangulated sections. 3-way corrugations are expected to be stronger since the moment of inertia is increased in three different planes (Cartesian planes in this case) as opposed to being constrained in one single plane as in the case of standard corrugations.

Figure 12:
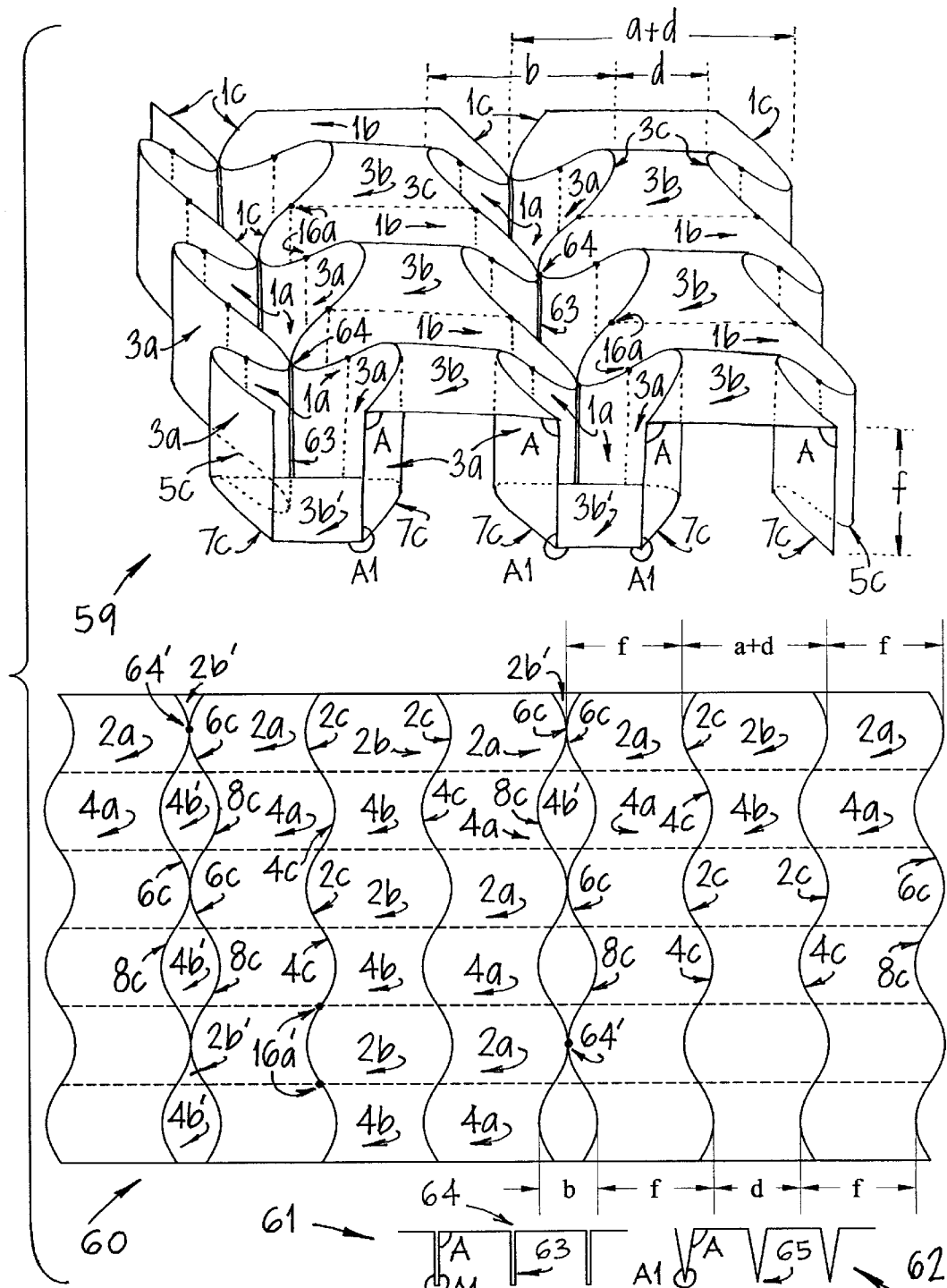
FIG. 12 shows a portion of a periodic undulated surface, and its scoring pattern, derived from FIG. 11 by shrinking the portions between concave bends such that the surface has points of contact between the portions bound by convex bends.

FIG. 12 shows a 3-dimensional wavy corrugated structure 59 along with its 2-dimensional scoring pattern 60. It is a derivative of 45 and is obtained by shrinking the curved regions between the concave bends (i.e. by setting e=0 and keeping a, b, d and f unchanged), so that the surface has points of contact 64 in 59 and corresponding points 64' in 60. The surface meets at lines of contact 63. Section 61 is through the points 64, while section 50 corresponds to all other transverse sections of the surface. In the variant section 62, there are points of contact 65 at the bottom part of the section. 59 is composed of three different portions, the upper horizontal portion, the vertical portion and the lower horizontal portion of the surface. The upper horizontal portion of the corrugation is composed of curved regions 1b and 3b which alternate; in the scoring pattern, the corresponding alternating regions are 2b and 4b. The vertical portion is composed of curved regions 1a and 3a which also alternate; in the scoring pattern, these correspond to regions 2a and 4a. The bottom horizontal portion is composed of alternating regions 1b' and 3b'; in the scoring pattern, these correspond to 2b' and 4b'. The surface 59 bends at convex angle A at curved wavy edges on the top portion and composed of alternating segments 1c and 3c meeting at 16a; in the scoring pattern, these correspond to the sine waves composed of alternating segments 2c and 4c meeting at 16a'. In the bottom portion, the surface bends at concave angles A1 at wavy edges composed of alternating segments 5c and 7c which meet at 16b; in 60, these correspond to 6c and 8c which meet at 16b'. Note the region 2b and 2b' are considered as single regions though they are in fact composed of two separate regions meeting at the points of contact.

Figure 13:
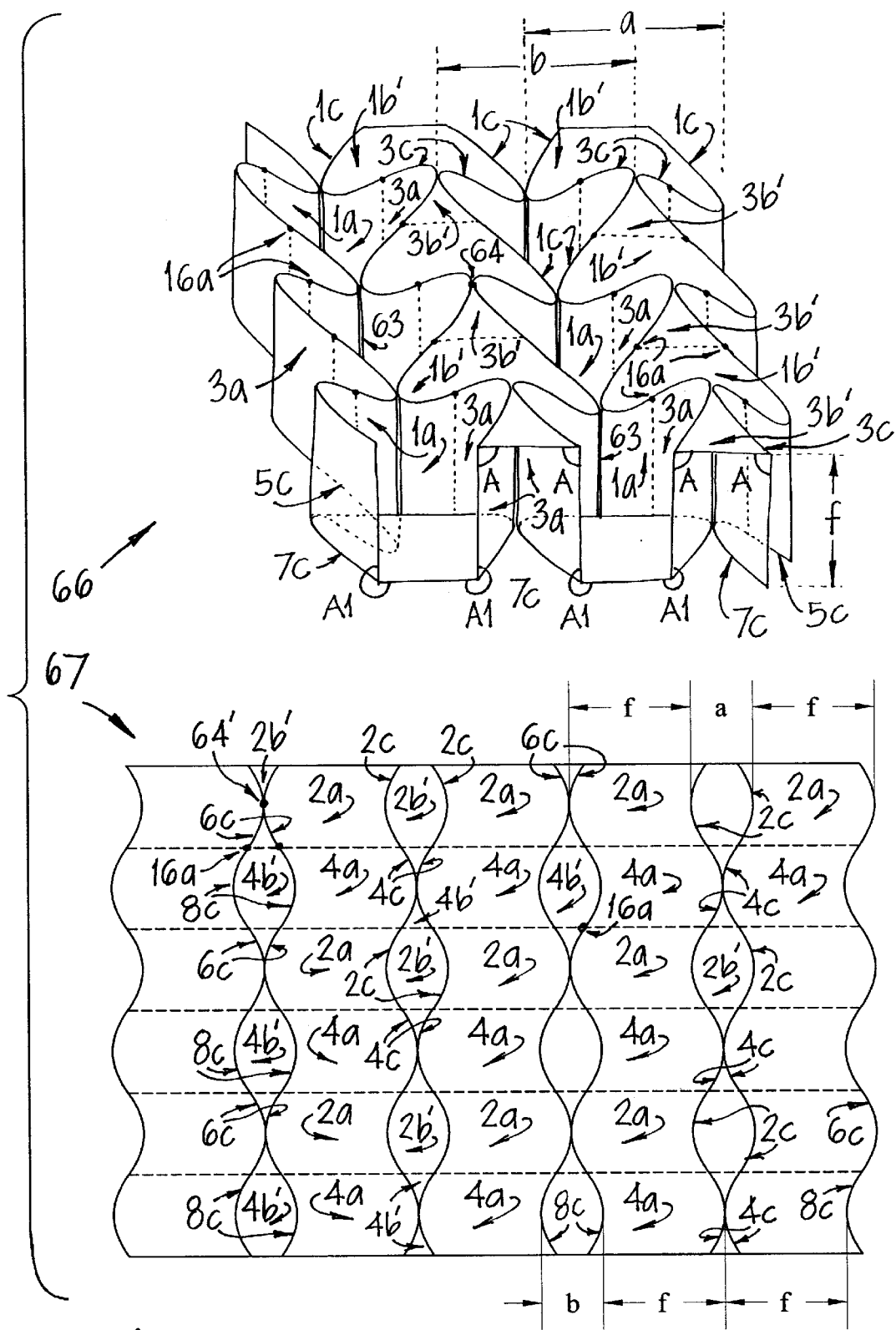
FIG. 13 shows a portion of a periodic undulated surface, and its scoring pattern, derived from FIG. 12 by shrinking the portions between the convex bends. This corrugation has additional points of contact.

FIG. 13 shows a 3-dimensional wavy corrugated structure 66 along with its 2-dimensional scoring pattern 67. It is a derivative of 59 obtained by shrinking the curved regions between the convex bends (i.e. by setting d=0 and keeping a, b and f unchanged) such that the corrugated surface has points of contact 64 at top and bottom portions, with corresponding points 64' in the scoring pattern. The surface meets at additional lines of contact 63. 66 is also composed of three different portions, the upper horizontal portion, the vertical portion and the lower horizontal portion of the surface. The upper horizontal portion is composed of curved regions 1b' and 3b' which alternate; in the scoring pattern, the corresponding alternating regions are 2b' and 4b'. The vertical portion is composed of curved regions 1a and 3a which also alternate; in the scoring pattern, these correspond to regions 2a and 4a. The bottom horizontal portion is composed of alternating regions 1b' and 3b'; in the scoring pattern, these correspond to 2b' and 4b'. The surface 59 bends at convex angle A at curved wavy edges on the top portion and composed of alternating segments 1c and 3c meeting at 16a; in the scoring pattern, these correspond to the sine waves composed of alternating segments 2c and 4c meeting at 16a'. In the bottom portion, the surface bends at concave angles A1 at wavy edges composed of alternating segments 5c and 7c which meet at 16b; in 67, these correspond to 6c and 8c which meet at 16b'. Note that the region 2b' and 3b' are considered as single regions.

The design of specific architectural structures based on the invention requires specifying the following key geometric features: size undulations, angle of bend, extent of bend, extent of wave, number of segments in the cross-section of the structure and number of sides of the source polygon from which the cross-section of the structure is derived. Some of these features are described next, followed by various embodiments. Additional features and embodiments are described subsequently.

Size of undulations: This is specified by the length, width and depth of the 3-dimensional half-wave segment, and also by the distance between adjacent waves.

Angle of bend of the fold, i.e. the convex angle A or concave angle A1, mentioned earlier: This angle is a critical parameter and determines the precise proportion of the wave segment, i.e. the ratio of the amplitude j to the half-wave length L. The amplitude increases with the angle A or A1, i.e. the greater the angle of bend, the deeper the curves. Varying this parameter impacts both visual and structural design considerations. FIG. 14 shows portions of various sine waves as the angle increases from 90° to 135° to 157.5° to 165° in the folds 68–71, respectively. The corresponding plane scoring patterns 72–75 show the increasing value of j for a constant L for the associated 2-dimensional curves 76–79 which define the respective half-wave segments shown.

Figure 15:
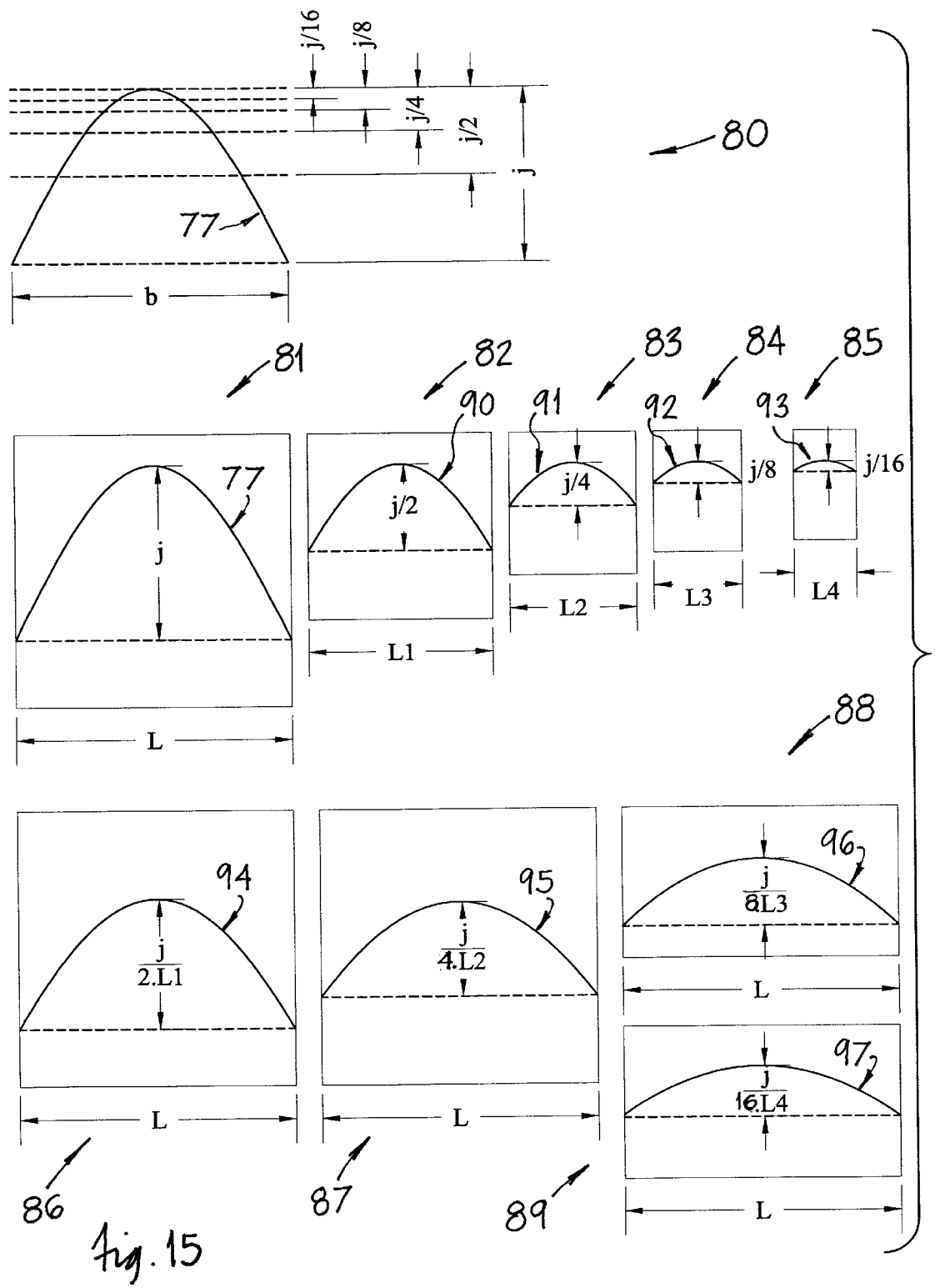
FIG. 15 shows different proportions of half-wave segments for a fixed angle of bend A or A1 obtained by diminishing the amplitude j and by either varying the L proportionally or by keeping L fixed.

Extent of bend, variable j: This is the amplitude of the selected portion of a half-wave segment used in the design of a particular structure as shown in FIG. 15 for the 2-dimensional curve 77. In 80, the amplitude is divided into any number of convenient segments in equal or unequal units. Here it is shown by successive halving of the initial amplitude j to obtain new values of the amplitude which equal j/2, j/4, j/8 and j/16, keeping L constant. The resulting half-wave segments 77 and 90–93 are shown respectively in 81–85. As j decreases, L decreases correspondingly to L1, L2, L3 and L4 as shown. The choice of the extent of wave segment has structural ramifications as shallower curves are relatively weaker. Aesthetic considerations also determine the choice of a specific curve as shallower curves look more subtle and blend better with plane surfaces while deeper curves provide a greater contrast visually and spatially. This is shown in 86–89 for half-wave segments having a fixed L, where the curves 94–97 are similar to the curves 90–93, respectively, but are scaled so that the amplitude increases inversely to their half-wave lengths. For example, the amplitude j/2 of curve 90 becomes (j/2)/L1 in the scaled curve 94, the amplitude j/4 of 91 is scaled to (j/4)/L2, and so on.

Figure 16:
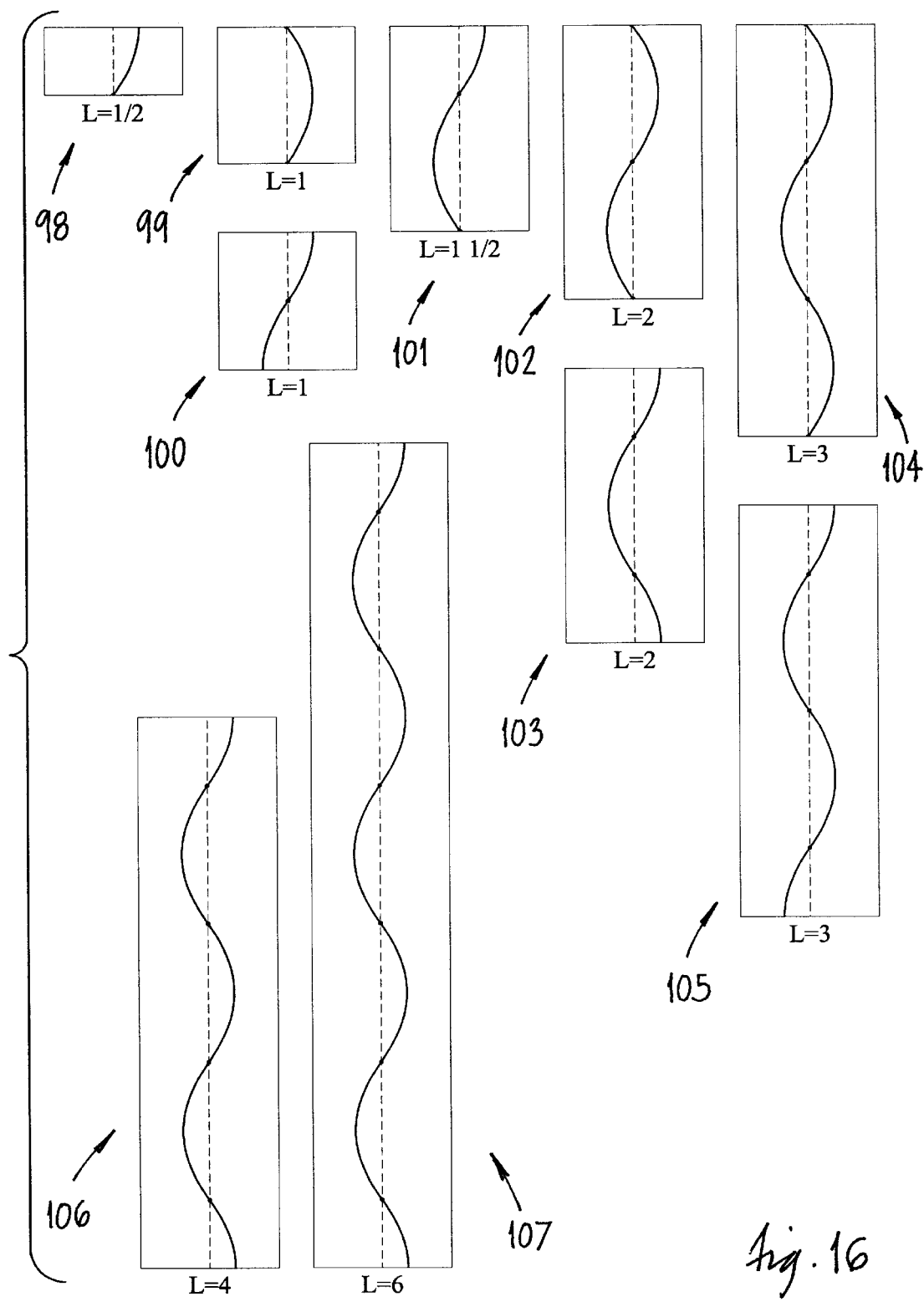
FIG. 16 shows different values of 1 representing the number of half-wave segments in the selected portion of the wave for a fixed values of amplitude j, half-wave length L, and angle of bend A or A1.

Extent of wave, l: This specifies the number of half-wave segments along the curved surface. These half-wave segments are 2-dimensional portions which can be repeated to generate the 2-dimensional wave for the scoring pattern. In FIG. 16, a few examples are shown for the 2-dimensional waves having different values of l, with l=½ in 98 (equal to one fundamental region), l=1 in 99 and 100, l=1½ in 101, l=2 in 102 and 103, l=3 in 104 and 105, l=4 in 106 and l=6 in 107.

Number of segments, r: This specifies the number of segments in the transverse cross-section of the structure. It equals the number of segments in the fundamental region multiplied by the number of fundamental regions in the cross-section. It is also related to the number of bends in the cross-section of the structure. In structures with polygonal cross-sections, it relates to p described below. It is useful to have different variable for the number of segments in the fundamental region. It is also useful to have a different variable for the number of segments in the structure for cases where the number is less than those derived from p.

Number of sides of the source polygon, p: This is the number of sides of the polygon on which the cross-section is based. For columnar structures, p has a finite value. For planar panel-type structures, p equals infinity. In the latter cases, the extent of the structure is defined by r.

FIGS. 17–32 show various columnar embodiments of the invention obtained by varying some of the geometric features described above. The 3-dimensional form of the columns and their 2-dimensional scoring patterns are shown alongside. These structures could be or varying sizes from small objects a few inches high, to furniture items a few feet high, to elements of a frame structure from a few feet to substantially larger sizes, to architectural columns of a single-storey or double-storey height, or more. Structures on a much larger scale like entire multi-storey buildings, towers and obelisks, and miscellaneous linear structures are also possible based on these columnar embodiments.

Figure 17:
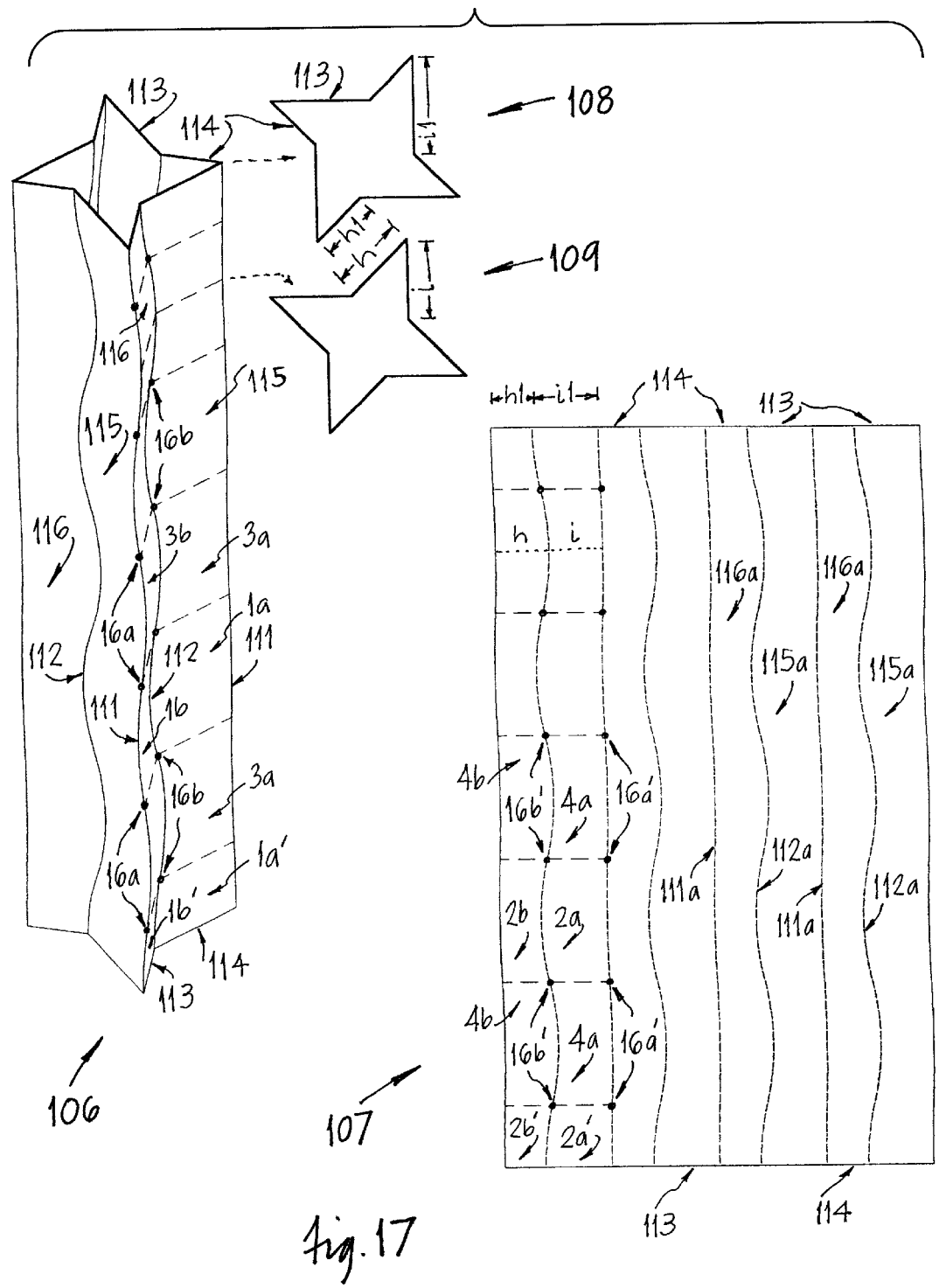
FIG. 17 shows an undulated column without mirror symmetry and a 4-pointed star (p=4) cross-section along with its scoring pattern.
Figure 18:
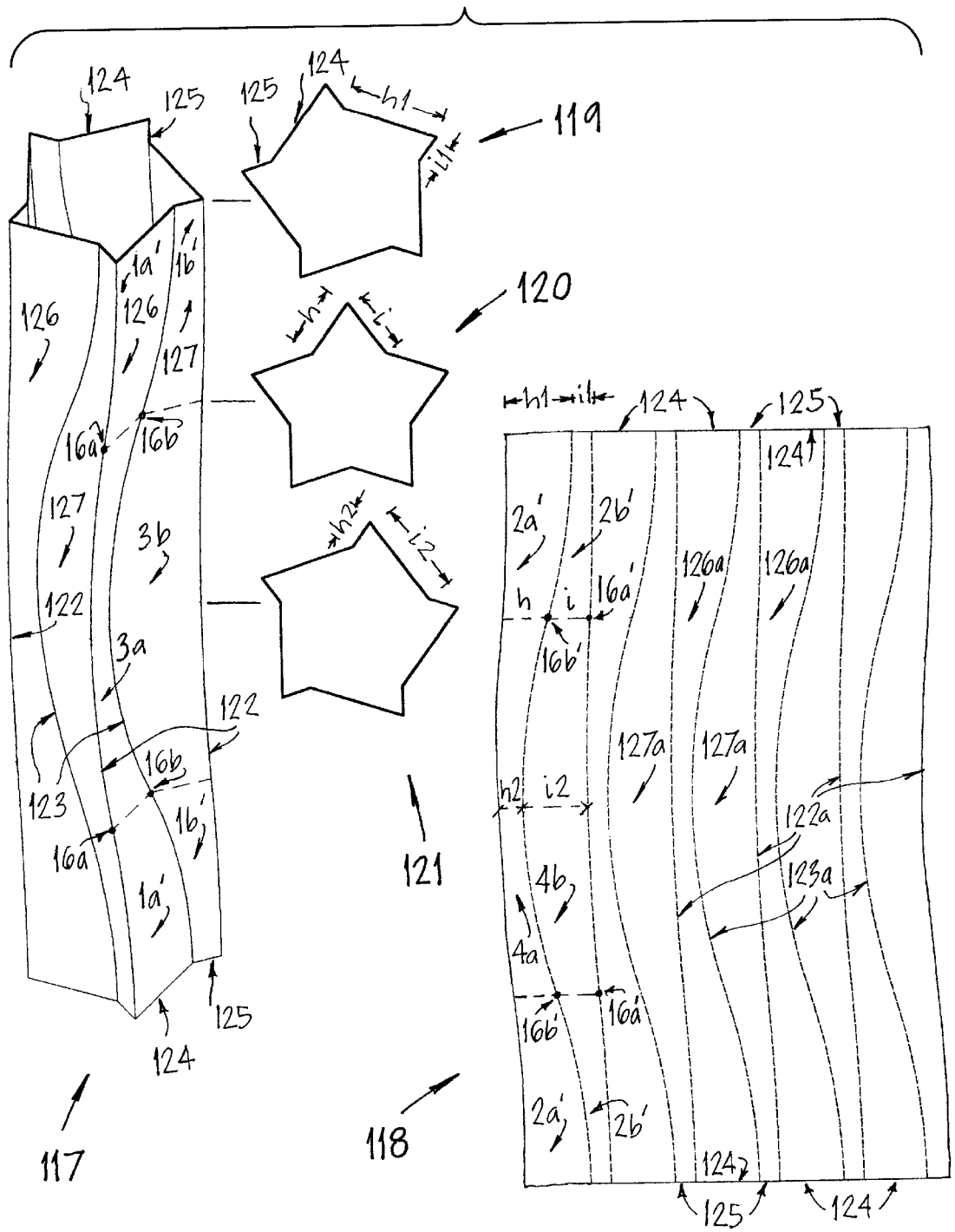
FIG. 18 shows an undulated column without mirror symmetry and a 5-pointed star (p=5) cross-section along with its scoring pattern.
Figure 19:
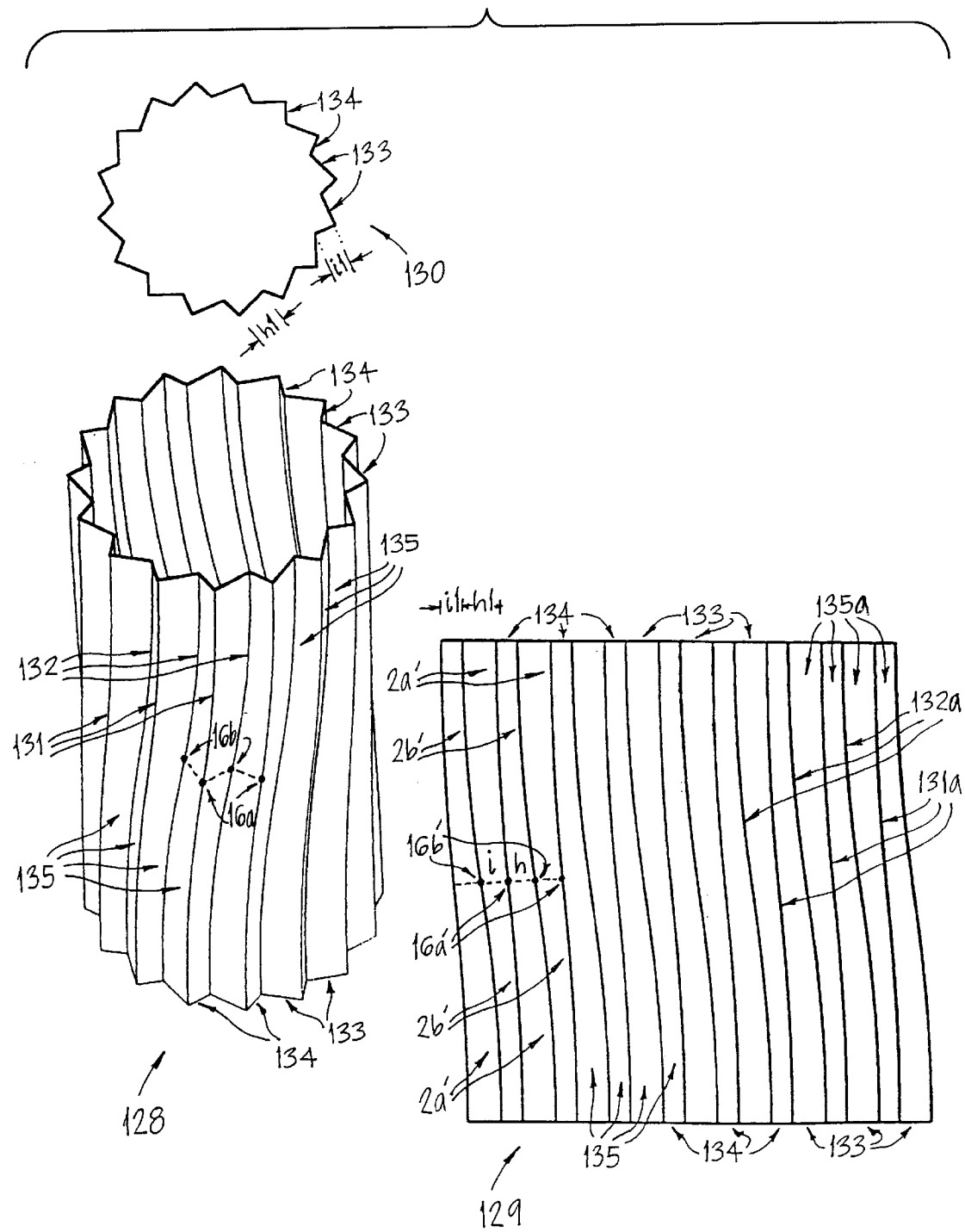
FIG. 19 shows a "twisted" column without mirror symmetry and a 16-pointed star (p=16) cross-section along with its scoring pattern.

FIGS. 17–19 show columns having star-polygonal cross-sections based on p=4, 5, 6 and 16. These structures do not have any mirror-planes and have a rotational symmetry axis along the (vertical) geometric axis of the column. These columns correspond to the cross-section 38 shown in FIG. 7. They can also be visualized by rolling the structure 42 in FIG. 10 into a cylinder, in doing so, two types of alternating waves are obtained, one lying on the inner side of the cylinder and the other on the outer side. The inner angle is greater than the outer angle and, correspondingly, the inner curve is more wavy than the outer one. The l=1 case has a twisted appearance, while higher values of l display a varying degree of waviness. The curved surfaces of these columns are analogous to 42 and are composed of alternating convex and concave portions along the length and across the cross-section of the column. These alternating convex and concave surfaces are arranged around the points of inflection which act as 2-fold axes of rotation. Alternative columns are possible for all values of p greater than 2, and variants for each value of p can be designed by varying 1 or j.

FIG. 17 shows a square-based column 106, i.e. p=4, and its 2-dimensional scoring pattern 107. It has eight wavy faces comprising four each of alternating faces 115 and 116 which correspond to 115*a* and 116*a* in 107. It has eight wavy edges running along its length and two 4-pointed star polygons at ends. The wavy edges are in two sets, 111 and 112, which alternate and correspond to score lines 111*a* and 112*a* in the scoring pattern. Faces 115 are defined by edges 111, 112 and two end edges 113, while faces 116 are defined by 111, 112 and two of 114. 111 and 112 have points of inflection 16*a* and 16*b*, respectively, with the corresponding points of inflection 16*a'* and 16*b'* in the 2-dimensional pattern. 115 is composed of alternating convex surface 1*a* and concave surface 3*a*, and 116 is composed of alternating concave surface 1*b* and convex surface 3*b*. These respectively correspond to alternating regions 2*a* and 4*a*, and 2*b* and 4*b*, in 107. The "half-surfaces" at ends of each face are 1*a'* and 1*b'* respectively which correspond to 2*a'* and 2*b'* in 107. The cross-sections of the column are three different stellated squares 108, 109 and 110 which alternate periodically. The two different edges of 109, having lengths h and i, are equal. These are symmetric stellations which lie at the points of inflection of the waves. They also lie at the horizontal plane passing through the 2-fold axis of symmetry, which is perpendicular to the principal (vertical) 4-fold axis of symmetry. The stellated squares 108 at the trough points are left-handed with edges 114 and 113 of lengths h1 and i1, respectively. The stellated squares 110 at the crest points are right-handed with edges of lengths h2 and i2. The edges vary continuously along the cross-section from a minimum of h1 to a maximum of h2, and correspondingly from a maximum of i1 to a minimum of i2, with h and i lying exactly in between. In 107, these lengths correspond to the minimum and maximum distances between the waves 111*a* and 112*a* as shown. The angle of bend A at the convex folds 111 equals 45° and angle A1 at the concave folds 112 equals 135°. The number of half-wave segments l in 111*a* and 112*a* equals 6, with 5 segments in the middle portion of the wave and ½ segments on either ends. The amplitude j of selected half-wave segment equals ¹⁄₁₆th of the full half-wave segment.

FIG. 18 shows a pentagon-based (p=5) column 117 and its 2-dimensional scoring pattern 118. It has ten wavy faces comprising five each of alternating faces 126 and 127 which correspond to 126*a* and 127*a* in 118. The faces meet at ten wavy edges running along its length, and two 5-pointed star polygons at ends. The wavy edges 122 and 123 alternate and correspond to score lines 122*a* and 123*a*, respectively, in 118. Face 126 is defined by edges 120, 121 and two end edges 122, while face 127 is defined by edges 120, 121 and two end edges 123. Edges 120 and 121 have points of inflection 16*a* and 16*b*, respectively, with the corresponding points of inflection 16*a'* and 16*b'* in the 2-dimensional pattern. Face 126 is composed of convex surface 1*b* with concave half-surface 1*a'* at either ends, and face 127 is composed of concave surface 1*a* with convex half-surface 1*b'* at either ends arranged in a 2-fold rotational symmetry around 16*a* and 16*b*. These respectively correspond to alternating regions 2*b* and 2*a'*, and 2*a* and 2*b'*, in 107. Edges 120 and 121 bend alternatingly at convex angle A=72° and concave angle A1=144° respectively. The cross-section at points of inflection is a regular pentagonal star 118 having equal edges of lengths h and i, and the cross-sections at trough and crest points are right-handed 5-pointed star 117 having edges of lengths h1 and i1, and left-handed 5-pointed star 119 having edges of lengths h2 and i2, respectively. Due to the symmetry of the structure, h1=i2 and i1=h2. These edge lengths determine the distances between the 2-dimensional scoring curves as shown. The number of half-wave segments l=2, and the extent of half-wave segment equals $\frac{1}{16}$th of the full half-wave segment.

FIG. 19 shows a column 128 based on a 16-sided (p=16) regular polygon along with its scoring pattern 129; the scoring pattern is shown for half the column only. It is composed of thirty-two identical curved faces 135, sixteen of which are tapering up with the other sixteen tapering down, and the two sets can be superimposed by a 2-fold rotation around the points of inflection 16a and 16b. Face 135 is bound by wavy edges 131 and 132 and straight edges 133 and 134. It is composed of a convex surface 1a' and a concave surface 1b', and the faces are arranged such that the region 1a' of one face shares the wavy edge with region 1b of the adjacent face. In 129, the regions 2a' and 2b' alternate in a similar pattern with a 2-fold rotational axis around the points of inflection 16a' and 16b'. The angles of bend at 131 equals A=90° and at 132 equals A1=157.5°, respectively, and correspond to the 2-dimensional waves 131a and 132a in 129. The waves have the values l=1 and j=$\frac{1}{16}$ (of full half-wave segment). The cross-sections at the top and bottom are left-handed and right-handed asymmetric 16-pointed stars with edges h1 and i1, and h2 and i2, respectively; the top cross-section 130 is shown. The cross-section at the point of inflection is a 16-pointed star with equal edges h and i. These edges correspond to the distances between the waves in 129.

Figure 20:
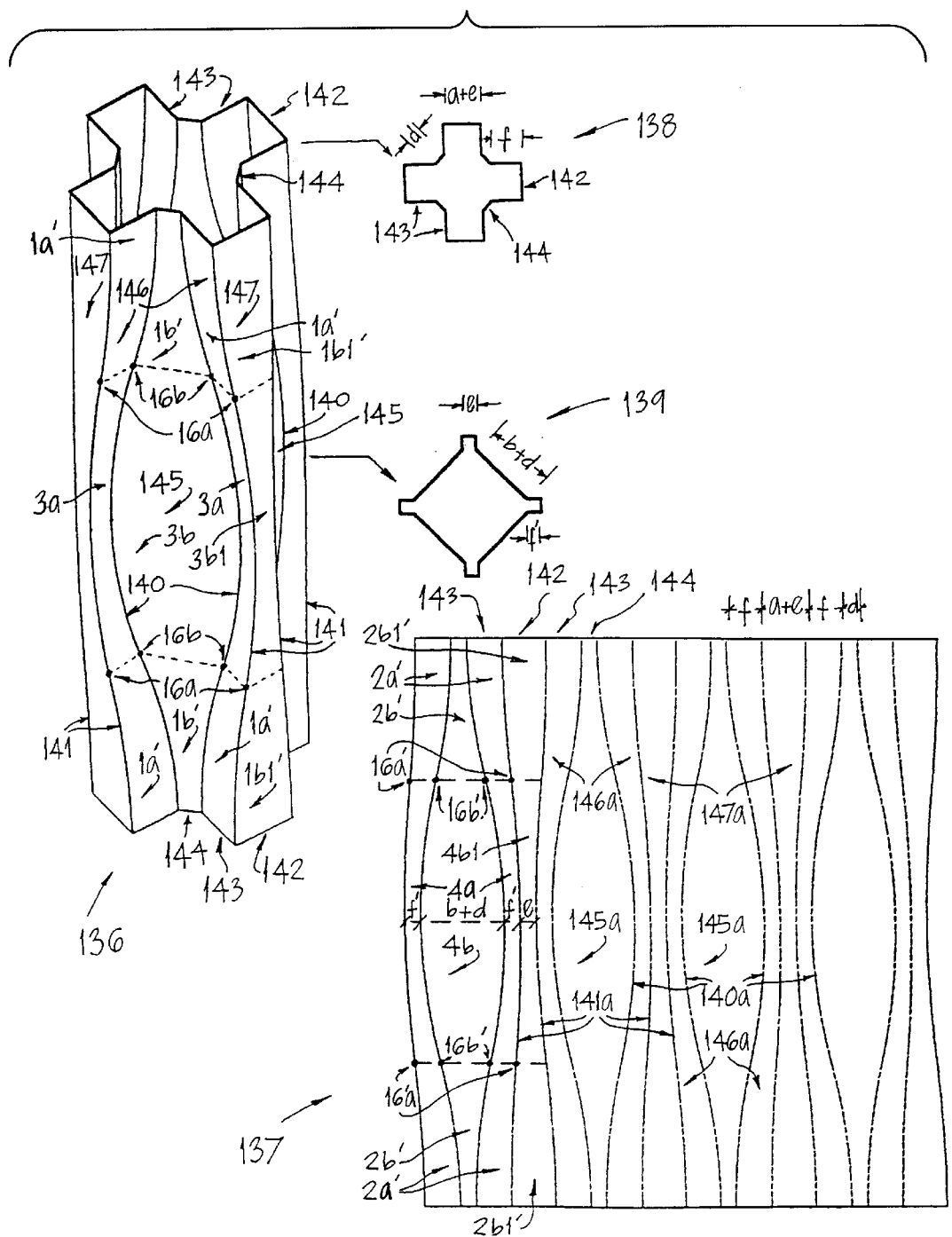
FIG. 20 shows a ribbed undulated column with mirror symmetry and a cruciform (p=4) cross-section along with its scoring pattern.

FIG. 20 shows a column 136 along with its scoring pattern 137. 136 has four vertical mirror planes and one horizontal one through the middle. When stacked, there is an additional mirror plane at the location of the top and bottom ends. It is composed of sixteen undulating faces comprising four inner faces 145, four outer faces 147, and eight radial faces 146 which join the inner and outer faces. In 137, these faces correspond to areas 145a, 147a and 146a, respectively. Faces 145 are bound by two inner wavy edges 140 and two straight edges 144 at the top and bottom ends; 145 is composed of convex region 3b flanked by concave regions 1b' on either ends, corresponding respectively to regions 4b and 2b' in 137. Faces 147 are bound by two outer wavy edges 140, and two straight edges 142 on opposite ends; 147 is composed of a convex surface 3b1 with concave surfaces 1b1 on either ends, corresponding respectively to regions 4b1 and 2b1' in 137. Faces 146 are bound by wavy edges 140 and 141, and two straight edges 143 on opposite ends; each radial face is composed of a concave surface 3a with convex surfaces 1a' on either ends, corresponding respectively to regions 4a and 2a' in 137. The angle of bend A=90° at the edges 136 and A1=135° at the edges 140. 140 and 141 have two points of inflection 16a and 16b each, respectively, which have corresponding points 16a' and 16b' in 137. Once again, the concave surfaces share the wavy edge with adjacent convex surfaces, and vice versa. The cross-section at both ends is the cruciform 138 having sixteen edges as shown and that in the middle is a transformed cruciform 139, also with sixteen edges. Edges 144 equal d in length, 142 equal a+e in length, 143 equal f in length. 139 has the same number of edges but in different proportions, the outer ones equal e, the inner ones equal b+d, and the "radial" ones equal f'. In 137, the scoring curves are spaced apart at distances determined by the sides 142, 143 and 144 as shown. The wavy edges 140a and 141a have l=2 and j=$\frac{1}{16}$. This example corresponds to p=4 case and similar structures can be derived for any value of p greater than 2. In addition, for each, the values for A and A1, as well as 1 and g can be changed. These structures have a built-in stiffness due to their ribbed appearance. In addition, the "ribs" could protrude inwards as opposed to outwards as in this particular example.

Figure 21:
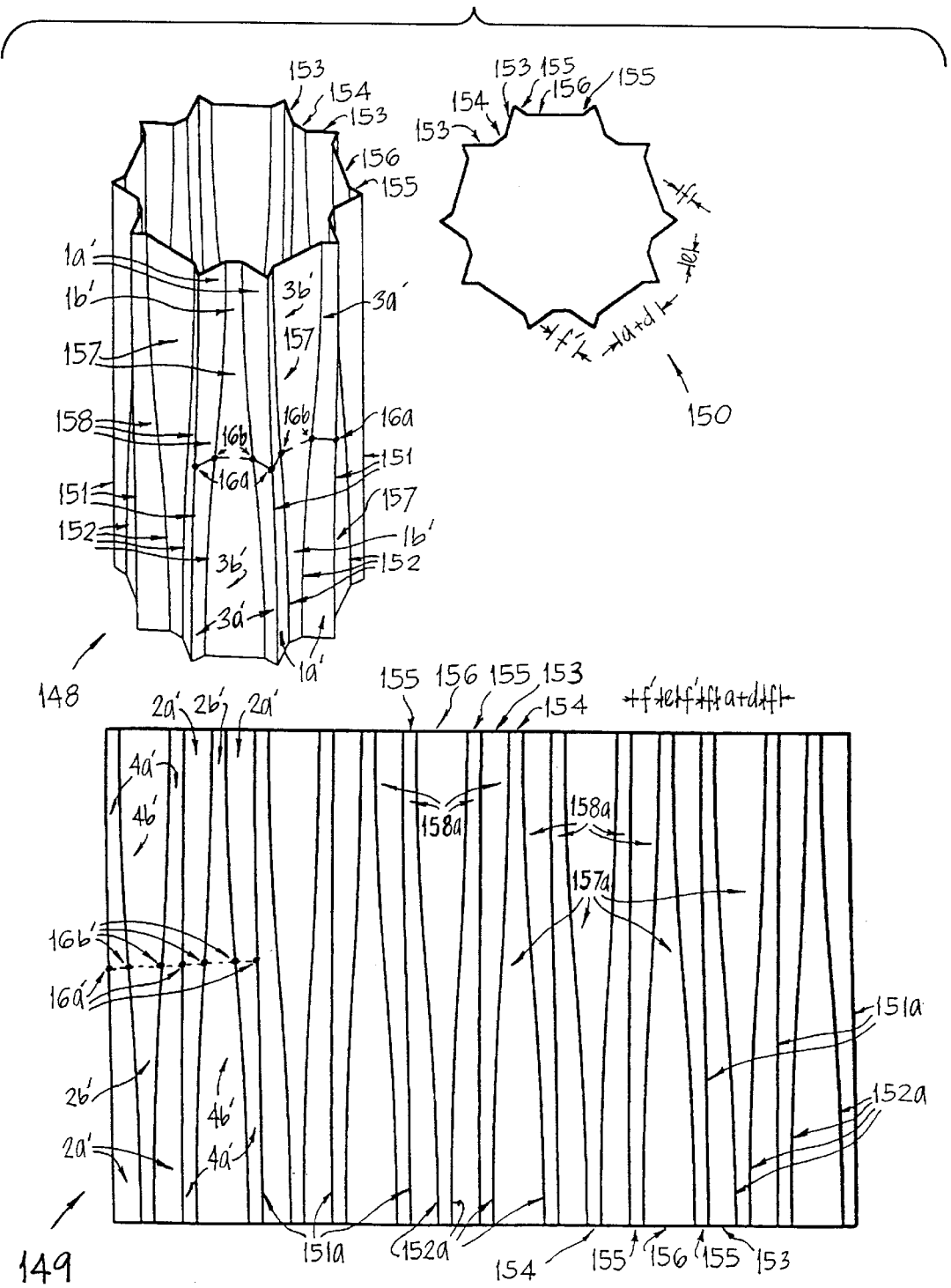
FIG. 21 shows another ribbed column with mirror symmetry and a truncated star cross-section derived from the pentagon (p=5). Its scoring pattern is shown alongside.

FIG. 21 shows a column 148 and its scoring pattern 149. It has five vertical mirror planes meeting at the axis of the column, it has horizontal mirror planes at the ends which come into play when the column is stacked periodically to make a longer undulated column. It is based on p=5 and has the symmetry of a regular pentagonal anti-prism. It also has ten 2-fold axes of rotation at the points of inflection 16a which correspond to 16a' in 149. It has two types of curved faces 157 and 158 with corresponding regions 157a and 158a in 149, and two types of curved edges 151 and 152 which correspond to portions of sine waves 151a and 152a in the scoring pattern. 151 bends at A=72° and 152 bends at A1=144°. Edges 152 have points of inflection 16b corresponding to 16b' in 149. Faces 157 are bound by two of 152 and two end edges 154 and 155. Faces 158 are bound by edges 151, 152, 153 and 155. This particular column can be visualized as a curved pentagonal anti-prism in which the inclined edges have been stellated to produce 2 additional vertices and 2 additional edges near the original vertices and edges. Its cross-section 150 at the two ends is a truncated 10-pointed star, where the inner vertices of the star have been truncated. It has l=1 and j=$\frac{1}{64}$. Its thirty edges are in the repeating sequence 153, 154, 153, 155, 156 and 155 with corresponding lengths which equal f', e, f', f, a+d and f, respectively. Edges having lengths f are symmetrically placed around edges having lengths a+d, and edges having lengths f' are symmetrically placed around edges having lengths e. The same sequence of edge lengths determines the top and bottom cross-sections of the column and also the spacing between the scoring curves as well as their arrangement in 150. Similar columns with stellations and truncations are possible for other values of p.

Figure 22:
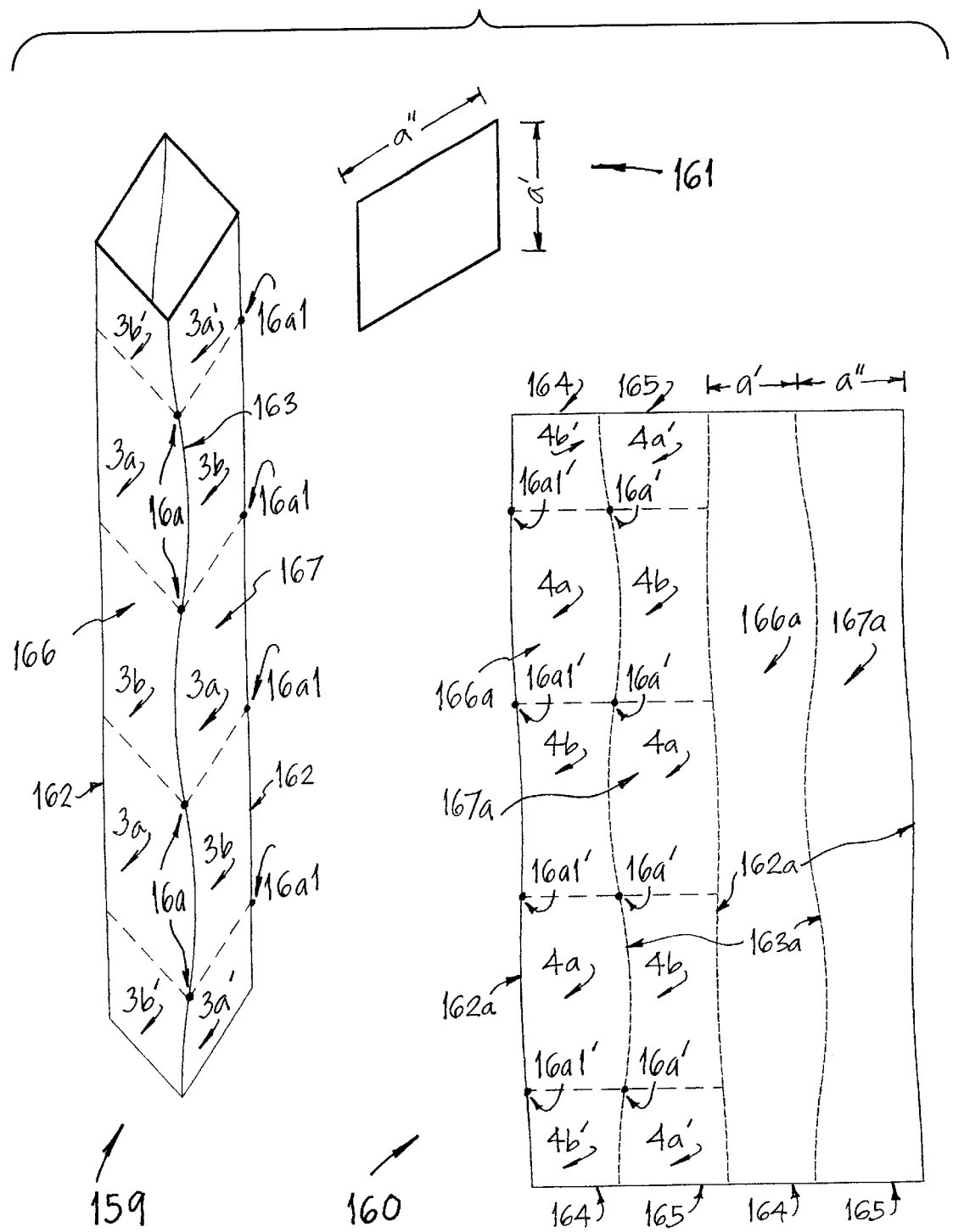
FIG. 22 shows an undulating columnar structure with a rhombic cross-section along with its scoring pattern.

FIG. 22 shows a column 159 having a parallelogram cross-section along with its 2-dimensional scoring pattern 160. It has four wavy faces, two each of 166 and 167 which alternate and which have corresponding regions 166a and 167a in 160. It has wavy edges 162 and 163 at angles A=72° and A1=108°, respectively, which correspond to sine waves 162a and 163a in 160. 166 is bound by edges 162, 163 and two end edges 164, and 167 is bound by 162, 163 and two of 165. 166 is composed of convex surface 3a and concave surface 3b, with half-surface 3b' at the ends, which correspond to regions 4b and 4a, with 4b' at the ends, in 160. 167 is composed of 3b and 3a, with 3a' at the ends, and corresponding regions 4b and 4a, with 4a' at the ends, in 160. The convex surfaces in 166 are adjacent to the concave surfaces in 167, with the two sharing a 2-fold axis of rotation at the points of inflections 16a and 16a1. The cross-section at the two ends is the parallelogram 161 having edges of lengths a' and a", while the cross-section at the points of inflection 16a and 16a1 is a rhombus having edges of lengths a. In the scoring pattern, the distances between 145a and 146a flip-flop between a' and a" and equal a at the points of inflection. The column has l=4 and the curves have j=$\frac{1}{16}$. Columns with any parallelogram sections, and any symmetric or asymmetric quadrilaterals, are possible based on the invention.

Wavy columns with 4-sided cross-sections can be used as structural members and provide alternatives to currently used rectangular box sections and girders. When the end sections of such structural columns are capped to make them rigid, the columns provide torsional resistance. Besides structural columns, the applications include beams, joists, purlins, hangars, ducts, struts for space frames and tension structures, and so on. From these box sections, other standard sections like U-shaped channels and L-shaped angle sections can be obtained to derive wavy channels and angles. These wavy standard sections could be used as supports for building frames, furniture systems, shelving systems, hangars for ceiling systems and other fixtures, and so on.

Figure 23:
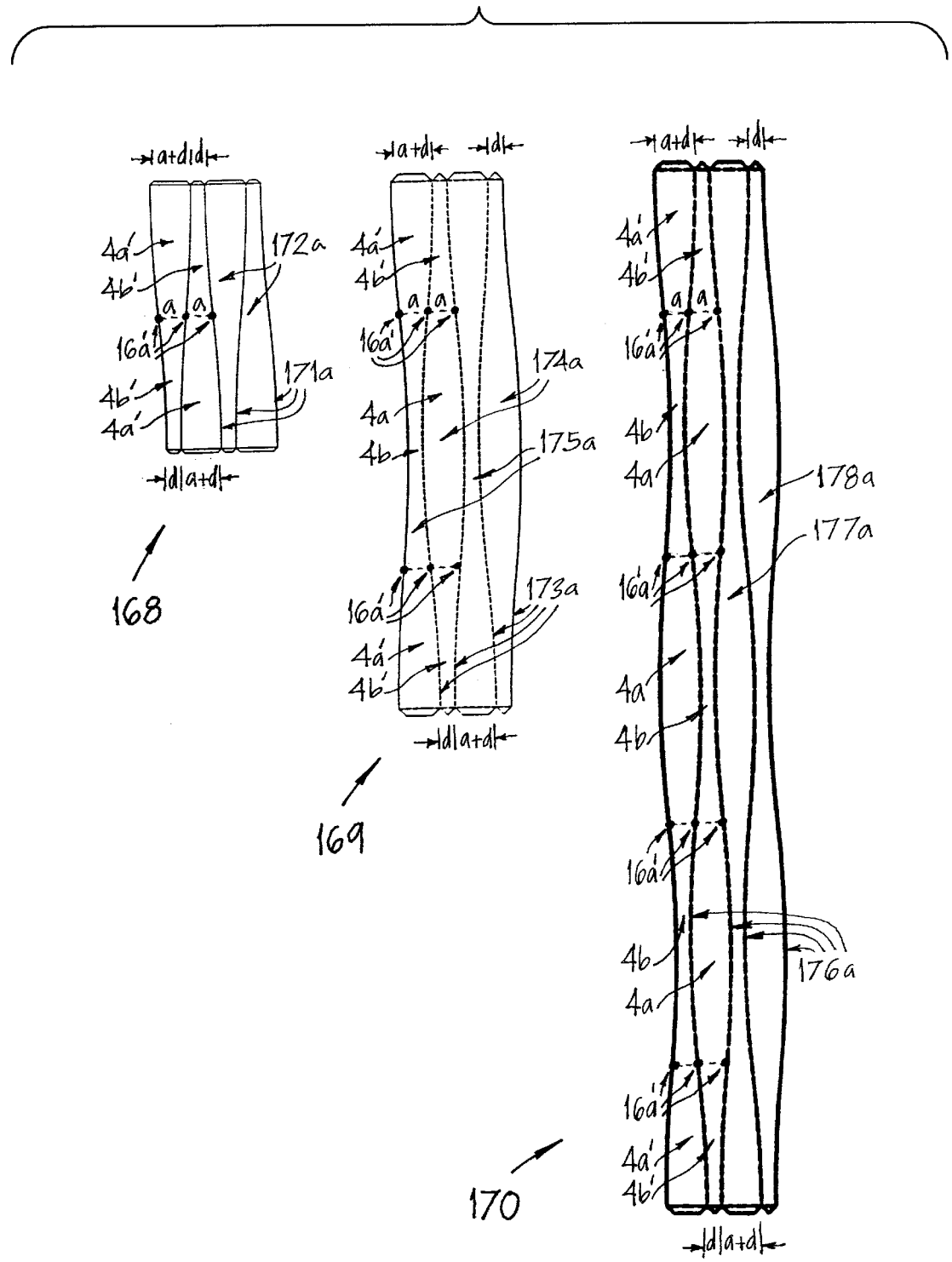
FIG. 23 shows three scoring patterns for undulated structural elements having rectangular box cross-sections.

As examples of structural elements, the 2-dimensional scoring patterns 168–170 for three different columns, each having rectangular cross-sections (i.e. A=90°, are shown in FIG. 23. The principal axis of symmetry, i.e. axis along the length, of the 3-dimensional structures obtained by folding the scoring patterns, is a 2-fold axis of rotation. Each 3-dimensional structure has two mirror planes along its length, and mirror planes passing through the trough and crest points of the wavy edges. In addition, each 3-dimensional structure has secondary 2-fold axes of rotation passing through the points of inflection. The cross-sections at the ends are rectangles in each case, and the sections at the points of inflection are squares. 169 is obtained by stacking two of 168, and 170 is obtained by stacking two of 169. 168 is composed of one type of face 172a which in turn is composed of regions 4a' and 4b'. It has scoring curves 171a with l=1 and j=1/. The curves are spaced apart at distances a+d and d at one end and at d and a+d at the other end. At points of inflection 16a', the spacing is at regular distances equal to a. 169 is composed of two types of alternating faces 174a and 175a; 174a is composed of 4a' with 4b' on either ends, and 175a is composed of 4b with 4a' on either ends. It has scoring curves 173a with l=2 and j=1/, and the space between the curves alternates from the narrow distance d to the widest distance a+d. In 170, the same distances apply, but the extended sine curves 176a have l=4 and j=1/16. It has two types of alternating faces 177a and 178a; 177a is composed of regions 4a, 4b and 4a with 4b' on either ends, and 178a is composed of regions 4b, 4a and 4b with 4a' on either ends. In the three patterns shown here, tabs 179 have been added on to the ends to provide a way to close the ends after folding; alternatively, rectangular plates could be attached to close off the ends.

Figure 24:
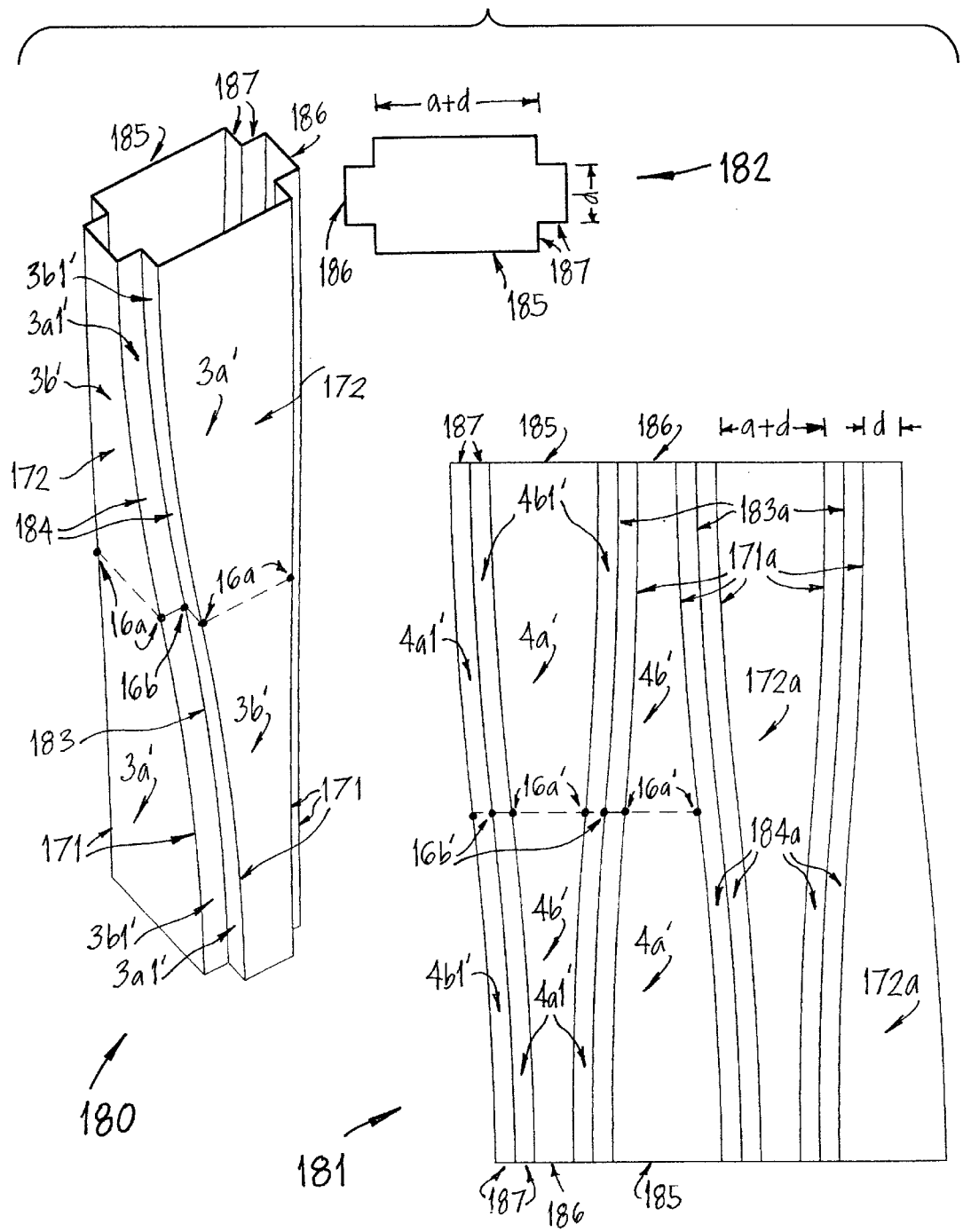
FIG. 24 shows a columnar structure with a rectangular cruciform cross-section and its scoring pattern obtained by "exploding" the pattern 168 of FIG. 23 and inserting additional undulating faces between the original faces.
Figure 25:
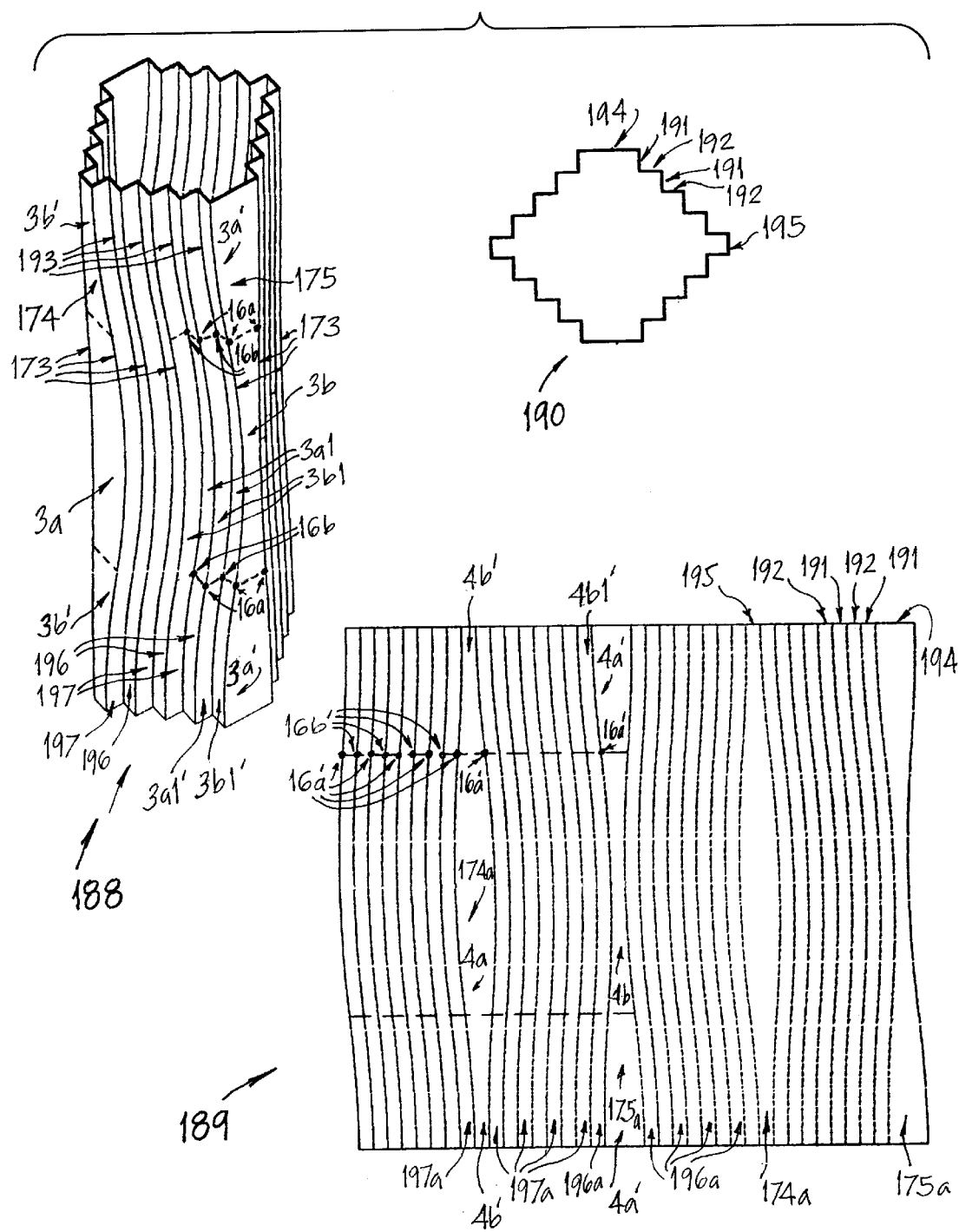
FIG. 25 shows a columnar structure with a stepped cruciform cross-section and its scoring pattern obtained by "exploding" the pattern 169 of FIG. 23 and inserting a row of additional undulating faces between the original faces.

FIGS. 24 and 25 show two examples of columnar structures obtained from 168 and 169 of FIG. 23 by expanding the faces of the latter and inserting new parallel wavy folds between the original faces. In FIG. 24, the structure 180 has the scoring pattern 181 which is obtained from 168 by this process. In 181, the four original faces 172a, bound by original edges 171a are separated, and two new faces 184a meeting at new edge 183a are inserted in between. This becomes clearer when the pattern is folded into 180. In 180, faces 172 corresponding to the original, bound by edges 171, are separated by two faces 184 which meet at edge 183. Edges 183 remain parallel to the adjacent edges 171. The two faces 184 are identical but are rotated at 180° around the points of inflection 16b. The entire structure is composed of twelve wavy faces, four of 172, and eight of 184, and two rectangular cruciform ends 182 defined by repeating the sequence of edges 185, 187, 187 and 186. The angle of bend at 171 is A=90°, and at 183 is A1=270°. 172 is bound by two wavy edges 171 and end edges 185 and 186; 184 is bound by 171, 183 and two end edges 187. 172 is composed of a convex surface 3b' and a concave surface 3a', and 184 is composed of a concave surface 3a1' and a convex surface 3b1'. The surfaces are arranged so that 3b' and 3a1', and 3a' and 3b1', share the same edge. The length of edge 185 equals a+d, 185 equals d and 186 equals h. These lengths determine the distances between the curves in 181. The curves 171a and 183a have l=1 and j=1/16, and each curve has a point of inflection, 16a' and 16b', respectively, located at its midpoint.

FIG. 25 shows a structure 188 based on p=2 and its scoring pattern 189 which is derived from 169 by separating the faces 174a and 175a and inserting new alternating faces 190a and 191a. The original edges 173a are repeated and new edges 192a are inserted so that the two sets of edges alternate but remain parallel. 173a and 193a are identical portions of a sine wave and have l=2 and j=1/16. Both curves have two points of inflection 16a' and 16b', respectively. 188 has two vertical mirror planes and one horizontal mirror plane passing through it middle. It has thirty-six wavy faces comprising two each of 174 and 175, and sixteen each of 191 and 192 arranged alternatingly. The angle of bend A=90° at 173 and A1=270° at 193. 173 has two points of inflection 16a, and 193 has two points of inflection 16b. Its end section is a thirty-two-sided cruciform 190 with stepped sides; it has two of edges 194 and two of 195, and sixteen each of 191 and 192 arranged alternatingly. 175 is bound by edges 173 and 194; 174 is bound by 173 and 195; 196 is bound by 173, 193 and 191, and 197 is bound by 173, 193 and 192. 175 is composed of convex surface 3b with concave 3a' on either end, 174 is composed of concave 3a with convex 3b' on either end, 196 is composed of convex 3b1 and concave 3a1' on either end, and 197 is composed of concave 3a1 and convex 3b1' on either end. In 189, 3a, 3b, 3a1 and 3b1 correspond to 4a, 4b, 4a1 and 4b1, respectively, and 3a', 3b', 3a1' and 3b1' correspond to 4a', 4b', 4a1' and 4b', respectively. As before, convex and concave surfaces alternate along the length and across the girth of the column. Variations of this structure can be obtained by varying the number of steps m, its lengths, or by increasing p. 188 has m=4 in each quadrant, and 180 of FIG. 24 has m=1.

Figure 26:
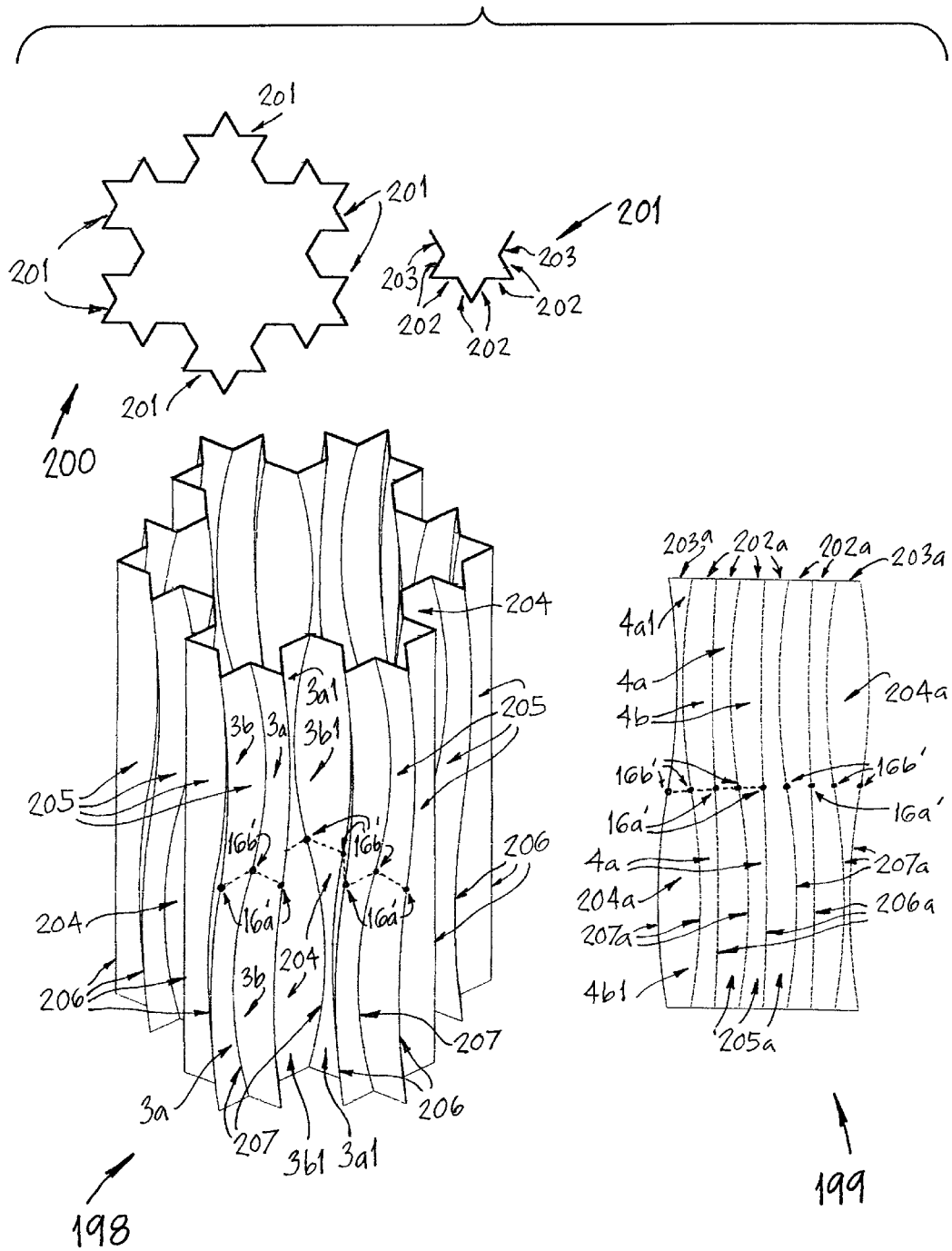
FIG. 26 shows a columnar structure having the fractal Koch curve as its cross-section. The scoring pattern for one-sixth portion is shown alongside.

FIG. 26 shows another embodiment of the invention. The columnar structure 198 has an end section 200 which is a well-known fractal called the Koch curve. This particular section is based on o=2, where o is the level of recursion of the fractal; o=1 is the well-known Star of David, a regular six-pointed star. Higher values of o will produce larger undulated structures when the length of edge of the Koch curve is kept constant, or a finer undulation when the size of structure is kept constant. The segment 201 is one-sixth of 200 and correspondingly its scoring pattern 199 is one-sixth of the scoring pattern needed for 200. 201 is composed of eight edges comprising the edge 203 on each end with six edges 202 in between meeting at alternating angles A=60° and A1=120°. The eight curved faces associated with these edges are indicated in 199 and include 204a on the ends in opposite orientations and six faces 205a in between, also in alternating up and down orientations. 204a and 205a correspond to 204 and 205, respectively, in 198. 204a are composed of regions 4b1 and 4a1, and 205a are composed of regions 4a and 4b arranged alternatingly from left to right in the illustration. In 198, the corresponding faces 204 are composed of convex regions 3b1 and concave regions 3a1, and faces 205 are composed of concave regions 3a and 4a, respectively. The faces are bound by wavy edges 206 at convex bends (A=60°) and by edges 207 at concave bends (A1=240°); the corresponding edges in 199 are 206a and 207a. 206 have one point of inflection 16a and 207 also has one point of inflection 16b, with corresponding points 16a' and 16b' in 199. The waves 206a and 207a has l=2 and j=1/16. As in the embodiments shown earlier, the concave portions of one face share the wavy edges with convex portions of adjacent face.

Figure 27:
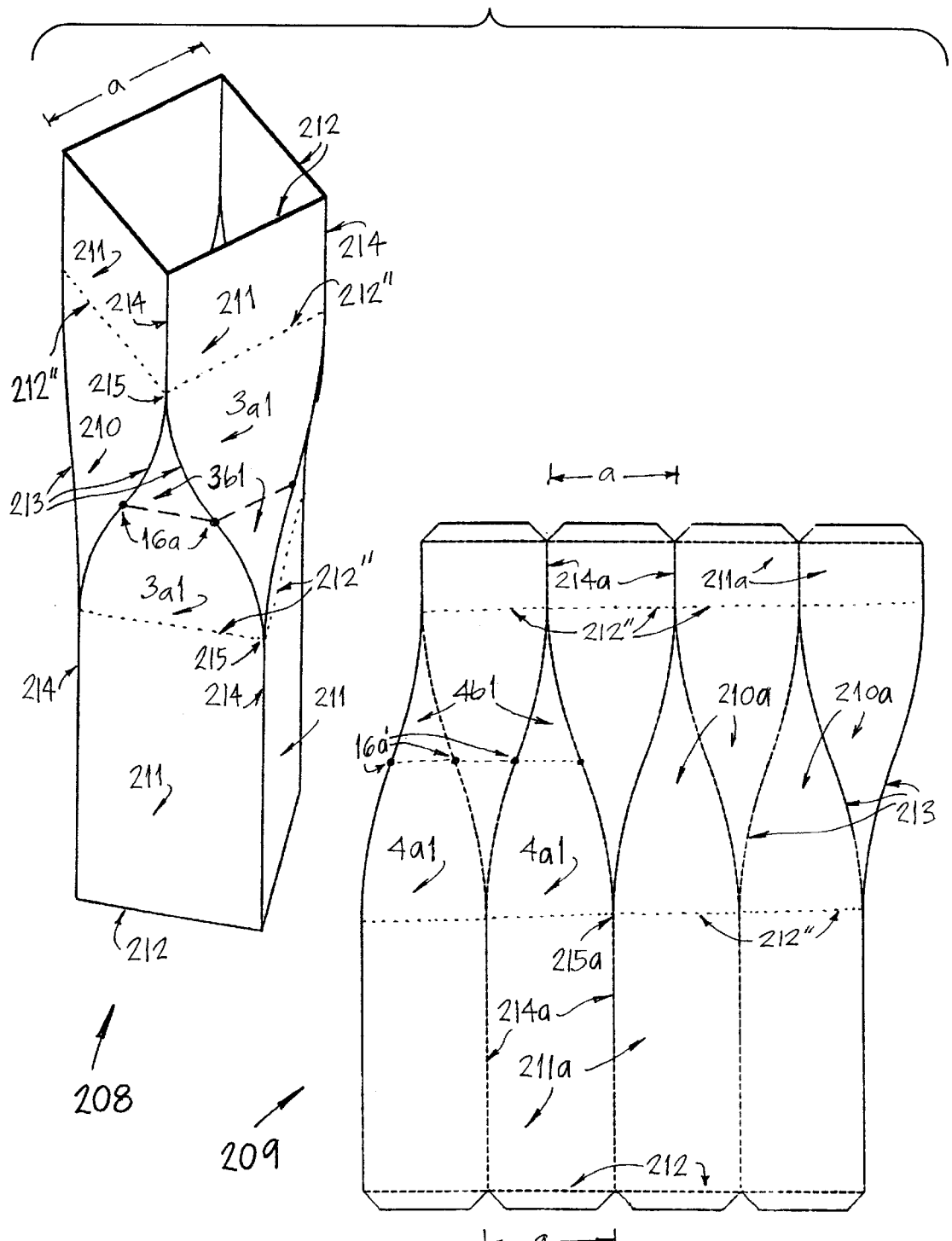
FIG. 27 shows a undulated column based on the square anti-prism (p=4) and having square cylindrical extensions on either ends. Its scoring pattern is shown alongside.
Figure 28:
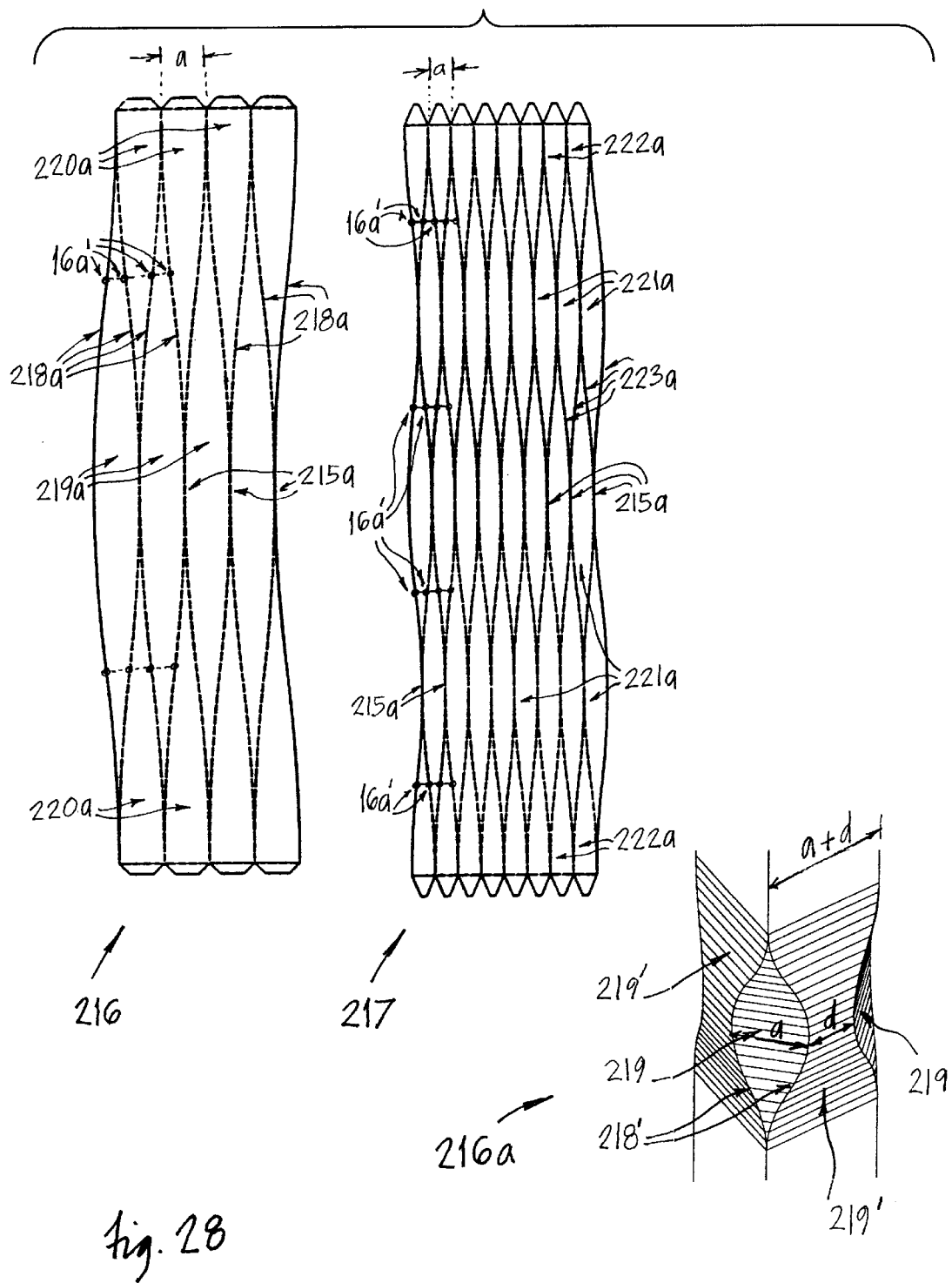
FIG. 28 shows two scoring patterns for undulated structures, one based on two stacked square anti-prisms (p=4) and the other on four stacked octagonal anti-prisms (p=8).

FIGS. 27 and 28 show a different embodiment of the structure, one in which the wavy edges touch one another so that the wavy edges have a 3-way connection at the points of contact. Some of these can be obtained by shrinking the length a+d in previous examples by a distance d. The examples shown are based on the square anti-prism (p=4 case), and other values of p are possible. FIG. 27 shows a structure 208 and its scoring pattern 209. Its eight wavy edges 213 touch one another at 215 and define eight undulated faces 210. In 209, the curves 213a touch at 215a and define the regions 210a. The undulated portion of the structure has optional square prism extensions with rectangular faces 211 meeting at straight edges 214. In 209, the corresponding regions 211a meet at 214a. The square ends have edges 212 of length a. Edges 213 have a point of inflection 16a, which is also the location of a 2-fold axis of symmetry perpendicular to the main 4-fold axis of symmetry. The angle of bend at 213 is A=135°. 210 is composed of convex surface 3b1 and concave surface 3a1; these surfaces alternate with the adjacent faces so that 3a1 of one surface shares the wavy edge 213 with 3b1 of the adjacent face, and vice versa. In 209, the corresponding regions 4b1 and 4a1 are arranged as shown with a 2-fold axis of rotation at the points of inflection 16a'. The curves 213a have l=1 and j=1/16. Note that the source square anti-prism in 208 is defined by top and bottom squares bound by edges 212" and edges joining points 215, with the difference that the edges of the anti-prism have been curved to 213 leading to undulated faces 210. By increasing 1, other embodiments of the invention are produced as will be shown later in FIG. 30.

FIG. 28 shows two scoring patterns 216 and 217 which are obtained by extending the wavy portion to l=2 in 216 and l=4 in 217. The curves 218a meet at 215a and have j=1/32 in both cases. The angle of bend A=135° in both cases, and the curves have two points of inflection 16a'. 216 is composed of four faces 219a and eight faces 220a, with four on either end. When folded, the undulated structure obtained is a 4-sided column (p=4), a curved variant of two stacked square prisms. 217 is composed of twenty-four faces 221a arranged in three rows of eight each, with a row of eight faces 22a on either end. The faces are bound by wavy edges 223a having four points of inflection 16a' and meeting each other at points 215a. When folded, the undulated structure is 8-sided (p=8) and is a curved variant of four stacked octagonal anti-prisms. Both structures have d=0, as in 208 of FIG. 27 and have a default parameter a. By making d greater than 0, the structure of the type 216a is obtained. It has two types of faces 219 and 219' and one type of edge 218' with j=1/8. 219 are diagonal islands of width a and the 219' are dumbell-shaped polygons with maximum width a+d and minimum width d. The structure has a scoring pattern which can be obtained from 216 by expanding the edges 218a at points 215a by a distance d.

Figure 29:
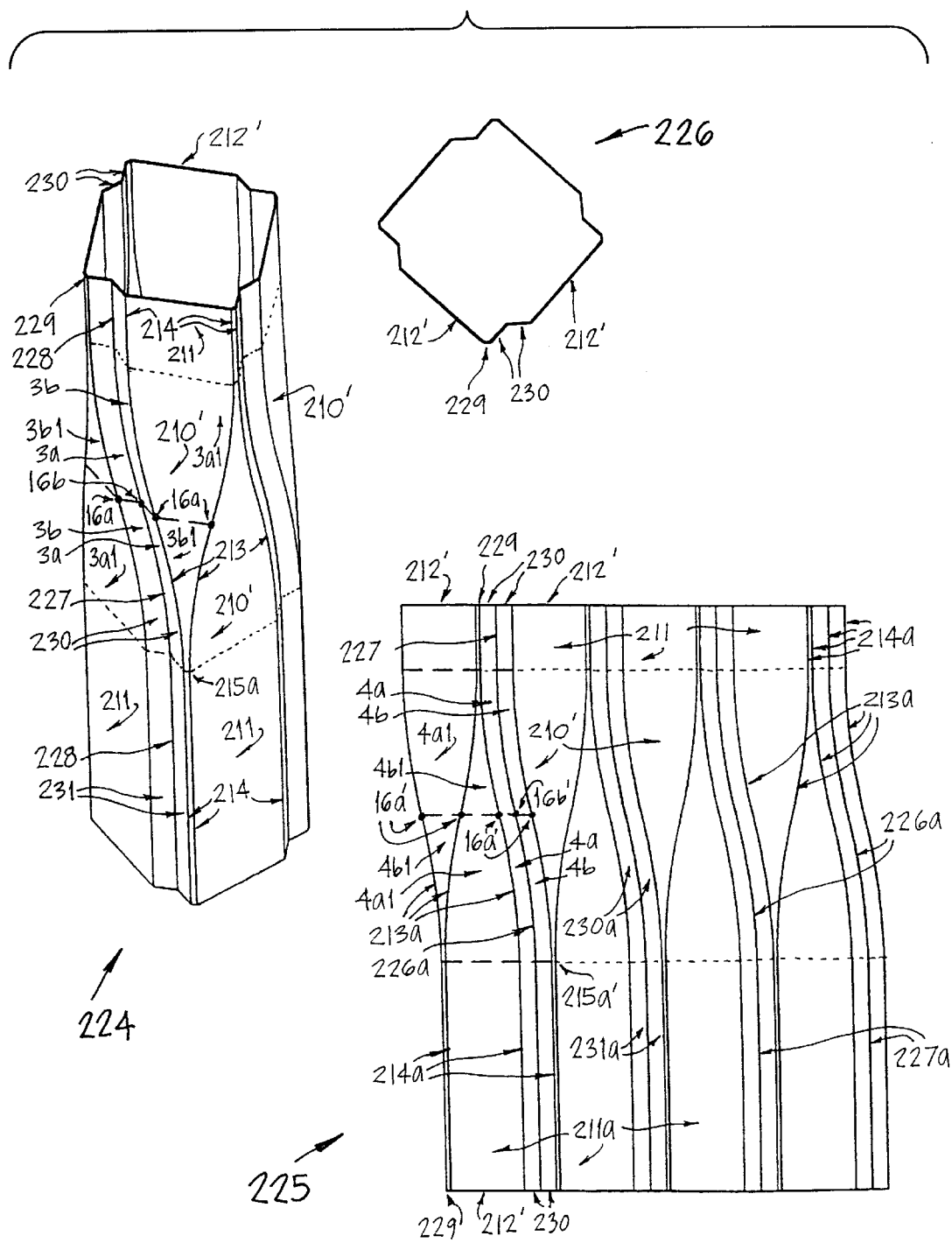
FIG. 29 shows a columnar structure without mirror symmetry and obtained by "exploding" the faces of the structure in FIG. 27 and inserting additional faces similar to the manner in FIGS. 24 and 25. Its scoring pattern is shown alongside.

FIG. 29 shows a structure 224 and its scoring pattern 225 (only one half of the entire pattern is shown here), obtained by "exploding" the eight faces 210' and inserting new faces 231 in a manner similar to the derivation of FIG. 24 from 169 (in FIG. 23). This structure has no mirror symmetry and a "twisted" appearance. Faces 210' are a slightly modified version of the original faces 210 of FIG. 27; here these faces are "exploded" in pairs, with each pair sharing an edge 213. 231 share a new edge 227 The angle of bend A at 213 equals 135° and A1 at 227 equals 225°. The end polygon 226 has the sequence of edges 212', 229, 230 and 230 in a cyclic order. The structure has extruded end sections composed of flat faces bound by the edges of the end polygons and edges 214 and 228. The edges 213 and 227 have points of inflection 16a and 16b, respectively. In 225, each of the elements of 224 has a corresponding element having a corresponding number followed by a suffix 'a', excepting the edges at ends 212', 229 and 230 which are the true edges. The undulated faces correspond to regions 210a' bound by edges 213a and separated by faces 230a which share the edge 226a. The points of inflection of 213a and 226a are 16a' and 16b', respectively. These edges have l=1 and j=1/16. Faces 210' are composed of convex regions 3b1 and concave regions 3a1; faces 230 are composed of convex 3b and concave 3a. As before, the convex and concave regions alternate around the shared wavy edges 213 and 227. In 225, the corresponding regions are 4a1, 4b1, 4b and 4a as shown.

Figure 30:
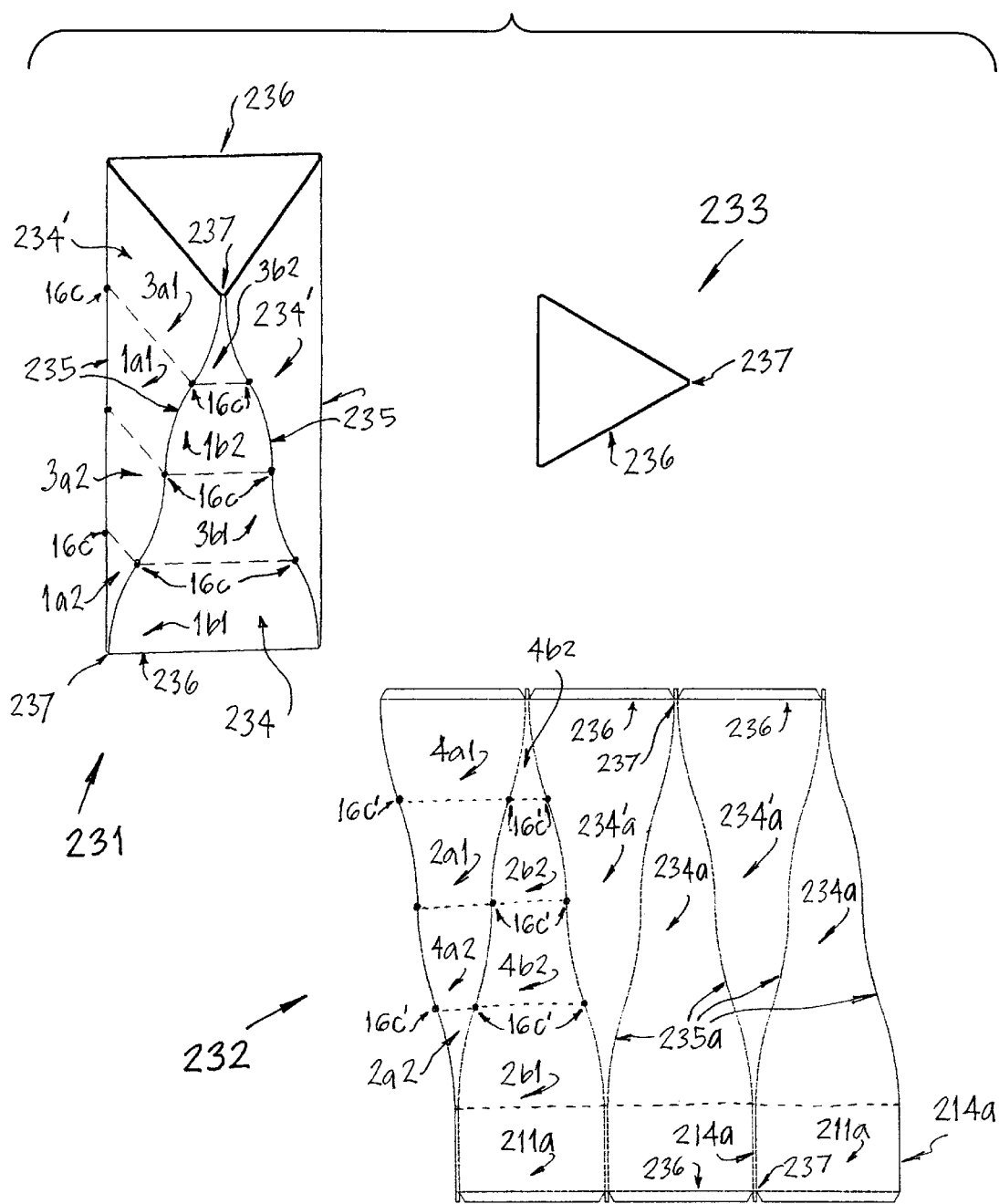
FIG. 30 shows a secondary undulation of an undulated structure based on the triangular anti-prism (p=3) and its scoring pattern.

FIG. 30 shows a structure 231 and its scoring pattern 232. 231 represents a different embodiment of the invention, also based on an anti-prism, but related to structure 208 of FIG. 27. It is obtained by varying q, the number of (secondary) undulations in one topological edge of the structure. This particular example is based on a triangular anti-prism (p=3) having six wavy edges 235 which have q=4 and j=1/32, six undulated faces, three of 234 (triangles pointing up) and three of 234' (triangles pointing down) meeting at angle of bend A1=120°. In 232, these correspond to 235a, 234a and 234'a. Edges 235 are composed of 4 half-wave segments meeting at inflection points 16c, and 234 and 234' are each composed of two convex and two concave segments. Compared with structures in FIGS. 27 and 28, this structure introduces secondary undulations on the surface. 234 is composed of convex region 3b2, concave region 1b2, convex 3b1 and concave 1b1. 234' is composed of concave 3a1, convex 1a1, concave 3a2 and convex 1a2. Due to the 2-fold symmetry axis passing through the mid-point of 235, the regions are arranged in symmetrical pairs with the following pairs being identical: 3b2 and 1a2, 1b2 and 3a2, 3b1 and 1a1 and 1b1 and 3a1. However, in asymmetric cases, these regions would be distinct. In 232, the corresponding regions in 234a are 4b2, 2b2, 4b2 and 2b1, and in 234'a are 4a1, 2a1, 4a2 and 2a2. The regions 238, obtained by extending edges 235a and adding 239, are shown as an optional extension of the structure. The ends 233 of the structure are partially truncated triangles with main edges 236 and secondary 237.

Figure 31:
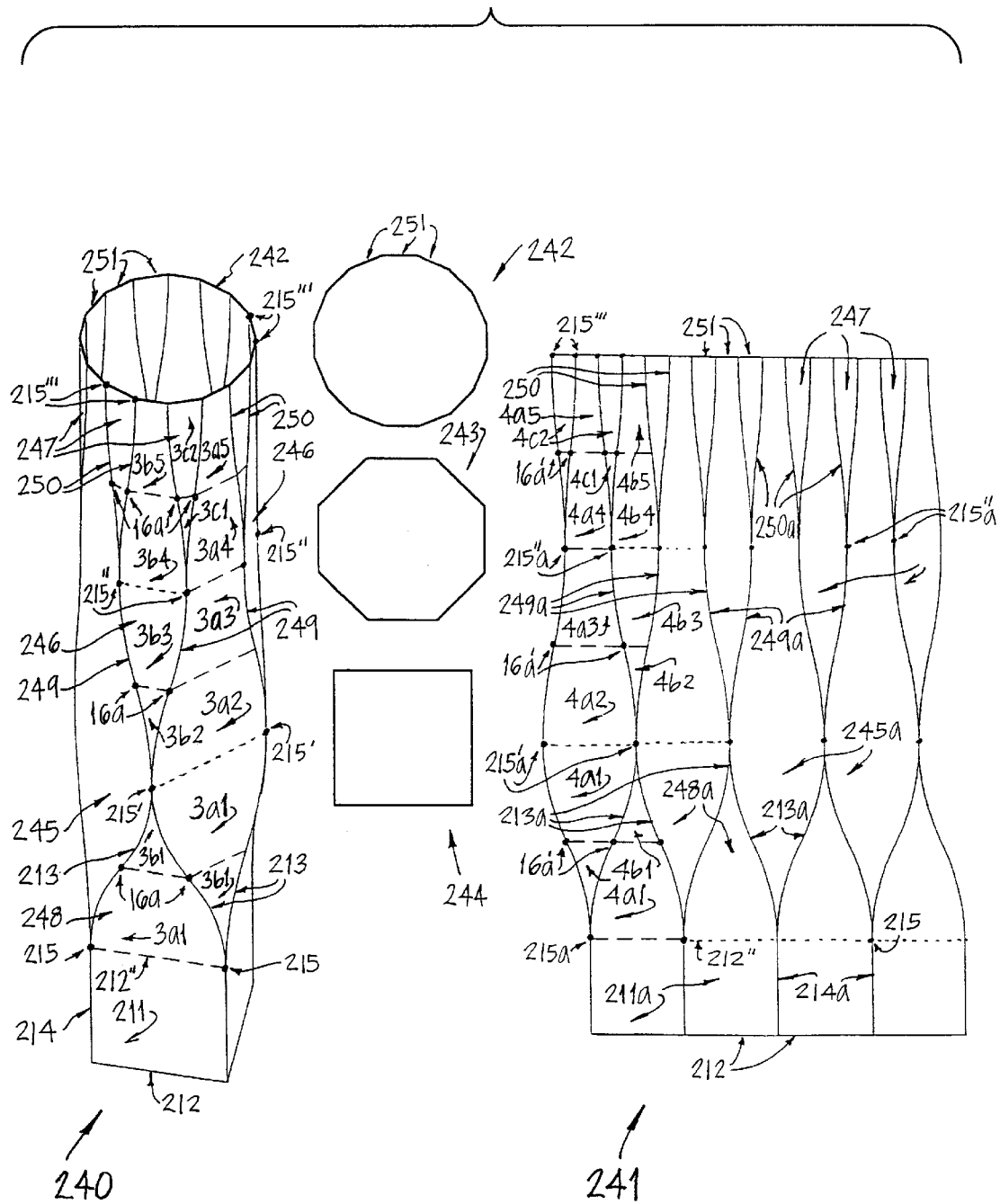
FIG. 31 shows an undulated branched columnar structure along with its scoring pattern.

FIG. 31 shows a structure 240 and its scoring pattern 241 as another embodiment of the invention. Here the wavy edge branches into two edges recursively from one end of the column to the other. The branched edge fractal pattern is composed of wave segments with amplitudes which diminish as n, the number of branches, increases. This permits new branches to be added. The increased branching also permits the transformation of a polygonal cross-section with a few sides to rapidly reach one with many more sides, thus providing a natural way to blend two different geometric cross-sections at the ends of the structure. In structure 240, the polygonal cross-sections vary from the square 244 at points 215' to the octagon 243 at points 215" to the 16-sided polygon 242 bound by top points 215'" and edges 251, and the process can be continued further. The structure is composed of three layers (n=3), with layer-1 between 215 and 215', layer-2 between 215' and 215", and layer-3 between 215" and 215'". It is composed of four primary faces 245 which run across the three layers, four secondary faces 246 which run across layer-1 and layer-2, eight tertiary faces 247 which run across layer-3, and four faces 248 at the base. In 241, the corresponding faces are 245a, 246a, 247a and 248a. The structure has an optional square prism extension at its end with faces 211 and edges 212, 212" and 214, similar to 208 in FIG. 27; in 241, the corresponding faces 211a are bound by 212, 212" and 214a.

Layer-1 is an undulated anti-prism having eight wavy edges 213 which define eight undulated triangular faces 248, with each face bound by one of 212" and two of 213. 213 has l=1, j=⅛, A=135° and one point of inflection 16a. 248 is composed of a concave region 3a1 and a convex region 3b1, arranged around a 2-fold axis of rotation through 16a. In 241, layer-1 lies between 215a and 215'a, and the corresponding regions 248a are bound by wavy edges 213a which have points of inflection 16a'; 248a are composed of regions 4a1 corresponding to 3a1, and 4b1 corresponding to 3b1.

Layer-2 is an undulated prism with an octagonal top at points 215" and a square bottom at points 215'. It has eight wavy edges 249 with l=1, j=1/16 and A=135°, and each edge has one point of inflection 16a. It has eight undulated faces in two sets of four each. The first set comprises triangular faces composed of convex region 3b2 and a concave region 3b3, and the second set comprises quadrilateral faces composed of a concave region 3a2 and a convex region 3a3. In 241, layer-2 lies between 215'a and 215"a, and the edges 249a define corresponding regions 4a2, 4a3, 4b2 and 4b3.

Layer-3 is an undulated prism with an 16-sided top at points 215'" and an octagonal bottom at points 215'. It has sixteen wavy edges 250 with l=1, j=1/64 and A=157.5°, and each edge has one point of inflection 16a. It has sixteen undulated faces in two sets of eight each. The first set comprises triangular faces composed of convex region 3c1 and a concave region 3c2, and the second set comprises quadrilateral faces composed of a concave region 3a4 and a convex region 3a5. In 241, layer-3 lies between 215"a and 215'"a, and the edges 250a define the corresponding regions 4a4, 4a5, 4b4 and 4b5.

Figure 32:
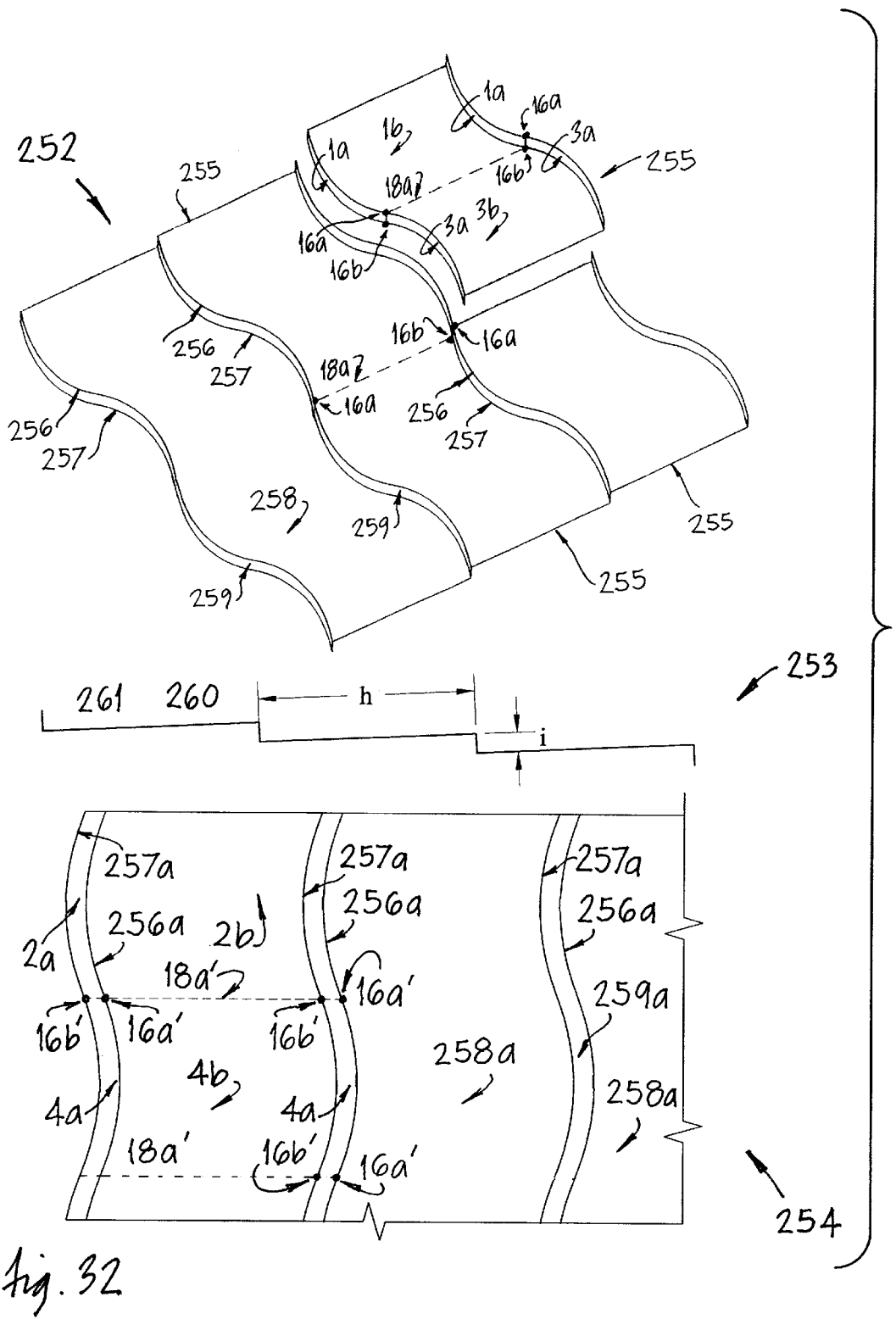
FIG. 32 shows a folded panel based on the wavy corrugated structure 42 in FIG. 10 but in a different orientation and in different proportions. Here it is shown as a ceiling or roof application.

FIG. 32 shows a variation 252 of the embodiment 42 shown earlier in FIG. 10. Here it is in a different orientation and the values of h and i are varied. 252 is a portion of a folded panel system having a stepped cross-section 253. A portion of the scoring pattern is shown in 254. 252 is composed of undulating curved faces 258 (main faces) and 259 (riser faces) bound by parallel wavy edges 256 and 257 having points of inflections 16a and 16b, respectively. 256 and 257 are identical curves having j=¼ with the angle of bend A=90° at 256 and A1=270° at 257. In 254, the curved faces correspond to regions 258a and 259a, the wavy edges to 256a and 257a, and the points of inflection to 16a' and 16b'. The faces are arranged in a zig-zag manner as shown in the section 253 taken through the points of inflection; it shows the main panel portion 260 and the riser 261. 252 can be tiled from identical modules 255 which can be repeated in both directions to any extent. The main faces of 255 are composed of a convex region 3b alternating with a concave region 1b. The riser faces of 255 are composed of concave region 3b alternating with convex region 1a. Regions 3a share the wavy edges with regions 3b, and 1a share these edges with 1b. In 254, regions 2a and 2b correspond to 1a and 1b, and 4a and 4b correspond to 3a and 3b, respectively. The width h and the riser height i are variable and depend on the specifics of design based on material, its strength, thickness, method of fabrication, widths of available sheet material, and so on. In modular panel systems for interior or exterior architectural surfaces, the value of i could range from a fraction of an inch to several inches, and the value of h could range from several inches to several feet determined by the widths of available sheet material. In large-scale architectural structures, e.g. roofs, the value of i could range from a few inches to a few feet, with the value of h ranging from several feet to substantially larger spans. In large spans with modules constructed from sheet material, a supporting structure would be required In large spans from cast material, e.g. concrete, the strength of the surface would come into play. These considerations are of a general nature and would apply equally to other embodiments shown in later FIGS. 33–40.

Figure 33:
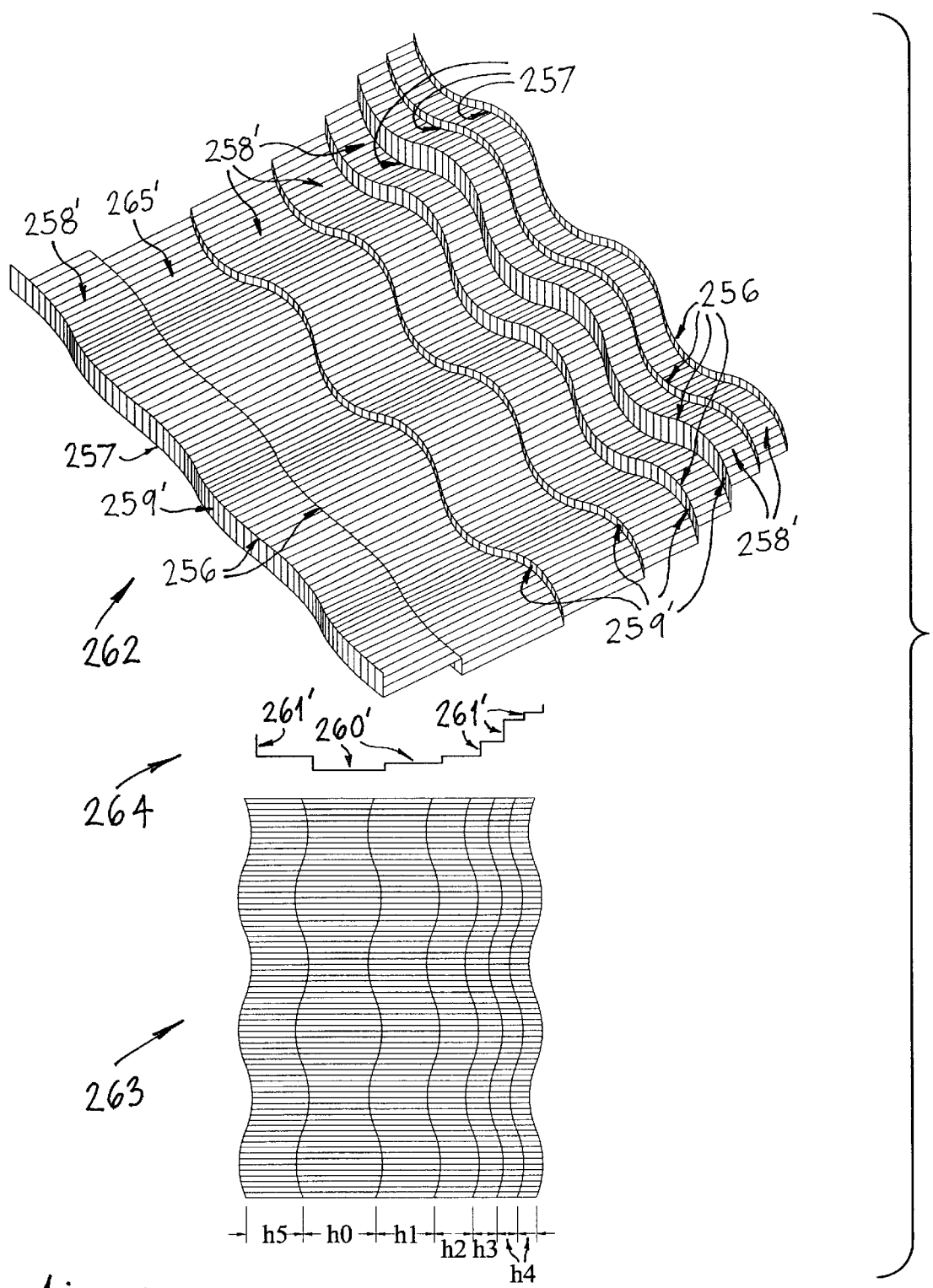
FIG. 33 is an irregular variant of FIG. 32.

FIG. 33 shows the portion 262 of an irregular structure along with its plan view 263 and cross-section 264. It is a variant of 252 in FIG. 32, and likewise it is composed of undulated faces and wavy edges, but here the faces 258' and 259' have variable widths and heights across the cross-section. The edges 256 at convex bends and 257 at concave bends are all identical curves, and are the same as in 252. The structure can also be constructed from modules, but here the modules will have varying widths h0, h1, h2, h3, h4 and h5 as indicated in 263. The heights i would also vary as seen in 264. New faces need to be inserted at trough and crest regions; this is shown with the insertion of face 265' at the trough point of 262. The edges 256 on one side of 265' are reflected to 256' on its other side. This embodiment permits irregular cross-sections. By making the longitudinal section stepped in the same manner as the cross-section, the surface could be modulated to be irregular in both directions.

Figure 34:
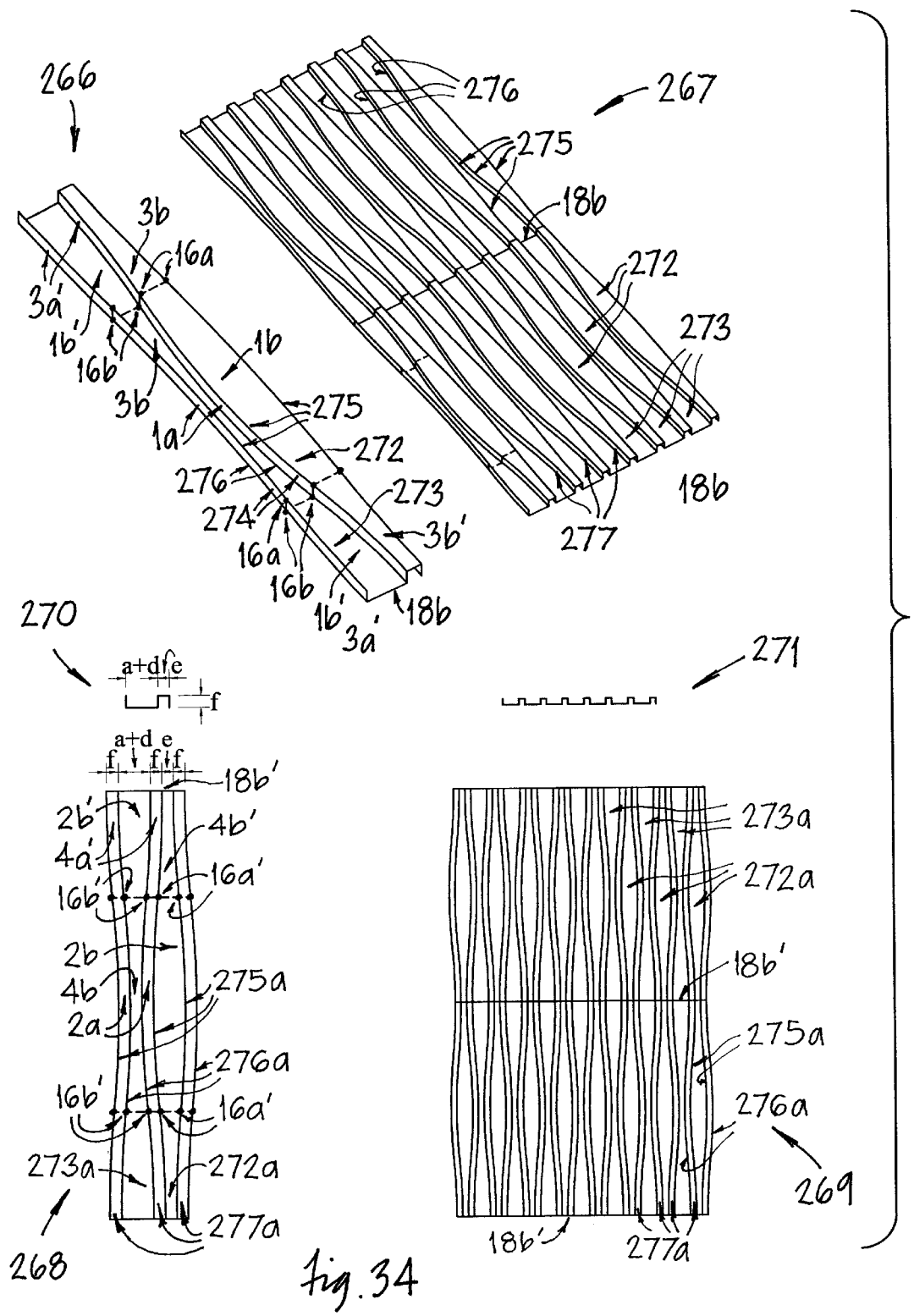
FIGS. 34–36 show three different variations of 44 in FIG. 11.
Figure 35:
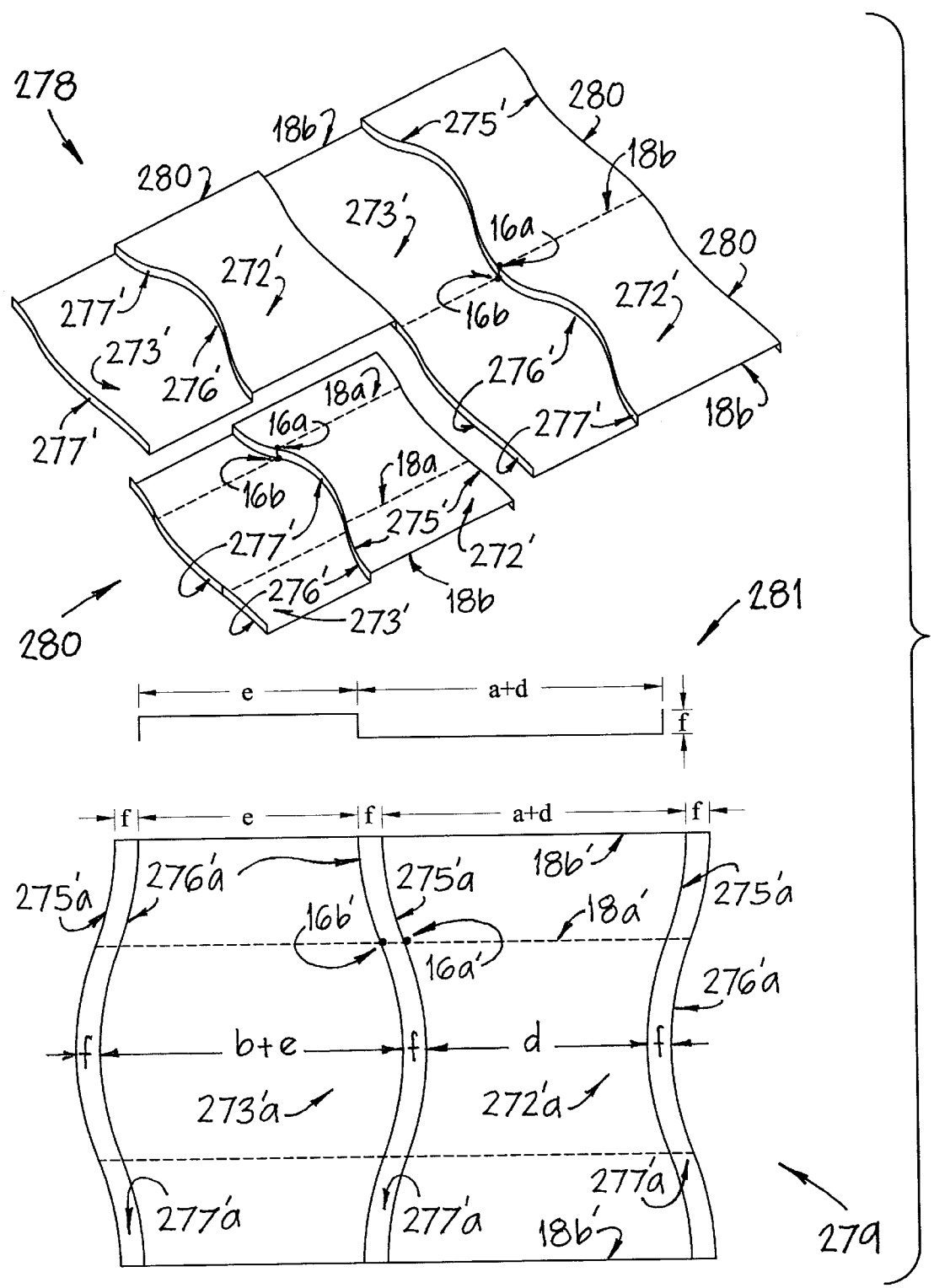
Figure 36:
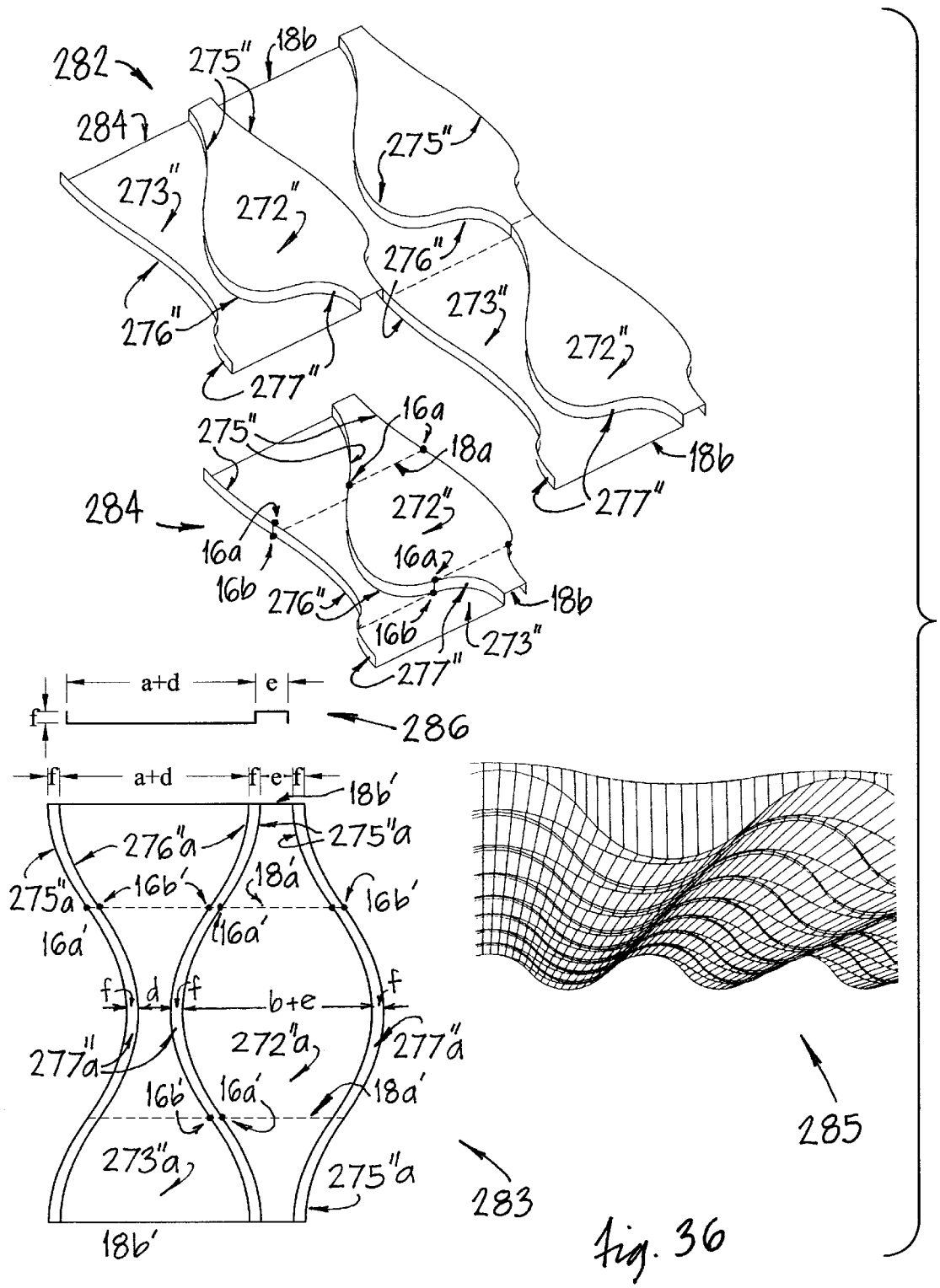

FIGS. 34–36 show three different variations of 44 in FIG. 11. They are obtained by varying j, a, b, d, e and f, keeping A=90° and A1=270° in all three cases. All three are based on the same 3-way corrugation shown in 44. These examples show how varying a few parameters, like the amplitude of the curve and distances between the curves, changes the design considerably. The first example shows a variation of a standard corrugated panel (one-way corrugation) with a rectangular wave as its cross-section. It is expected that this embodiment of the invention will be a stronger than the one-way corrugations. The second example shows how a variation, an undulated, modular panel system which is more suitable for covering larger surfaces like walls and ceilings. Here too, the curved surfaces are expected to be stronger than the available flat panel systems. The third example shows a modular vaulting system, where the curve of each module is steep enough to produce substantially arched cross-sections. All three examples are shown with l=4, and can be extended to any value of l.

FIG. 34 is a 3-way corrugated structure 267 having the cross-section 271, a rectangular wave, and the scoring pattern 269. It is undulated in plan and in its transverse section. It can be constructed by repeating the module 266 having the cross-section 270 and scoring pattern 268. 267 is composed of undulated faces 272 on the top layer, undulated faces 273 on the bottom layer, and undulated faces 277 which link the top and the bottom layers. The top wavy edges 275 and the bottom edges 276 are identical and have j=1/16. 267 is shown in two parts joined at the line 18b, and each part can itself be a separate module if needed for ease of fabrication. In 269, these two parts are joined at 18b' and it is easy to visualize how they can be repeated in both directions to cover larger areas by adding at 18b' in the longitudinal direction, and by placing them side-by-side in the transverse direction. The regions corresponding to the undulated faces are 272a, 273a and 277a and are bound by the curved lines 275a and 276a. In 266, face 272 is composed of concave region 1b in the middle with convex regions 3b' on either ends; in 268, the corresponding regions in 272a are 2b and 4b'. Face 273 is composed of concave region 3b in the middle with convex regions 1b' on either ends; in 268, the corresponding regions in 273a are 4b and 2b'. Faces 277 are composed of convex region 1a in the middle with concave regions 3a' on either ends; in 268, the corresponding regions in 277a are 2a and 4a'. The curved lines 275a and 276a have the points of inflection 16a' and 16b', respectively. As before, the convex regions alternate with the concave regions around 275 and 276. The distances between the curves equal f, a+d, f, e and f at the ends as shown. In the middle, the corresponding lengths are f, d, f, b+e and f. In the folded state, the end section 270 has a depth f, with the widths at the top and bottom layers equal e and a+d, respectively. In the mid-section, these widths change to b+e and d, respectively. For corrugated sheet materials, these lengths range from a fraction of an inch to several inches. The lengths increase for larger scale structures and reach up to several feet or tens of feet, depending on the size of the structure.

FIG. 35 shows an undulated curved panel structure 278 composed of modules 280, with each module having a cross-section 281 and scoring pattern 279. This structure is a stretched version of 267 in FIG. 34, and is also a 3-way corrugated structure, i.e. it too is undulated in plan and side view, and has a rectangular wave cross-section in addition. The angles of bend A and A1 remain the same as in 267, the values of a, b, d, e are different, the value of c is comparable, and j=¼. The widths e and d can range from several inches to several feet in case of sheet material structures, and larger in case of cast materials. The structure 278 is composed of undulated faces 272' at the top (crest) layer, undulated faces 273' at the bottom (trough) layers, and undulated faces 277' which join both. The top wavy edges are 275' and the bottom edges are 276' with the respective points of inflection 16a and 16b. The top and bottom edges are identical curves and are parallel to each other. In 279, the corresponding regions are 272'a, 273'a and 277'a which are bound by the curves 275'a and 276'a. The values of a, b, d, e and f could be varied to get shallower, deeper or wider structures, or completely irregular structures. The module 280 can be repeated in both directions in the same manner as 267.

FIG. 36 shows the structure 282 composed of modules 284 having the scoring pattern 283 and cross-section 286. This structure is another variation of 267, also obtained by varying the widths and the value of j, keeping A and A1 constant. Here j=½, the curves are steeper, and lead to a vaulted version of the panel system as can be seen in the perspective side view of a vaulted ceiling 285. Compared with 278 of FIG. 35, this structure has smaller values for lengths e and d. Structure 282 is composed of undulated faces 272" at the top (crest) layer, undulated faces 273" at the bottom (trough) layers, and undulated faces 277" which join both. The top wavy edges are 275" and the bottom edges are 276" with the respective points of inflection 16a and 16b. The top and bottom edges are identical curves and are parallel to each other. In 284, the corresponding regions are 272"a, 273"a and 277"a which are bound by the curves 275"a and 276"a. The values of a, b, d, e and f could be varied to get shallower, deeper or wider structures, or completely irregular structures. The module 284 can be repeated in both directions in the same manner as 267. For smaller spans under twenty feet or so, the riser would range from fraction of an inch to several inches reaching up to a foot or so. For larger spans, the riser could be bigger as needed, based on the material and method of construction.

Figure 37:
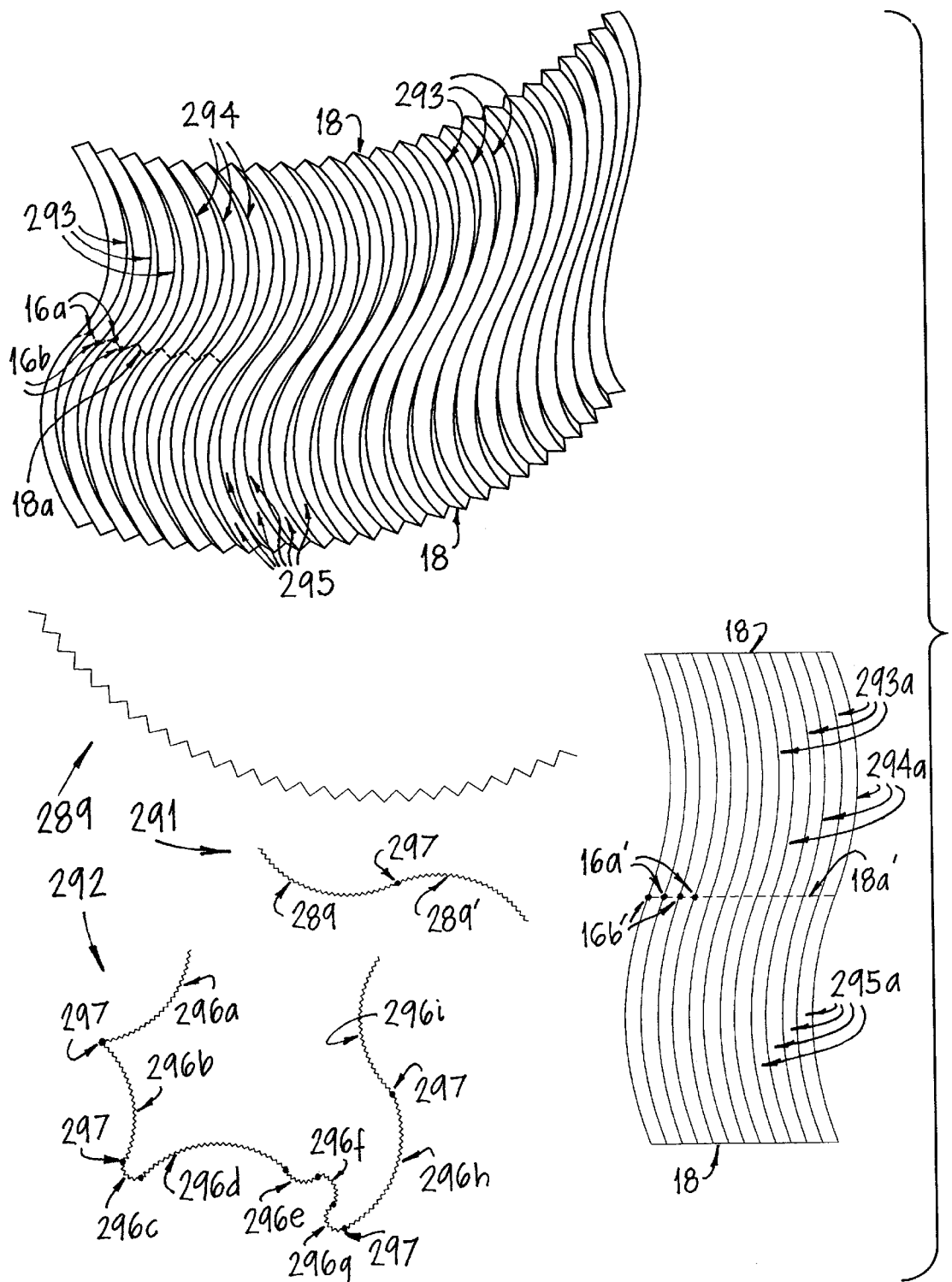
FIG. 37 shows curved and undulating configurations based on the wavy corrugated structure 42 of FIG. 10, but derived by curving the plane of 42.

FIG. 37 shows a curved structure 288 composed of the undulated corrugations derived by curving the plane of 42. In its plan view 289, it is a zig-zag circular arc with 26 ridges and is a one-third portion of a stellated polygon with 78 outer points (i.e. p=78). It is similar to columns in FIGS. 17–19 with the difference that as the number of sides of the primary polygon is increased, portions of the structure become usable as walls and space-defining partitions. 288 is composed of two types of curved edges 293 at ridge points and 294 at valley points, and one type of undulated face 295. 295 is composed of alternating concave and convex faces as in the columns in FIGS. 17–19. The angle of bends are: A=90° at 293 and A1=93.3766° at 294. The curves have points of inflection 16a and 16b in the middle, and the curve has j=¼. The points of inflection are also centers of 2-fold axis of rotation around which adjacent faces rotate at 180°. The structure is shown with l=2. The scoring pattern 290 is for a portion of this structure and shows the scoring lines 293a and 294a for edges 293 and 295, and the regions 295a which curve into faces 295. The points of inflection 16a' and 16b', along with the line 18a' which joins these points, also correspond to their respective counterparts in 288. The outer edges 18 provide a way to extend the structure by adding identical structures at 18. 289 can be used as a module to design repeating or non-repeating configurations. In 291, a convex module 289 and a concave module 289', are joined at the point 297 in an S-curve, leading to the possibility of a variety of undulating plan configurations by using many such convex and concave modules. The modules can be varied to have different curvatures (in plan) and irregular wall configurations like 292 are possible. 292 id composed of nine different curved modules 296a-I, meeting at points 297. The curves can be any regular (e.g. conic sections) or arbitrary curves. The plan configuration 291 can be turned into a horizontal or tilted plane to provide a variety of undulated ceilings from 288.

Figure 38:
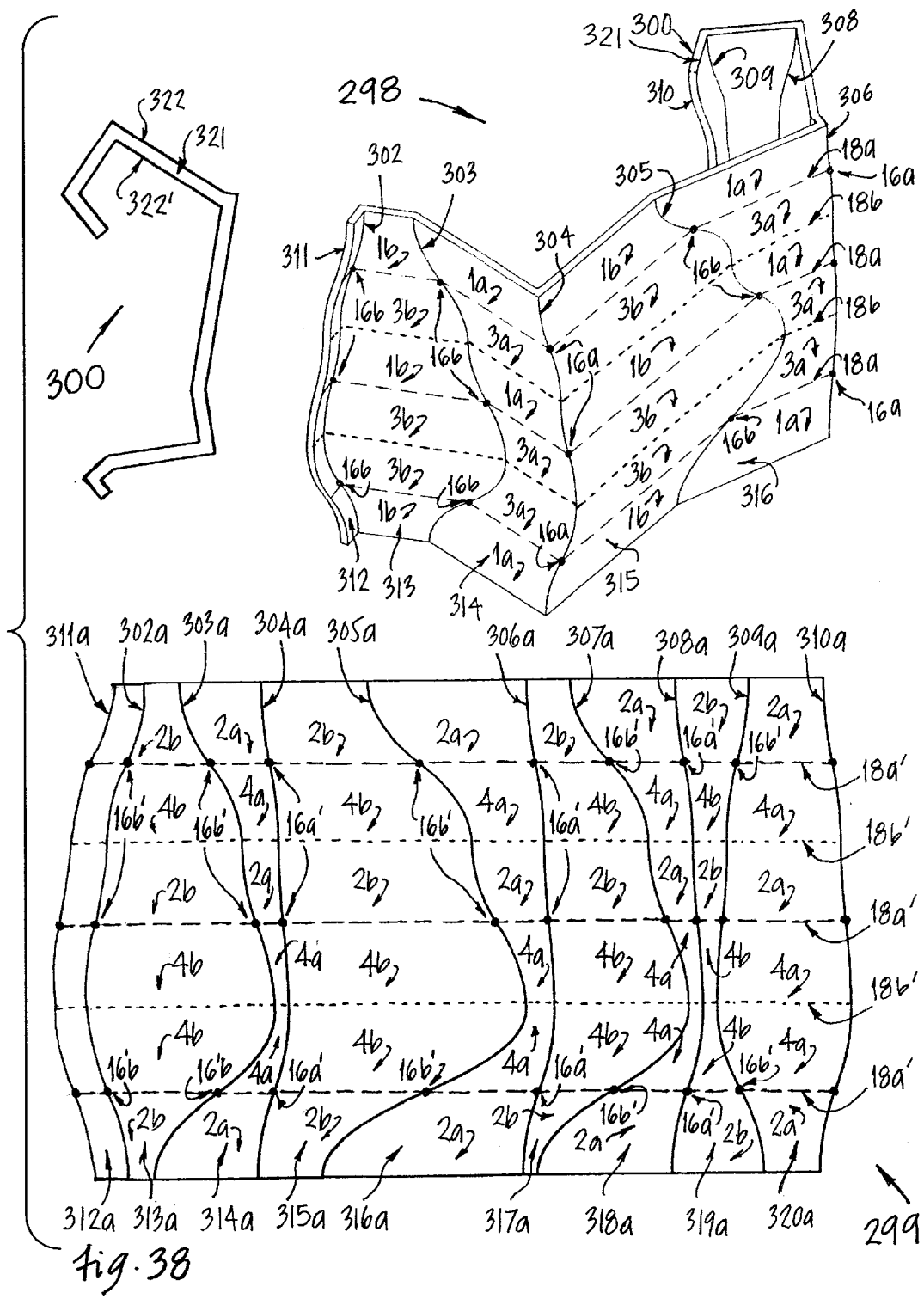
FIG. 38 shows an irregular undulated surface bent at variable convex and concave angles and obtained by composing several wave segments having different values of j.

FIG. 38 shows an irregular curved surface 298 with its scoring pattern 299. This example is similar to FIG. 9, especially the cross-section 55 shown there. 300 is the top end with the substantial thickness 321 shown in this particular embodiment. Due to the thickness of the structure, the outer surface 322 and the inner thickness 322' are not identical; though the curvature of the surfaces and the edges remain unchanged, the distances between the curved edges are different in the inner and outer surfaces. 298 is composed of faces 312–320 (faces 317–320 are not visible in the view shown), and their corresponding regions in 299 are 312a–320a, respectively. These faces meet at edges 302–309, with ends 310 and 311; in 299, the corresponding curves are 302a–311a. Edges 302, 303, 305 and 307 are at concave bends at angles A1=270°, 210°, 198° and 204°, respectively. Edges 304, 306, 308 and 309 are at convex bends at angles A=90°, 90°, 90° and 108°, respectively. All edges have l=3 and three points of inflections located at levels 18a; these points are 16a at the convex bends and 16b at the concave bends with corresponding points 16a' and 16b' in 299. Optional points of inflection are possible at levels 18b, depending on the sequence of the curved surface segments which make up the faces. Alternate faces 313, 315, 317 and 319 are composed of the following sequence of convex surfaces 3b and concave surfaces 1b (reading from top down): 1b, 3b, 1b, 3b, 3b and 1b. Alternate faces 312, 314, 316, 318 and 320 are composed of the following sequence of convex surfaces 1a and concave surfaces 3a (reading from top down): 1a, 3a, 1a, 3a, 3a and 1a. In 299, the regions corresponding to 1a, 3a, 1b and 3b are 2a, 4a, 2b and 4b, respectively. As in earlier structures, the convex and concave surfaces meet at the curved edges, i.e. 1a and 1b share the same edge and 3a and 3b share the same edge. The lines 18b and 18b' define three levels in the structure with all the edge segments in the top level having j=⅛, in the middle segment having j=¹⁄₁₆, and in the bottom segment having j=¼. It is this variability combined with a variable angle of bend and varying distances between the edges which enable a designer to control the irregularity of the structure. Used in a vertical orientation, 298 is useful for architectural walls or partition systems. Used in a horizontal or inclined orientation, roofs and ceilings are possible. The thickness 321 permits the possibility of double walled structures, e.g. hollow surfaces which are lighter and have insular advantages. Hollow structures could be designed with an interior framework having the same curvature of edges and faces as the exterior surface.

Figure 39:
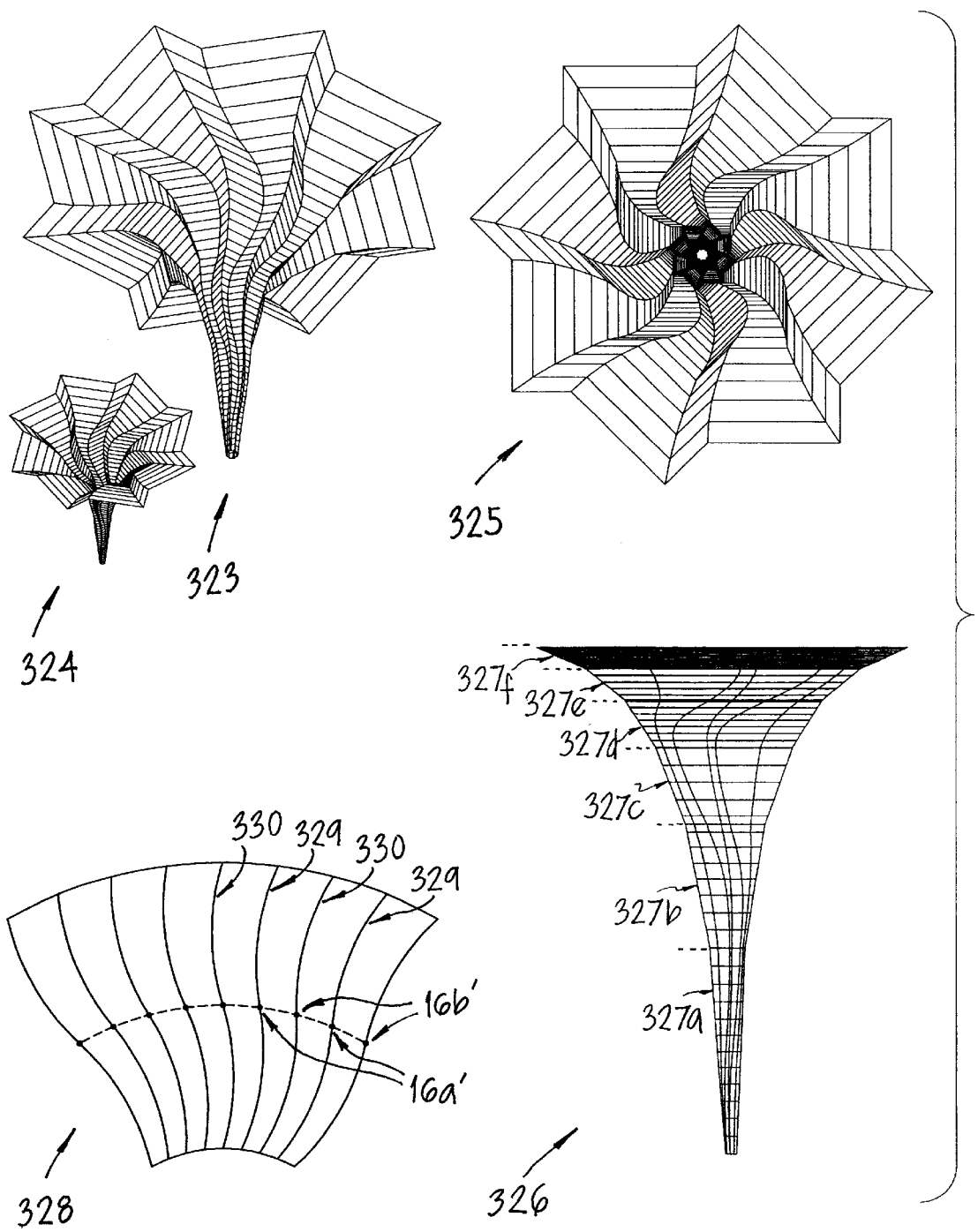
FIG. 39 an umbrella column obtained obtained using wavy truncated pyramid segments. Each segment has a radial scoring pattern as opposed to the parallel scoring pattern in earlier figures.

FIG. 39 shows a variation of the cylindrical columns shown in FIGS. 17–31. The parallel scoring patterns of the cylindrical columns can be transformed into radial scoring patterns to obtain folded conical (or pyramidal) columns. For example, the scoring pattern 328, with l=1 and one point of inflection (16a' and 16b') at each of the two curves, 329 (ridge curve) and 330 (valley curve), would fold into a wavy pyramidal form with its apex truncated. This form would have cross-sections which are 4-pointed stars; compare 328 with the pattern 107 of FIG. 17 and imagine only one S-curve segment of 107 lying between points 16a' is selected and converted into a radial pattern. When pyramids of varying apex angle (or taper) are stacked up, an umbrella structure 323 can be obtained; it is shown in a perspective view looking up. 324 is the top perspective view of the same structure, and 325 is the plan view looking up. In the elevation view, the different frustums of pyramids 327a–f are indicated. Each frustum is folded separately and stacked up. Multiple umbrellas can be used to produce a vaulted environment. All embodiments shown in FIGS. 17–38 can be similarly transformed into tapered structures using radial versions of the their scoring patterns.

Figure 40:
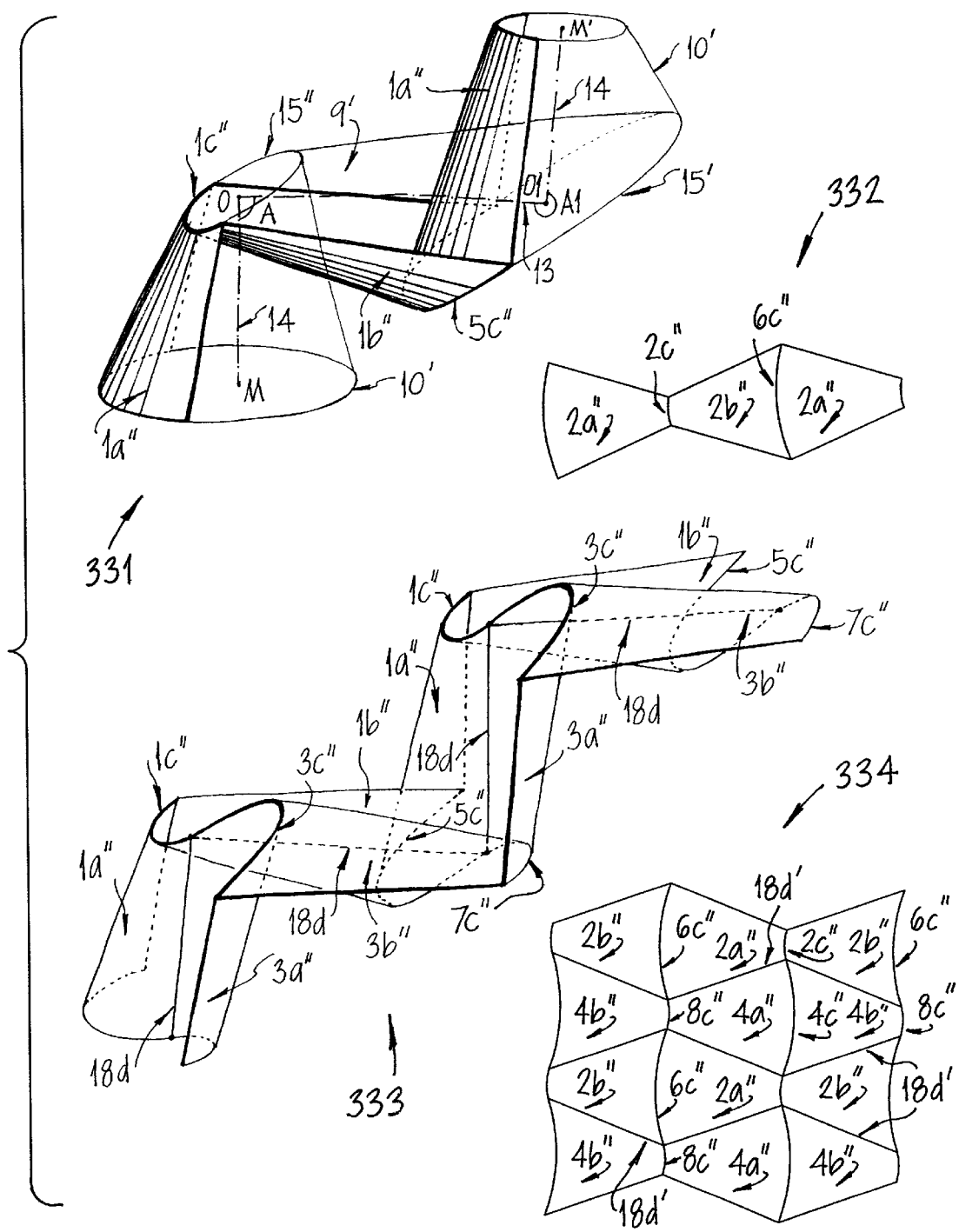
FIG. 40 shows an undulated surface when the generating elements are portions of cones instead of cylinders.

FIG. 40 shows two structures, 331 and 333, along with the corresponding scoring patterns 332 and 334. These examples illustrate a variation of the invention when the generating elements are portions of cones instead of cylinders. 331 corresponds to 25 in FIG. 5, and 333 corresponds to 33 in FIG. 7. Similarly, variations can be derived from all other structures shown earlier by replacing the generating cylinders with other cylinders, cones or other singly-curved generators. Cylinders with other conic sections, e.g. parabolic or elliptic cylinders, cylinders based on other curves, irregular cylinders, or cylinders of different sizes can be used as alternatives. The generating cylinders could be upright or oblique (i.e. tilted).

The curved structure 331 has a surface common to three cones, two upright cones 10' and one horizontal cone 9'. The axes of the cones, 14, 13 and 14, have a convex bend of angle A at O and a concave bend of angle A1 at O1. The structure is composed of three parts, convex surface 1a", concave surface 1b" and the concave surface 1a". 1a" and 1b" bend at edge 1c" at angle A; 1c" is part of the ellipse 15". 1b" and 1a" (the second upright cone) bend at edge 5c" at concave angle A1; 5c" is part of the ellipse 15'. In 332, the regions 2a" correspond to 1a" and 2b" corresponds to 1b", and the edges 2c" and 6c" correspond to the edges 1c" and 5c", respectively.

The curved structure 333 is obtained by extending 331. Four cones are shown in a zig-zag arrangement in two rows. The zig-zag pattern can be extended and more rows added to obtain a planar structure similar to 42 of FIG. 10. In the back row (the extension of 331), convex surface 1a" and concave surface 1b" alternate at the bends. In the front row, which shares the edges 18d with the back row, concave surface 3a" and convex surface 3b" alternate at the bends. The pair of surfaces 1a" and 3a", and 1b" and 3b" produce a continuous undulated surface and each pair is joined seamlessly at 18d. In 334, a portion of the repetitive pattern obtained by extending 333 is shown. Regions 2b" and 4b" alternate (reading from top to bottom) and correspond to 1a" and 3a", respectively, and regions 2a" and 4a" alternate and correspond to 1b" and 3b". From left to right, regions 2b" and 2a" alternate and correspond to 1a" and 1b", and in the row below, regions 4b" and 4a" alternate and correspond to 3a" and 3b", respectively. The edges 2c" and 4c" make one set of wavy lines corresponding to the edges 1c" and 3c", and the other set is composed of edges 6c" and 8c" corresponding to 5c" and 7c", respectively.

Figure 41:
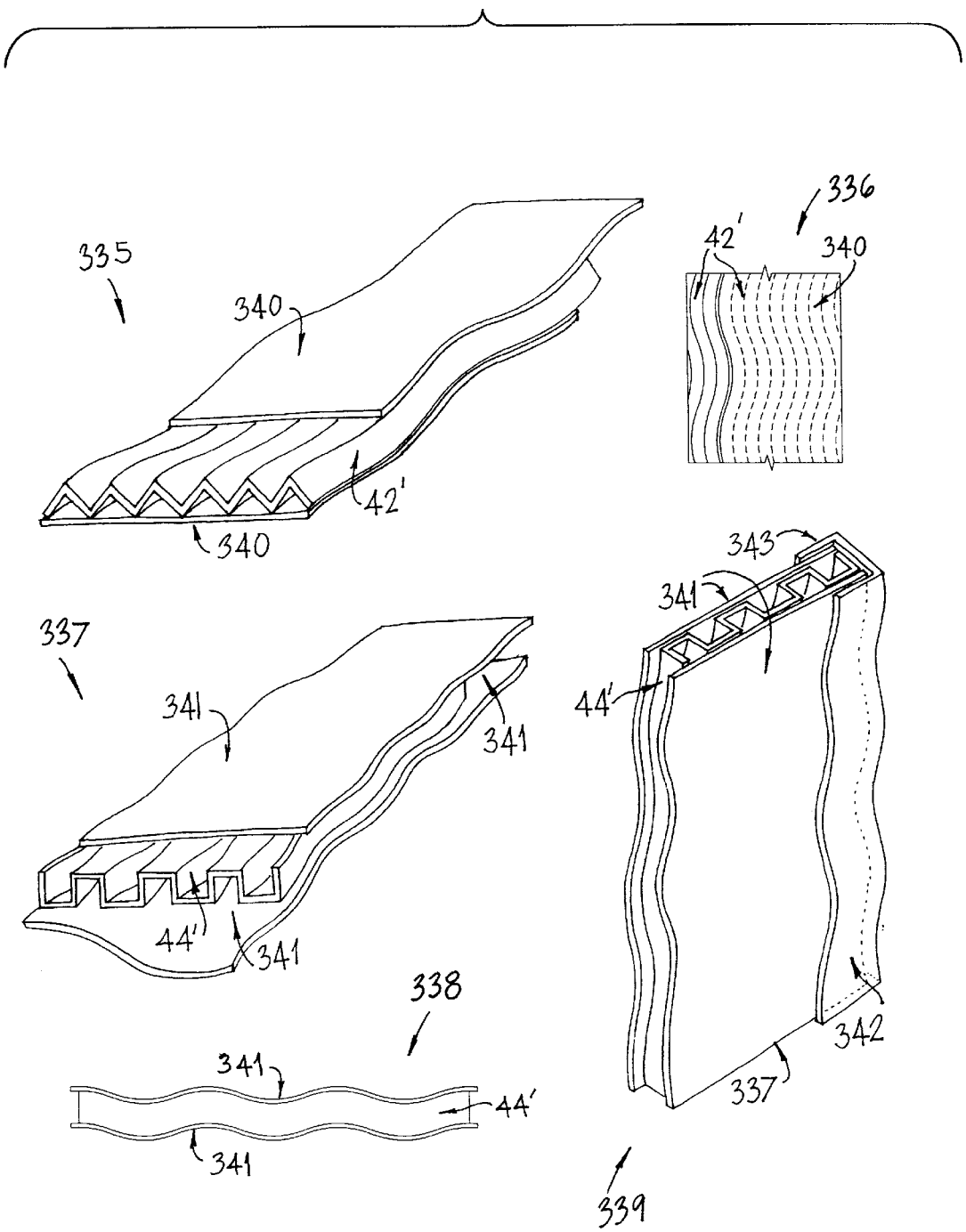
FIG. 41 shows two sandwich panels, one for the 2-way wavy corrugation 42 and the other for the 3-way corrugations of FIGS. 34 or 35. The former makes a flat panel, the latter an undulated panel.

FIG. 41 shows two different sandwich panels obtained by sandwiching the wavy corrugated sheet as the inner core between two surfaces, one on top and the other at the bottom of the core. Any of the corrugated structures of FIGS. 10–13 could be used this way. 335 is obtained by sandwiching the 2-way corrugated structure 42' between two flat panels 340. 42' is a stretched version of the corrugation 42 of FIG. 10, and is shown here with a thickness of a real material. 336 shows a detail of the sandwich in plan view with the top surface removed in part to reveal the core. 337 is based on the 3-way corrugated structure 44 of FIG. 11 or, alternatively, the structure 267 of FIG. 34. The core 44', shown with a thickness, is sandwiched between the outer surfaces 341 which undulate. In the side view 338, the wavy undulation of the top and bottom surfaces is clearly visible. These undulations remain the same at any longitudinal section (i.e. where the section plane is parallel to the direction of the wave) through the sandwich. In 339, this sandwich panel 337 has a undulating channel member 342 at one of its ends to provide a framing device. The cross-section of 342 is the U-shaped section 343 visible in this isometric view. The framing member provides strength at the edges of the sandwich and also provides a way to attach this panel to another surface or a fixed structure. For example, the framing member could have an affixed hinge mechanism for door-type applications. The wavy corrugated cores of the sandwich panels 335 and 337 could be folded from sheet material based on the invention. Alternatively, they could be stamped or pressed from sheets (e.g. metal), and then laminated to the outer surfaces. The sharp bends in the cross-section of 42' and 44' could be rounded off to facilitate forming. In 335, rounding off would also facilitate facial contact with the outer surfaces to facilitate bonding. Corrugated sheets in paper or plastic are viable applications and provide for alternatives which are stronger than the standard one-way corrugations.

Figure 42:
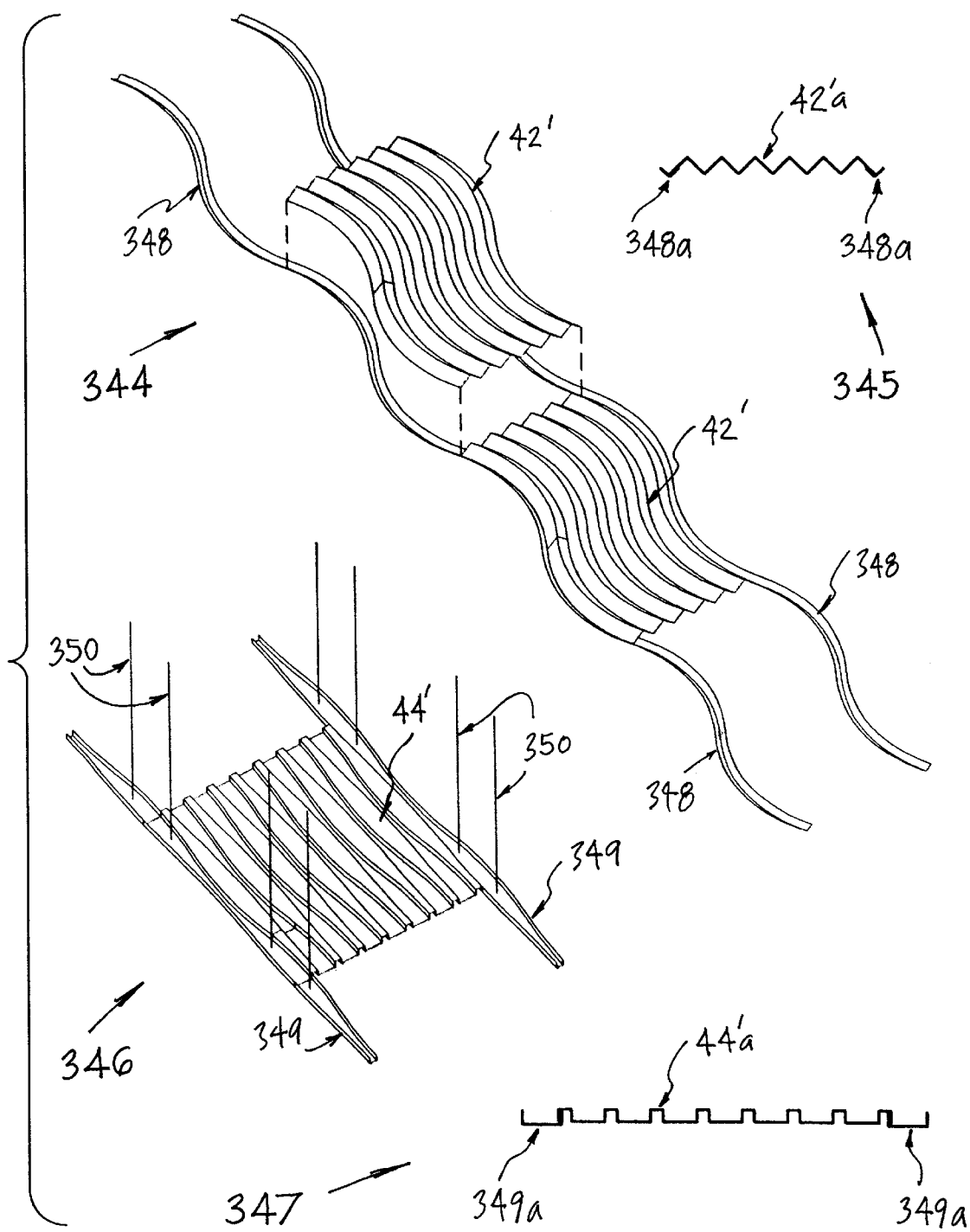
FIG. 42 shows suspended ceiling panel system for two different panels, 42 and 267 of FIG. 34.

FIG. 42 shows the application of corrugated structure 42 (FIG. 10) and 44 (FIG. 1) to suspended ceiling systems 344 and 346. 344 is composed of wavy panels 42' supported by two wavy hangars 348 on either sides of the panels. 348 are wavy versions of standard angle sections and have the same property of strength associated with such angle profiles. In the illustration, only two panels are shown as modules, with one in a lifted position, also suggesting a way to put the panel in place after the hangars are in place. More modules and hangars can be added in both directions to cover a larger surface. The hangars would require additional devices (e.g. cables or rods at the points of inflection) so the system can be suspended from the ceiling. The hangar 348 has a convex angle of bend and its surface curvature matches that of the panel to enable a proper fit. This is clear in the cross-section 345 which shows the panel section 42' aand the hangar section 348a having the same angle. The system 346 is composed of panels 44' supported by hangars 349 which are suspended from the ceiling by elements 350. The hangars could be extended in length, more panels could be added along the length of the hangars and additional bays could be added to cover a larger area 44' and 349 have the same angle of bend A=90°, and same values of j so that the two make a perfect fit as seen in the cross-section 347 where the panel section 44' *a* sits snug on the hangar sections 349*a* on either sides.

Figure 43:
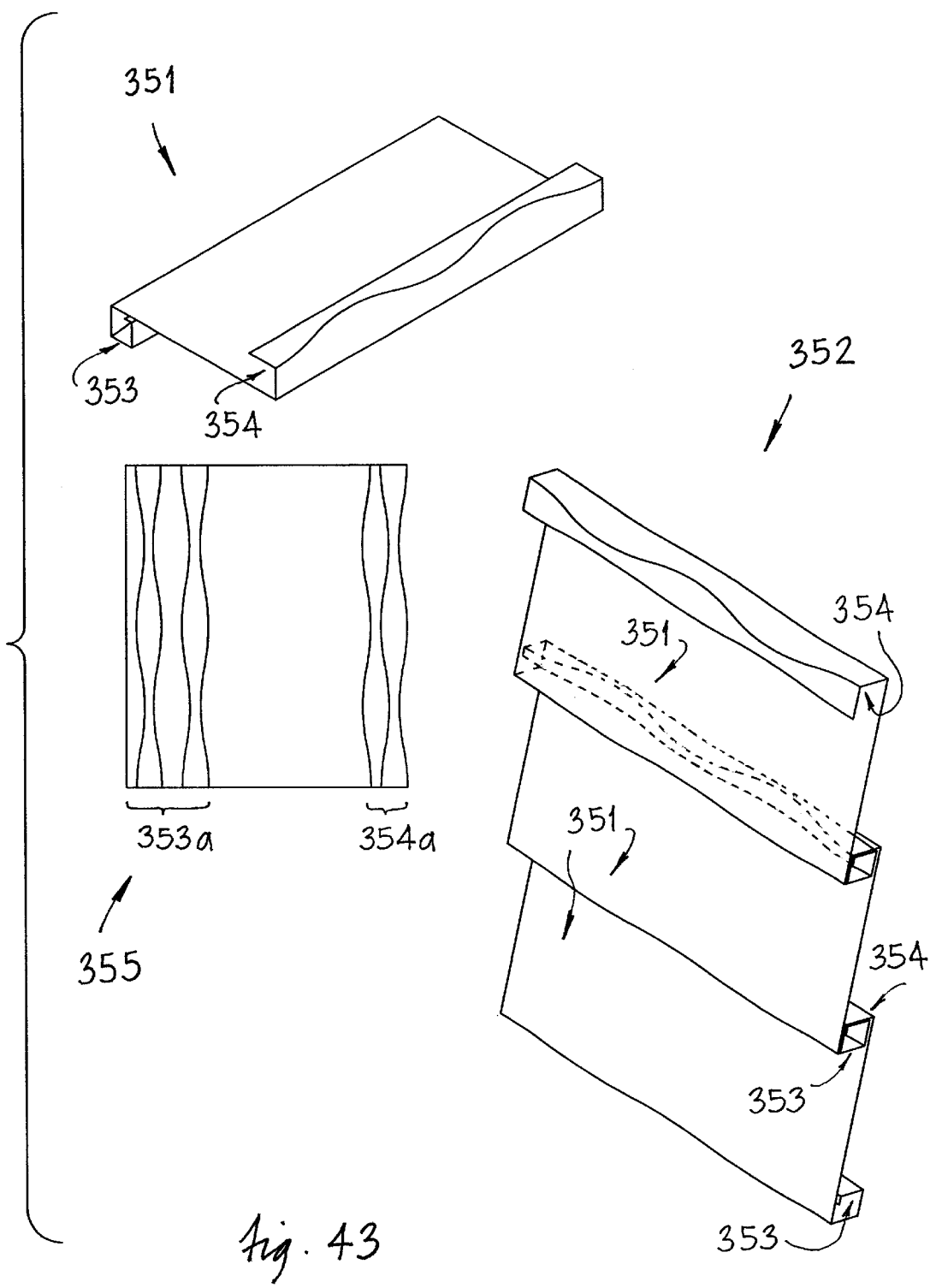
FIG. 43 shows a wavy shingle system or siding using interlocking panels.

FIG. 43 shows an application of the invention to the design of interlocking shingle panels for walls and roofs of buildings. The single panel 351 has two different folds 353 and 354 on either ends. The ends are designed such that 353 fits inside 354 of adjacent panel as shown in the assembly 352. The edges bend at A=90° and A1=270°. The scoring pattern 355 shows the two corresponding ends 353*a* and 354*a;* it also shows how varying the distances between identical curved lines can lead to this type of design, and other designs as well.

Figure 44:
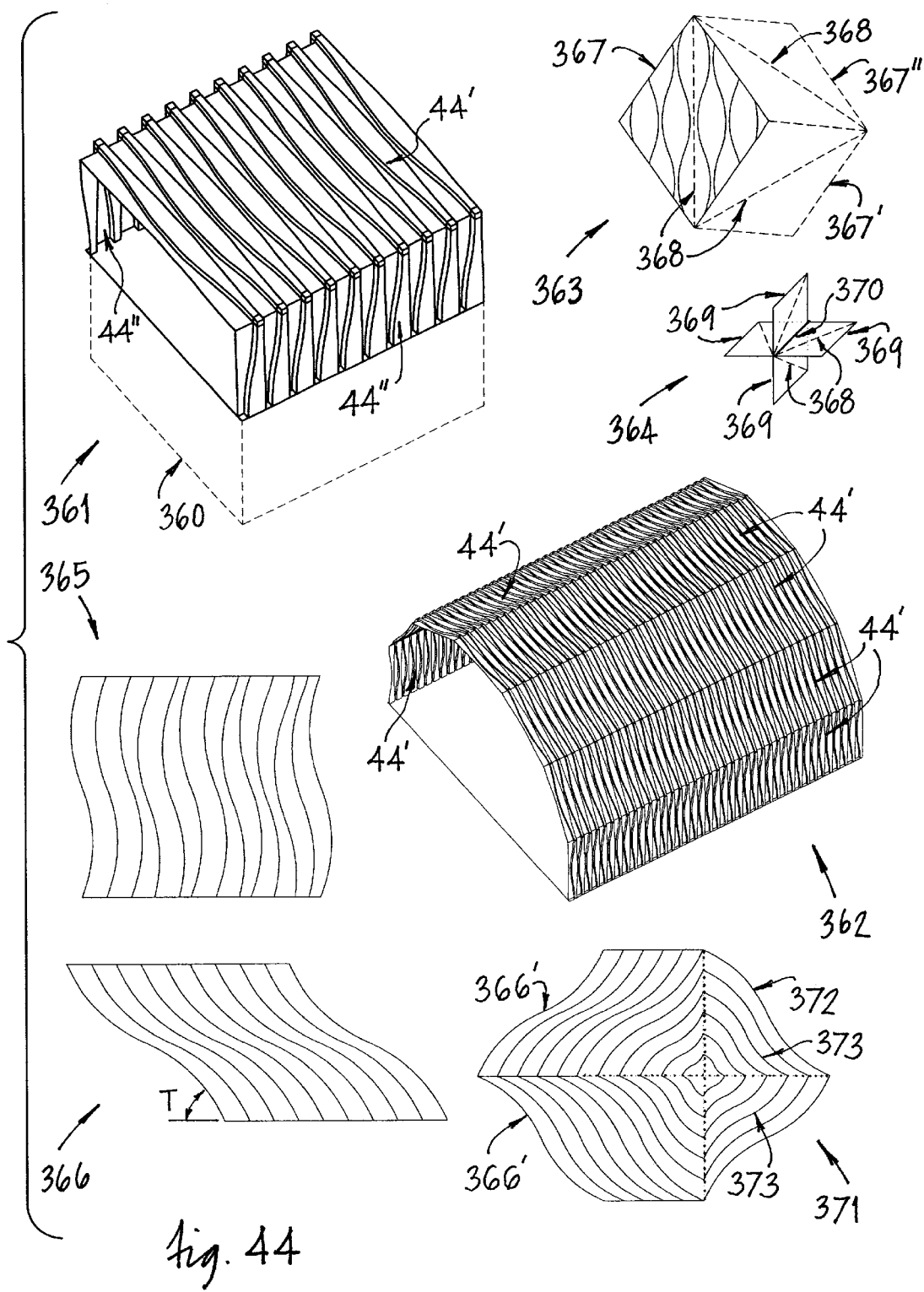
FIG. 44 shows examples of modular structures composed from wavy corrugated panels. Examples include two vaults based on prisms and using rectangular panels, and three configurations using rhombic panels.

FIG. 44 shows another embodiment of the invention where the wavy corrugated panels of FIGS. 10–13 are used as faces of polyhedral structures. Structure 361 is an enclosure based on one-half of a square prism. The top half of the square prism is defined by corrugated panels and the bottom half is indicated by dotted lines 366. It is composed of one wavy corrugated panel 44' (a derivative of 44 in FIG. 11 and similar to 267 in FIG. 34), and two panels 44" which are each half of 44'. Structure 362 is a vault-type enclosure based one half-of a 14-sided polygonal prism and composed of seven rectangular faces with each face defined by a wavy corrugated panel 44'. 363 shows a wavy corrugated panel in the shape of a rhombus 367 which is used as a face of periodic or non-periodic tiling or a zonohedron. In the illustration, only three rhombuses are shown, with two of them, namely 367' and 367", in dotted lines. The diagonal of these rhombii, 368, is indicated to show how the tiling can be continued by aligning the corrugations along the diagonal. This way the 2-fold axis of symmetry of any of the corrugations in FIGS. 10–13 can be matched with the 2-fold symmetry axis of a rhombus, and in corrugations with mirror planes (like 44), the mirror planes of the corrugation and the rhombus can be brought into coincidence. 364 shows how several of the rhombic or square panels 369 can be grouped around a common edge 370, illustrating the possibility of using the wavy corrugated panels as faces of periodic or non-periodic space-fillings. In the example shown, four panels are shown around 370 and the diagonals 368 are also indicated for each panel. 365 shows a scoring pattern for a rectangular panel and composed of curves which shift in a random manner. 365 shows a scoring pattern based on a parallelogram or rhombus by translating the same curve at any angle T. In the example shown, T=45°. When folded, this panel is a skewed or tilted version of the structure 42 (FIG. 10). These two variations provide alternative panels which can be used as faces of a tiling, a polyhedron or a space-filling. As an example, 371 shows the plan view of a portion of a periodic or non-periodic tiling composed of two corrugated rhombic panels 366', and one corrugated square panel 372 composed four quarter-segments 373. Other examples can be similarly derived.

Figure 45:
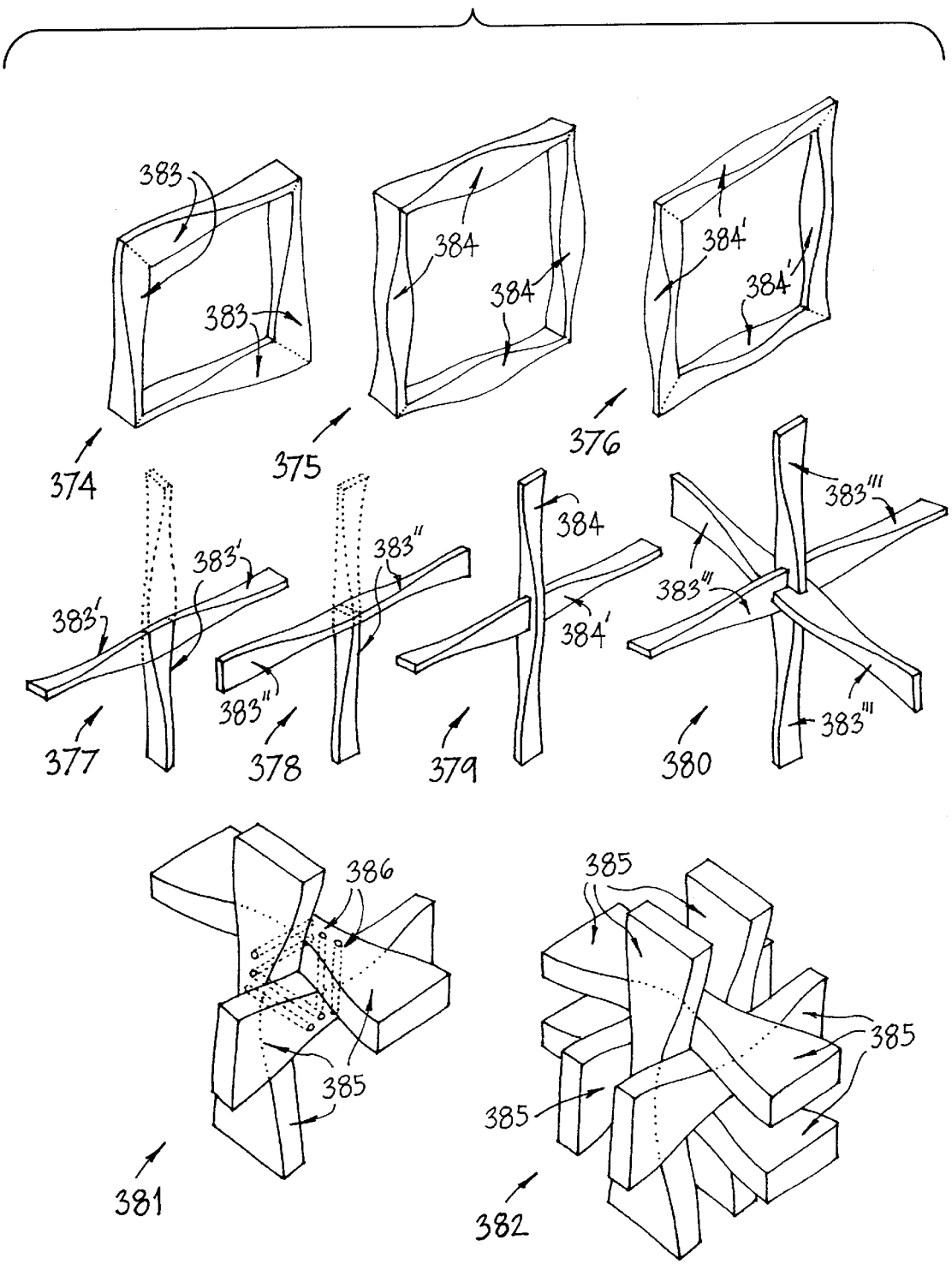
FIG. 45 shows the construction of 2-dimensional and 3-dimensional space frames from undulated members. Different examples of joints are shown for members having a rectangular cross-section.

FIG. 45 shows the application of the invention to the design of 2-dimensional and 3-dimensional space frames composed of columnar members described in FIGS. 17–31. The examples are shown with linear members 383, 384 and 385, each having a rectangular cross-section. The ends of some of these members are modified for the purposes of joining to other members. 383 can be folded from scoring pattern 168, and 384 from pattern 169 of FIG. 23. Also, two of 383 joined end-to-end make one of 384, as already evident from their scoring patterns. The square frame 374–6 are each composed of four identical members joined at 45° at mitered corners. 374 is composed of four members 383 folded from a slight modification of the scoring pattern 168 in FIG. 23; the modification deals with mitering the ends. 375 is composed of four members 384 folded from a slightly modified version of the scoring pattern 169 in FIG. 23. 376 consists of four members 384', and is also folded from a modification of 169. 384' has the same original form as 384 but is turned at 90° and mitered accordingly. 377–379 show three different ways of joining four members in a 4-way connection. In 377, the flatter ends of 383' are joined, in 378 the deeper ends of 383" are joined, and in 379 the 384' passes through 384. The connections 377–9 combined with the frames 374–6, enable the formation of frames based on the square and rectangular grids. The 3-dimensional counterpart, i.e. cubic and orthorhombic grids can be realized with 3-dimensional joints like the one shown in 380. In 380, six identical members 383''' meet at a cubic joint in a symmetrical manner. The longitudinal axes of the members (i.e. 2-fold axes) are aligned with the 4-fold axes of the underlying cube so that the 3-fold axes passing through the corners of the underlying cube are retained in the joint configuration. 381 shows an alternative joining system with three members 385 in a manner that the members touch but do not intersect. The scoring pattern of 385 is similar to the pattern 169 (FIG. 23) but is shifted and extracted from a different portion of 170. Pins 386 are shown as the joining devices to secure the configuration, and alternative methods of joining (welding, tabs, additional pieces, etc.) could be used. In 382, the joining system of 381 is extended to have three pairs of members 385 in a non-intersecting joint. Applications of 381, 382 and 383 are varied and include architectural frames, shelving and furniture systems and toys or puzzles.

Instead of four-sided frames, any number of sides could be used. The frames can be adapted to receive glass or other material to make transparent, translucent or opaque framed systems and curtain-wall systems. In the latter, the glass could be flat or curved. i.e. undulated. Other 2-dimensional and 3-dimensional tiling systems could be used as a basis to derive 2-d and 3-dimensional space frames composed out of undulated members based on other columnar structures of FIGS. 17–31.

Figure 46:
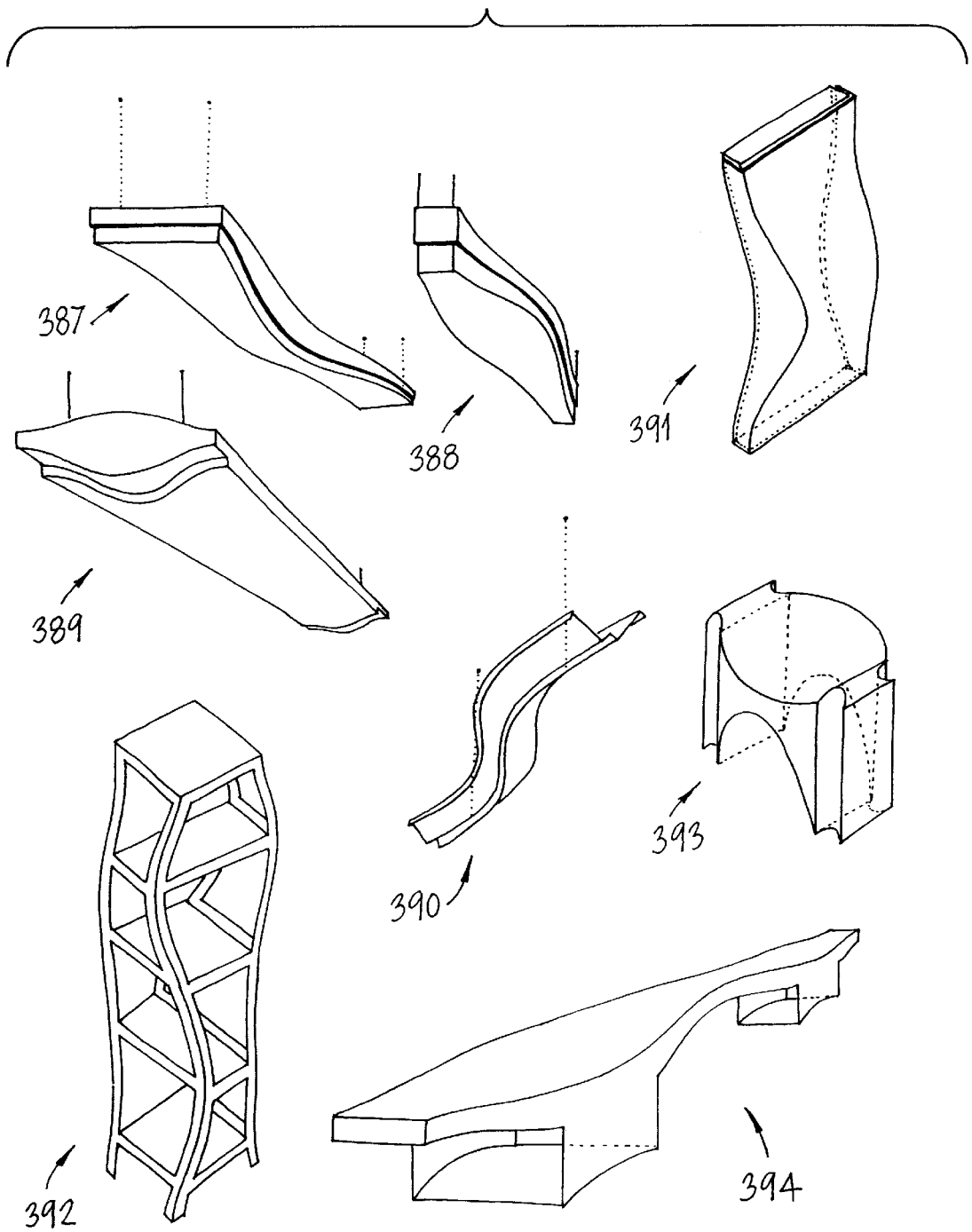
FIG. 46 shows miscellaneous design applications, five different concepts for lighting systems, a modular seat, a bench and a undulating skeletal frame for a shelf

FIG. 46 shows miscellaneous applications of the invention to the design of a variety of utilitarian objects and furniture constructed from scoring and folding a sheet material. 387–391 are five examples of lighting designs of which the first four are suspended and the fifth one (391) is wall-mounted 387 and 388 are constructed in two halves, and 389, 390 and 391 are constructed from one piece of sheet material. 392 introduces cut-outs in the scoring pattern to produce a skeletal framework for use as a wavy shelving system. The introduction of different shapes of cut-outs in the design for functional and aesthetic reasons, including reduction of weight, permit other applications. 393 is a modular seat with rectangular ends which permit easy attachment to adjoining seats. It is also constructed from one piece. 394 is an undulated bench with A=90°. It is different from others in that cut-outs are needed in the scoring pattern. Several variations are possible.

Various approximations of the geometry can capture the visual "look" of the designs and embodiments of the invention disclosed here. However, such appearance-based approximations are deficient for several reasons. The open-ended design flexibility called upon by architects, designers, and engineers, and made possible in part by the increasingly sophisticated computational environments available to them, requires generalized procedures for modeling the geometry of these structures. The accuracy of the modeling procedure becomes imperative in large-scale architectural structures where bending-resistant materials defy deformation of the surface. In advanced manufacturing environments, such procedures can translate into economy of fabrication since a wide range of design possibilities can come form a single parametric model. A generalized geometric procedure for deriving the 3-dimensional model and 2-dimensional sine-waves needed for its scoring pattern is illustrated in FIG. 47. It is shown here for the curved surface 1 in FIG. 1, i.e. A=90° and j=1, and can be extended to all subsequent figures by changing A, A1, j and l, and the radius of the cylinder. When multiple curves are used in the scoring pattern, as in all examples shown earlier, other geometric variables like lengths a, b, c, d, e, f, g, h and i are needed. In addition, topologic variables like m, n, o, p and q are also needed. All of these variables have been described earlier within the specification of different embodiments. A generalized morphological model describes these parameters as independent "dimensions" of a higher-dimensional meta-model and maps, codes and indexes the entire range of possibilities in a higher-dimensional meta-structural framework which acts like a master-diagram of possibilities. In structures having crystallographic symmetry, these parameters can be associated with modeling the generalized fundamental region. The fundamental region, a known concept in the literature, is the minimum part of the structure bound by symmetry elements (axes of symmetry, mirror planes, axes of translation, etc.). The entire structure can be generated from the fundamental region by applying symmetry operations (reflections, rotations, translations, etc.) to it. New structures can be obtained by varying the parameters of the fundamental region. In architectural structures, the size of the fundamental region needs to be specified. In addition, the number of fundamental regions (related to p and l), the type of fundamental region (based on its symmetry group) need to be specified as well.

In FIG. 47, 395 shows the side elevation view of curved surface 1 of FIG. 1. The plan view of the first generating cylinder 10 (dotted lines) is in 396 and shows the circle 12. The end-on view of the second generating cylinder 9 (dotted lines) is in 397 and shows the circle 11. 399 is a isometric view of 1 and 398 is its 2-dimensional development as well as its scoring pattern. 1 is composed of concave region 1b which lies on one-half (bottom half) of 9, and convex region 1a which lies on one-half (left half) of 10. 1a and 1b meet at curved edge 1c and are bent at angle A. In 396 and 397, the respective halves of 12 and 11 are divided into 12 equal segments and the points on the circle in each case are marked from i–xiii. (The number of segments in the curve is represented by a variable k. In this example, k=12). The lines along the surfaces 1a and 1b and corresponding to these points meet at respective points i'–xiii' on 1c. In 398, the vertical sides 12' and 11' have a length equal to half the perimeter of 12 and 11, and entire surface is divided into 12 equal segments by horizontal lines i–xiii. The points i'–xiii' are marked off from either 12' or 11' along these horizontal lines at points equal to their distance from 12 or 11 (in 395). These points lie on a curve 2c which is the 2-dimensional development of 1c. 2c is the score line for obtaining the folded surface 1. By increasing the number of segments in the circle from 12 to a higher number, the curve 2c can be made smoother. Conversely, if the number of segments are reduced (to a minimum of k=2), folded surfaces with plane faces are obtained. As k is increased, the surface takes on a more facetted look, eventually becoming a smooth surface when k is a high number. This mapping provides a precise way to model the geometry of the score line. This procedure also provides a geometrically accurate way to model surface 1 in 3-dimensions.

In 400, three vertical cylinders are placed side by side and intersected by three horizontal cylinders. Surface 1 is in the middle and is joined to surfaces 3 (of FIG. 1) on either end at the points of inflection 16. The convex region of 1 is joined seamlessly to the concave region of 3, and vice versa. The undulated surface is common to the six cylinders. The development of the undulated surface is shown in 401 with the sine-wave curve composed of segments 4c, 2c and 4c, meeting at points of inflection 16'. When the scored along the sine-wave curve, and folded, the entire surface curves into the surface in 400. This procedure can be extended and applied accurately to all the embodiments disclosed here. The procedure can be automated so that a 3-d model based on the invention can be unfolded to give the scoring pattern and, conversely, the 2-dimensional scoring pattern can be folded into the 3-dimensional structure.

Various architectural applications of the invention includes columnar structures, walls and ceilings, roof structures, 2-way and 3-way corrugated surfaces, boards and panels (sandwiched or otherwise), wavy modular and space-defining (partition) systems, a variety of objects of art, and interior as well as industrial design objects like wavy furniture systems (chairs, benches, tables, stools, shelving systems, etc.), wavy lighting systems (suspended from ceiling, wall supported or free-standing, lighting tracks, etc.), household or industrial objects and their parts, insulating surfaces, and so on. Other applications include packaging designs, containers and boxes based on the invention.

Structures based on the invention could be made entirely from a single sheet or the parts could be fabricated from smaller sheets, especially in large-scale structures. When constructed in parts, joining details could be developed without compromising the geometric features and properties of the structures. Cut-outs in the sheets could be introduced, or patterns superimposed, for functional, structural or aesthetic reasons. Portions of surfaces could be used as wavy "standard sections", e.g. wavy angles, wavy channels, wavy box sections, etc. as alternatives to standard angle-sections, U-sections, box sections, etc., all aimed at introducing an integrated kit of parts for an industrialized organic architecture. Undulated space frames are possibilities, the simplest case being the wavy version of the cubic box-type frames.

The structures could be constructed from a variety of materials to suit specific design, architectural and fabrication needs. Structures could be formed from standard sheet materials like metal, paperboard, fabric (rigidized before or after forming), a variety of plastics and rubbers, etc. Instead of sheets, separate parts could be constructed from metal, plastics, plywood, masonite, other fibre boards, or other rigid materials that do not lend themselves to folding, and then assembled with suitable connecting devices or frameworks. The shapes could be cast in parts or in entirety from materials like hardening resins and rubbers, concrete, ceramics, glass, molten metal, etc. In cast structures, both outer and inner surfaces of the mould could be constructed from sheet materials like metal. In low-tech fabrication situations, visual approximations of the wavy curves could produce the desired structures having approximately the same shape and "look" of the structures disclosed herein. These approximations and variations would fall within the scope of the invention.

Different materials could be combined, e.g. metal framing members and curved glass panels for making undulated windows and transparent/translucent surfaces based on the invention. Structural glass could be combined with tension cables and compression struts, and various joining devices, to have frame-less glass surfaces for architecture. Undulated metal framing members could be combined with tension fabric surfaces as alternatives for membrane architecture. Perforated materials could be combined with opaque surfaces to modulate light and transparency.

Smart materials, e.g. shape memory alloys like martensites, or electro-rheologic materials, could be used to harden the structure in its folded state starting from a flat sheet. Alternatively, a flexible, adaptable structure which changes from a flat surface to a 3-d wavy surface could be constructed from a sheet material with smart responsive material embedded along the curved edges. A mechanical version of a deployable or erectable structure based on the invention could have wavy piano hinges or long flexible "live" hinges (fabric, plastic) between the surface members. Stereo-lithography could be used for modeling precise micro-versions of the invention, especially in the spin-off application to a new class of fastening devices as alternatives to the zipper and velcro systems. Such fastening devices have a surface-to-surface contact and utilize the positive-negative morphology of the corrugated surfaces disclosed here by juxtaposing two such surfaces face-to-face so that the positive part of one surface fits with the negative part of the other surface and vice versa.

What is claimed is:

1. Architectural structures composed of a plurality of continuously curved undulated surface elements bound by continuously curved undulated edges and formed by suitable means from a relatively rigid sheet material, wherein said surface elements are composed of a set of convexly curved surface segments alternating with a set of concavely curved surface segments in a smooth wave-like manner, and said edges are composed of a set of convex edge segments alternating with a set of concave edge segments in a smooth wave-like manner, one said convexly curved surface segment of one said surface element meets one said concavely curved surface segment of adjacent said surface element at said convex edge segment at a constant angle, and said concavely curved surface segment of one said surface element meets said convexly curved surface segment of adjacent said surface element at said concave edge segment at said constant angle, wherein said edge is the line of intersection between a pair of singly-curved surfaces of selected size and which intersect each other at said angle, and wherein successive said angles are selected from the group comprising:
    convex angles only,
    a combination of convex and concave angles,
    a combination of a first set of convex angles alternating with a second set of concave angles, said surface elements and said edges correspond to a 2-dimensional pattern comprising a plurality of plane areas and a plurality of lines, wherein each said plane area is bound by a pair of said lines on either side of said plane area, and each said plane area corresponds to each said surface element and each said line corresponds to each said edge, and wherein said lines are continuously curved and undulating 2-dimensional waves consisting of alternating convex and concave curved line segments, wherein each said curved line segment is defined by the development of a portion of said edge in 2-dimensions.

2. Architectural structures per claim 1, wherein said convex angles are equal or unequal.

3. Architectural structures per claim 1, wherein said combination of convex and concave angles alternate and add up to 180 degrees.

4. Architectural structures per claim 1, wherein said combination of convex and concave angles alternate and add up to more than 180 degrees.

5. Architectural structures per claim 1, wherein said combination of convex and concave angles alternate and add up to less than 180 degrees.

6. Architectural structures per claim 1, wherein said 2-dimensional pattern is periodic in two directions and has translational symmetry only.

7. Architectural structures per claim 1, wherein said 2-dimensional pattern is periodic in two directions and has a combination of reflective and translational symmetry.

8. Architectural structures per claim 1, wherein said 2-dimensional pattern is non-periodic or completely irregular.

9. Architectural structures per claim 1, wherein said 2-dimensional pattern is a branched fractal having a self-similar recursive design.

10. Architectural structures per claim 1, wherein said source surfaces are cylinders.

11. Architectural structures per claim 1, wherein said source surfaces are cones.

12. Architectural structures per claim 1, wherein said surfaces have cut-outs.

13. Architectural structures per claim 1, wherein said surfaces have surface patterns.

14. Architectural structures per claim 1, wherein selected portions of said surfaces are used as architectural elements selected from the group comprising:
    undulating element having an angle cross-section,
    undulating element having a U-shaped cross-section,
    undulating beam or column having a box-shaped cross-section,
    undulating beam or column having a polygonal cross-section,
    undulating element having any regular or irregular zig-zag cross-section, and
    undulating element having an undulating cross-section comprising alternating sets of convex and concave polygonal segments.

15. Architectural structures per claim 14, wherein said architectural elements are joined to one another in a composite configuration of elements.

16. Architectural structures per claim 1, wherein a plurality of said structures are used in configurations selected from the group comprising:
    multi-layered configurations, wherein said layers are attached to each other by suitable means,
    periodic configurations,
    non-periodic or irregular configurations,
    space-filling configurations.

17. 3-dimensional architectural structures made from sheet material and composed of a plurality of continuously curved undulated surface elements bound by continuously curved undulated edges, wherein adjacent pair of said surface elements meet at said edge at a constant angle, wherein said angle is convex or concave, and where said structures are derived from a 2-dimensional pattern using following method steps:

a first selection step where a 2-dimensional curved line segment is selected from a portion of the 2-dimensional development of said edge, where said edge is the curved line of intersection between a pair of selected singly-curved 3-dimensional surfaces of selected size and which intersect each other at said angle, a first pattern-generating step where said curved line segment is converted into a continuous and smooth 2-dimensional wave by applying symmetry operations of rotation and translation to said curved line segment, a second selection step where sequence of successive said angles are selected, and a second pattern-generating step where said 2-dimensional wave is converted into said 2-dimensional pattern by applying successive symmetry operations of reflections, or translations, or combinations of reflections and translations, to said 2-dimensional wave, a transference step where said 2-dimensional pattern is transferred to said sheet material or to a suitable forming device, a forming step where said sheet material is transformed into said 3-dimensional structure using suitable forming means.

18. 2-dimensional patterns for deriving 3-dimensional undulating structures composed of a plurality of continuously curved undulated surface elements bound by continuously curved undulated edges, wherein adjacent pair of said surface elements meet at said edge at a constant angle, wherein said angle is convex or concave, wherein said edges is a portion of the line of intersection between a pair of singly-curved surfaces of selected size which intersect each other at said angle, and said 2-dimensional patterns are composed of a plurality of plane areas and a plurality of lines, wherein each said plane area is bound by a pair of said lines on either side of said plane area, and each said plane area corresponds to each said surface element and each said line corresponds to each said edge, and wherein said lines are selected portions of continuously curved and undulating 2-dimensional waves consisting of alternating convex and concave curved line segments, wherein each said curved line segment is defined by the development of said edge in 2-dimensions, wherein said lines are arranged in said 2-dimensional pattern in configurations selected from the group comprising:

said lines are vertical and spaced apart in the same orientation at a constant horizontal distance, said lines are vertical and spaced apart in the same orientation at a constant distance along an angle to the horizonatal, said lines are vertical with each alternating line in reversed orientation and spaced apart at a constant distance along the horizontal between said concave portion of one line and said convex portion of adjacent line, said lines are vertical with each alternating line in reversed orientation and spaced apart at a constant distance along an angle to the horizontal between said concave portion of one line and said convex portion of adjacent line, said lines are vertical with each alternating line in reversed orientation such that said concave portion of one line touches said convex portion of adjacent line, said lines are inclined with respect to one another, said lines are in a radial arrangement, said lines are arranged in a branched fractal pattern, said lines are arranged in an irregular manner, and any combinations of above.

* * * * *